(12) United States Patent
Kosta et al.

(10) Patent No.: US 12,619,250 B2
(45) Date of Patent: May 5, 2026

(54) ULTRASONIC PIEZOELECTRIC TRANSCEIVER SENSOR FOR FULL SURFACE CONTACT LOCALIZATION

(71) Applicant: SAMSUNG ELECTRONICS CO., LTD., Suwon-si (KR)

(72) Inventors: Adarsh K. Kosta, West Lafayette, IN (US); Alexis M. Burns, New York, NY (US); Caleb Escobedo, Boulder, CO (US); Siddharth Rupavatharam, New York, NY (US); Richard E. Howard, Highland Park, NJ (US); Lawrence Jackel, Holmdel, NJ (US); Daewon Lee, Princeton, NJ (US); Ibrahim Volkan Isler, Saint Paul, MN (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 18/541,161

(22) Filed: Dec. 15, 2023

(65) Prior Publication Data

US 2024/0295882 A1     Sep. 5, 2024

Related U.S. Application Data

(60) Provisional application No. 63/531,642, filed on Aug. 9, 2023, provisional application No. 63/449,910, filed on Mar. 3, 2023.

(51) Int. Cl.
*G05D 1/242* (2024.01)
*A47L 9/00* (2006.01)
(Continued)

(52) U.S. Cl.
CPC .............. *G05D 1/242* (2024.01); *A47L 9/009* (2013.01); *A47L 9/2805* (2013.01);
(Continued)

(58) Field of Classification Search
CPC ...... A47L 9/009; A47L 9/2805; A47L 9/2852; A47L 2201/04; G01C 21/005;
(Continued)

(56) References Cited

U.S. PATENT DOCUMENTS 7,497,491 B2     3/2009  Zanella et al.
9,505,140 B1 *  11/2016  Fay ...................... G01D 5/2403
(Continued)

FOREIGN PATENT DOCUMENTS

CN           114260927 A      4/2022
KR       10-2297914 B1      9/2021
(Continued)

OTHER PUBLICATIONS

International Search Report and Written Opinion issued on May 20, 2024 by the International Searching Authority for International Patent Application No. PCT/KR2024/095159 (PCT/ISA/220, PCT/ISA/210, and PCT/ISA/237).

*Primary Examiner* — Jason Holloway
*Assistant Examiner* — Blake A Wood
(74) *Attorney, Agent, or Firm* — Sughrue Mion, PLLC

(57) ABSTRACT

The present disclosure provides methods, apparatuses, systems, and computer-readable mediums for classifying a region and an intensity of a contact. A method includes obtaining, from a plurality of acoustic sensors provided on an inner surface of a bumper of the apparatus, a combined acoustic signal, the combined acoustic signal being based on an input signal provided to the plurality of acoustic sensors, determining, using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the
(Continued)

combined acoustic signal, and determining a motion of the apparatus based on the region of the contact, the intensity of the contact, and an operating mode of the apparatus.

23 Claims, 21 Drawing Sheets

(51) Int. Cl.
*A47L 9/28* (2006.01)
*G01C 21/20* (2006.01)
*G05D 1/646* (2024.01)

(52) U.S. Cl.
CPC .......... *A47L 9/2852* (2013.01); *G01C 21/206* (2013.01); *G05D 1/646* (2024.01); *A47L 2201/04* (2013.01)

(58) Field of Classification Search
CPC ....... G01C 21/206; G01C 21/383; G01S 7/53; G01S 7/537; G01S 15/04; G01S 15/86; G01S 15/87; G01S 15/88; G01S 15/931; G01S 2015/938; G05D 1/241; G05D 1/242; G05D 1/2424; G05D 1/628; G05D 1/646; G05D 2101/15; G05D 2105/10; G05D 2107/40; G05D 2109/10; G05D 2111/20

See application file for complete search history.

(56) References Cited

U.S. PATENT DOCUMENTS

| | | | |
|---|---|---|---|
| 9,846,233 B2 | 12/2017 | Yu et al. | |
| 9,914,219 B2 | 3/2018 | Lee et al. | |
| 10,416,629 B1 * | 9/2019 | Bingham .................. G01H 7/00 | |
| 10,824,159 B2 * | 11/2020 | Bautista .................. G01L 1/122 | |
| 11,614,745 B2 | 3/2023 | Yun et al. | |
| 12,162,159 B2 | 12/2024 | Jo | |
| 2005/0174338 A1 | 8/2005 | Ing et al. | |
| 2006/0235585 A1 * | 10/2006 | Tanaka ................... G05D 1/027 | |
| | | | 701/23 |
| 2010/0049388 A1 * | 2/2010 | Moriguchi ............ B60B 19/003 | |
| | | | 701/22 |
| 2021/0137339 A1 * | 5/2021 | Knuth ................. A47L 11/4011 | |
| 2022/0248926 A1 | 8/2022 | Ahn | |
| 2023/0081827 A1 | 3/2023 | Fan et al. | |

FOREIGN PATENT DOCUMENTS

| | | |
|---|---|---|
| KR | 10-2324204 B1 | 11/2021 |
| WO | 2016/195745 A1 | 12/2016 |

* cited by examiner

100

| REGION $L_{AA}$ | REGION $L_{AB}$ | REGION $L_{AC}$ | • • • | REGION $L_{AK}$ |
|---|---|---|---|---|
| REGION $L_{BA}$ | REGION $L_{BB}$ | REGION $L_{BC}$ | • • • | REGION $L_{BK}$ |
| REGION $L_{CA}$ | REGION $L_{CB}$ | REGION $L_{CC}$ | • • • | REGION $L_{CK}$ |
| ⋮ | ⋮ | ⋮ | ⋰ | ⋮ |
| REGION $L_{JA}$ | REGION $L_{JB}$ | REGION $L_{JC}$ | • • • | REGION $L_{JK}$ |

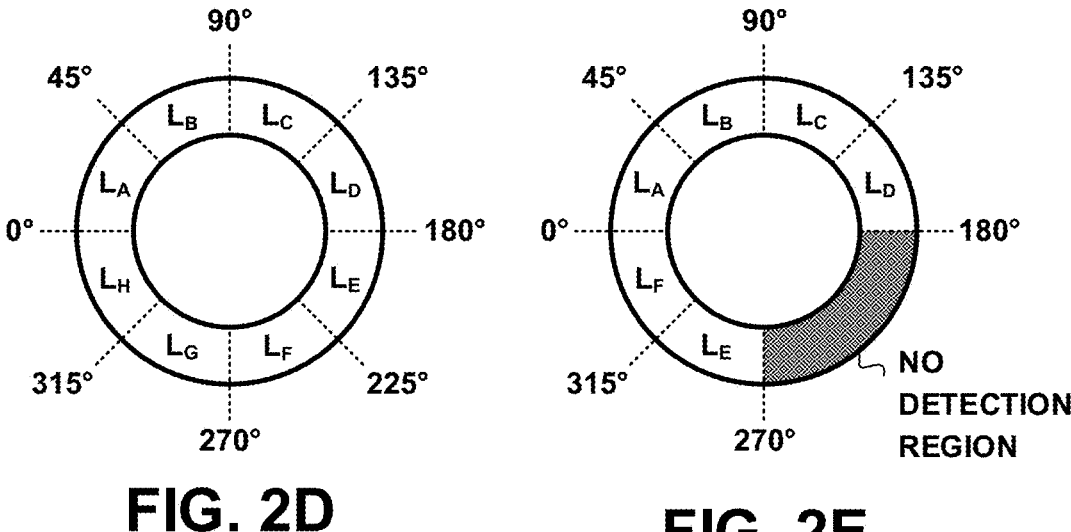
FIG. 2D
FIG. 2E
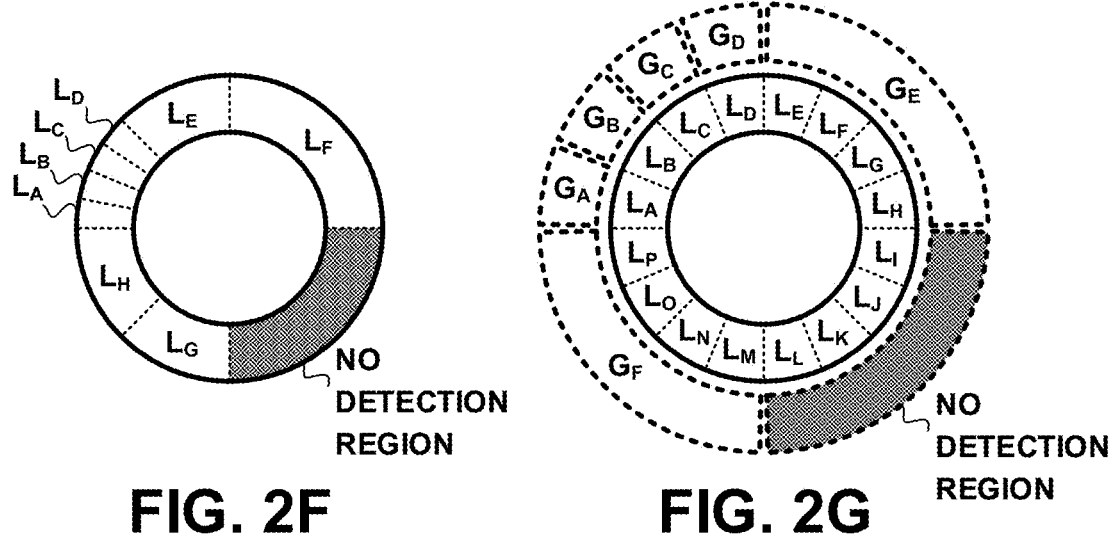
FIG. 2F
FIG. 2G

600

START

910

SELECTING OPERATING MODE AND CORRESPONDING EXCITATION FREQUENCY

920

PROVIDING EXCITATION SIGNAL WITH SELECTED EXCITATION FREQUENCY TO ACOUSTIC SENSORS

930

YES     HAS A MODE CHANGE BEEN INITIATED?     NO

1300

OBTAINING, FROM A PLURALITY OF ACOUSTIC
SENSORS PROVIDED ON AN INNER SURFACE OF A
BUMPER OF THE APPARATUS, A COMBINED
ACOUSTIC SIGNAL, THE COMBINED ACOUSTIC
SIGNAL BEING BASED ON AN INPUT SIGNAL
PROVIDED TO EACH OF THE PLURALITY OF ACOUSTIC
SENSORS, THE PLURALITY OF ACOUSTIC SENSORS
ATTACHED APART FROM EACH OTHER          ⌐ 1310

DETERMINING, USING A TRAINED MACHINE LEARNING
MODEL THAT HAS BEEN TRAINED WITH ACOUSTIC
SIGNALS AND CORRESPONDING POSITION AND
INTENSITY INFORMATION OF IMPACTS ON A
PLURALITY OF REGIONS OF AN OUTER SURFACE OF
THE BUMPER, THE REGION OF THE CONTACT ON THE
BUMPER WITH RESPECT TO THE PLURALITY OF
REGIONS AND THE INTENSITY OF THE CONTACT,
BASED ON THE COMBINED ACOUSTIC SIGNAL          ⌐ 1320

DETERMINING A MOTION OF THE APPARATUS BASED
ON THE REGION OF THE CONTACT, THE INTENSITY OF
THE CONTACT, AND AN OPERATING MODE OF THE
APPARATUS          ⌐ 1330

Figure 14:
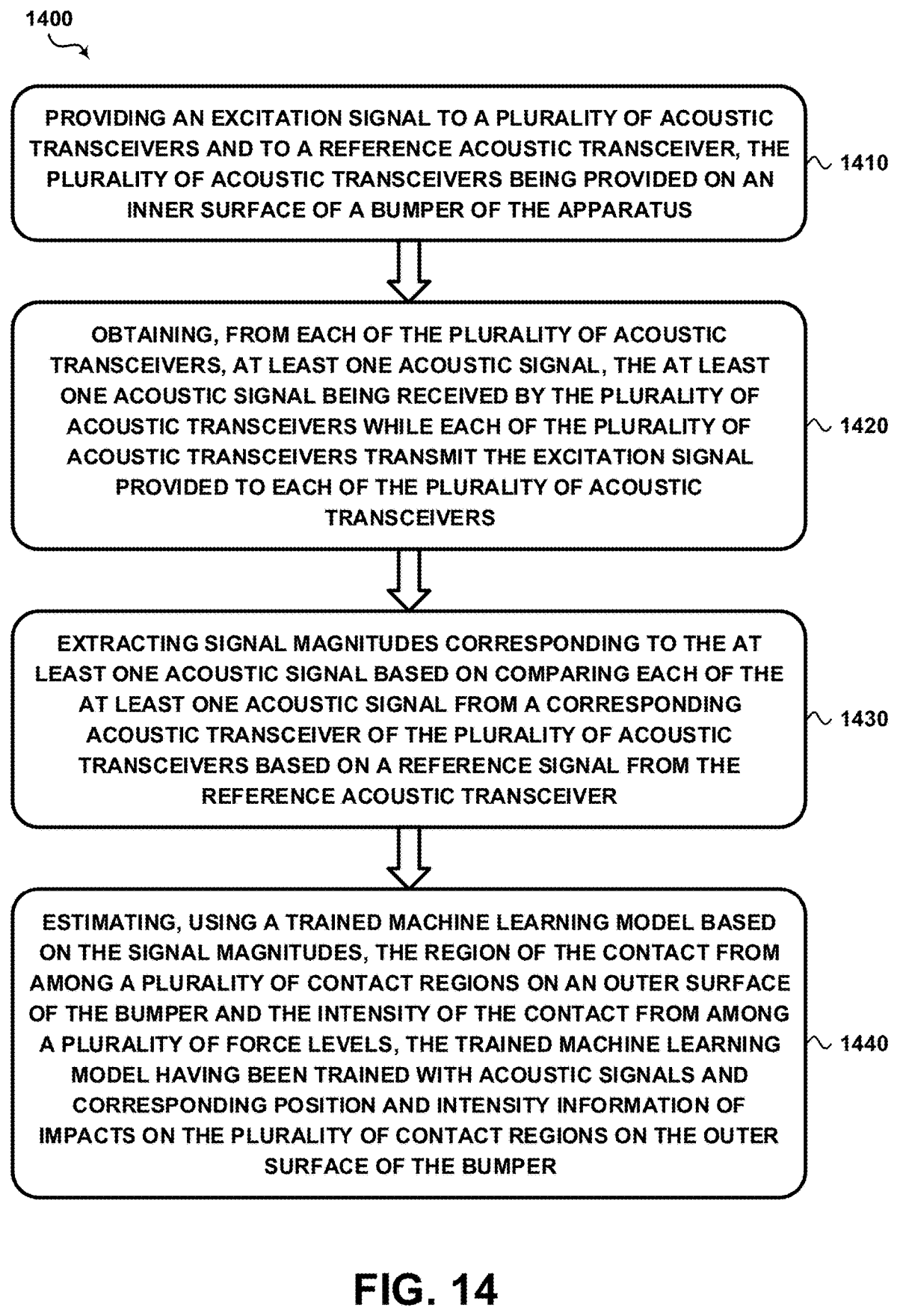

PROVIDING AN EXCITATION SIGNAL TO A PLURALITY OF ACOUSTIC TRANSCEIVERS AND TO A REFERENCE ACOUSTIC TRANSCEIVER, THE PLURALITY OF ACOUSTIC TRANSCEIVERS BEING PROVIDED ON AN INNER SURFACE OF A BUMPER OF THE APPARATUS — 1410

OBTAINING, FROM EACH OF THE PLURALITY OF ACOUSTIC TRANSCEIVERS, AT LEAST ONE ACOUSTIC SIGNAL, THE AT LEAST ONE ACOUSTIC SIGNAL BEING RECEIVED BY THE PLURALITY OF ACOUSTIC TRANSCEIVERS WHILE EACH OF THE PLURALITY OF ACOUSTIC TRANSCEIVERS TRANSMIT THE EXCITATION SIGNAL PROVIDED TO EACH OF THE PLURALITY OF ACOUSTIC TRANSCEIVERS — 1420

EXTRACTING SIGNAL MAGNITUDES CORRESPONDING TO THE AT LEAST ONE ACOUSTIC SIGNAL BASED ON COMPARING EACH OF THE AT LEAST ONE ACOUSTIC SIGNAL FROM A CORRESPONDING ACOUSTIC TRANSCEIVER OF THE PLURALITY OF ACOUSTIC TRANSCEIVERS BASED ON A REFERENCE SIGNAL FROM THE REFERENCE ACOUSTIC TRANSCEIVER — 1430

ESTIMATING, USING A TRAINED MACHINE LEARNING MODEL BASED ON THE SIGNAL MAGNITUDES, THE REGION OF THE CONTACT FROM AMONG A PLURALITY OF CONTACT REGIONS ON AN OUTER SURFACE OF THE BUMPER AND THE INTENSITY OF THE CONTACT FROM AMONG A PLURALITY OF FORCE LEVELS, THE TRAINED MACHINE LEARNING MODEL HAVING BEEN TRAINED WITH ACOUSTIC SIGNALS AND CORRESPONDING POSITION AND INTENSITY INFORMATION OF IMPACTS ON THE PLURALITY OF CONTACT REGIONS ON THE OUTER SURFACE OF THE BUMPER — 1440

Figure 15:
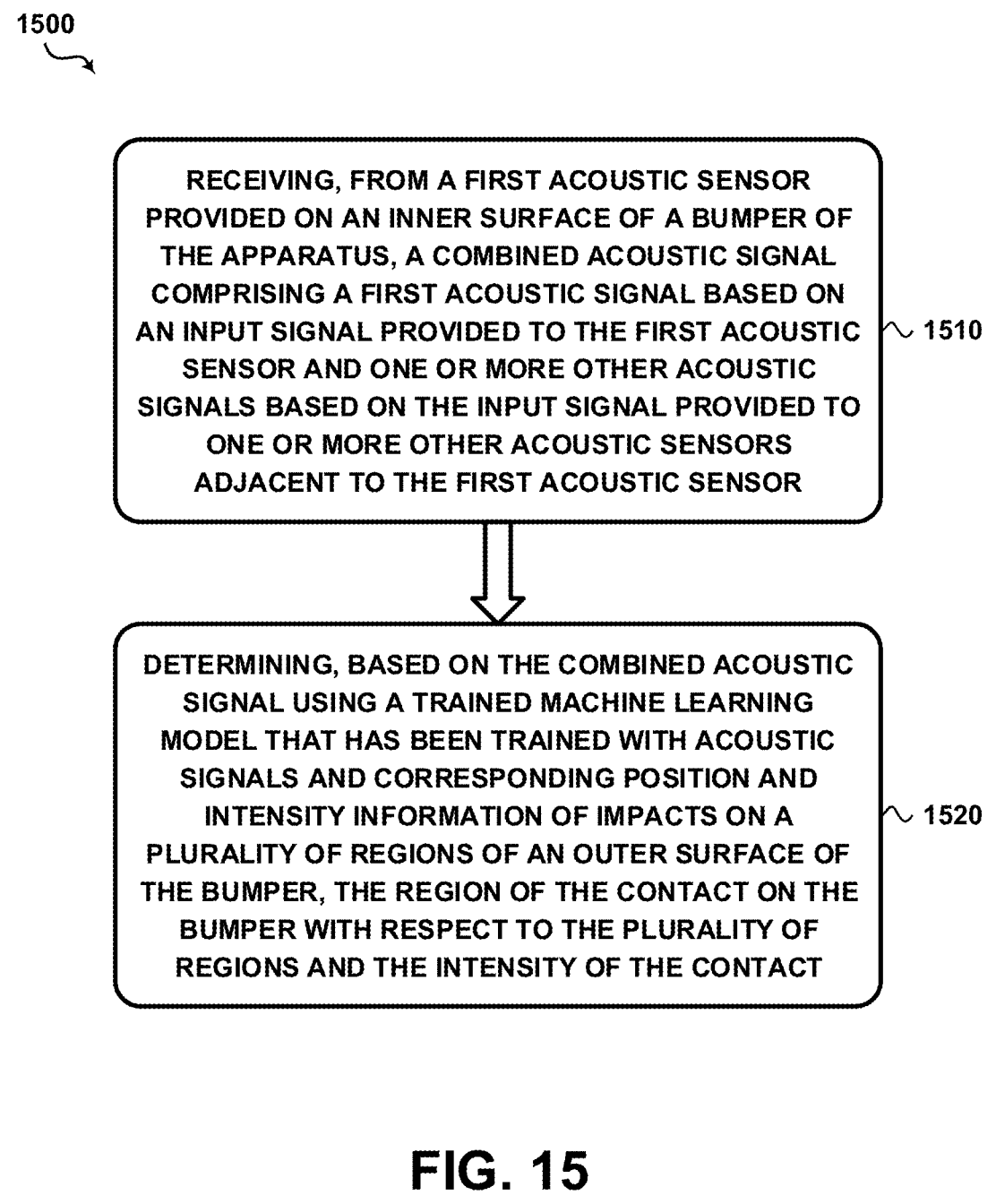

RECEIVING, FROM A FIRST ACOUSTIC SENSOR PROVIDED ON AN INNER SURFACE OF A BUMPER OF THE APPARATUS, A COMBINED ACOUSTIC SIGNAL COMPRISING A FIRST ACOUSTIC SIGNAL BASED ON AN INPUT SIGNAL PROVIDED TO THE FIRST ACOUSTIC SENSOR AND ONE OR MORE OTHER ACOUSTIC SIGNALS BASED ON THE INPUT SIGNAL PROVIDED TO ONE OR MORE OTHER ACOUSTIC SENSORS ADJACENT TO THE FIRST ACOUSTIC SENSOR    1510

DETERMINING, BASED ON THE COMBINED ACOUSTIC SIGNAL USING A TRAINED MACHINE LEARNING MODEL THAT HAS BEEN TRAINED WITH ACOUSTIC SIGNALS AND CORRESPONDING POSITION AND INTENSITY INFORMATION OF IMPACTS ON A PLURALITY OF REGIONS OF AN OUTER SURFACE OF THE BUMPER, THE REGION OF THE CONTACT ON THE BUMPER WITH RESPECT TO THE PLURALITY OF REGIONS AND THE INTENSITY OF THE CONTACT    1520

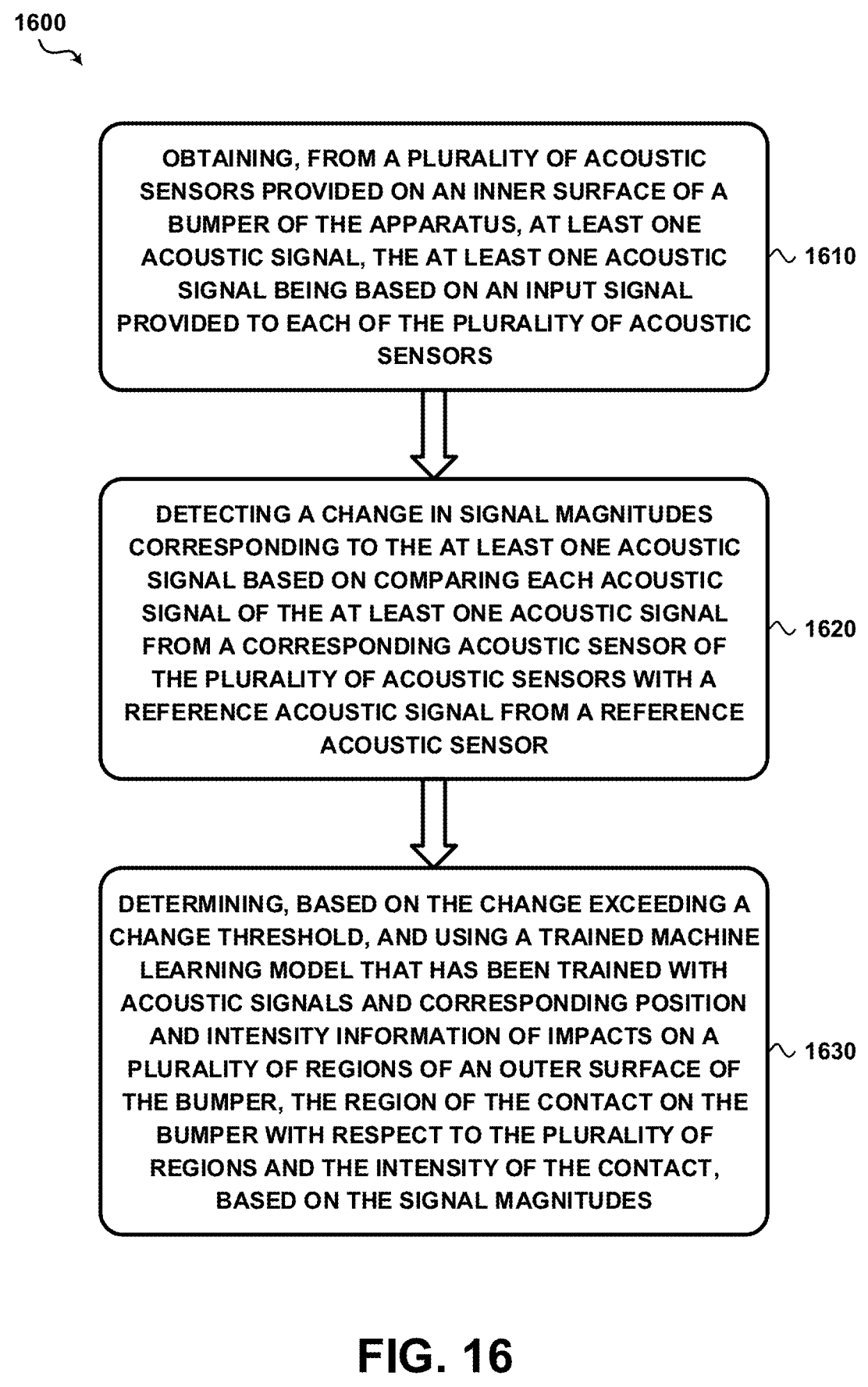

OBTAINING, FROM A PLURALITY OF ACOUSTIC SENSORS PROVIDED ON AN INNER SURFACE OF A BUMPER OF THE APPARATUS, AT LEAST ONE ACOUSTIC SIGNAL, THE AT LEAST ONE ACOUSTIC SIGNAL BEING BASED ON AN INPUT SIGNAL PROVIDED TO EACH OF THE PLURALITY OF ACOUSTIC SENSORS ∿ 1610

DETECTING A CHANGE IN SIGNAL MAGNITUDES CORRESPONDING TO THE AT LEAST ONE ACOUSTIC SIGNAL BASED ON COMPARING EACH ACOUSTIC SIGNAL OF THE AT LEAST ONE ACOUSTIC SIGNAL FROM A CORRESPONDING ACOUSTIC SENSOR OF THE PLURALITY OF ACOUSTIC SENSORS WITH A REFERENCE ACOUSTIC SIGNAL FROM A REFERENCE ACOUSTIC SENSOR ∿ 1620

DETERMINING, BASED ON THE CHANGE EXCEEDING A CHANGE THRESHOLD, AND USING A TRAINED MACHINE LEARNING MODEL THAT HAS BEEN TRAINED WITH ACOUSTIC SIGNALS AND CORRESPONDING POSITION AND INTENSITY INFORMATION OF IMPACTS ON A PLURALITY OF REGIONS OF AN OUTER SURFACE OF THE BUMPER, THE REGION OF THE CONTACT ON THE BUMPER WITH RESPECT TO THE PLURALITY OF REGIONS AND THE INTENSITY OF THE CONTACT, BASED ON THE SIGNAL MAGNITUDES ∿ 1630

FIG. 16

ULTRASONIC PIEZOELECTRIC TRANSCEIVER SENSOR FOR FULL SURFACE CONTACT LOCALIZATION

CROSS-REFERENCE TO RELATED APPLICATIONS

This application claims benefit of priority under 35 U.S.C. § 119 to U.S. Provisional Patent Application No. 63/449,910, filed on Mar. 3, 2023, and U.S. Provisional Patent Application No. 63/531,642, filed on Aug. 9, 2023, in the U.S. Patent and Trademark Office, the disclosure of which is incorporated by reference herein in its entirety.

BACKGROUND

1. Field

The present disclosure relates generally to robotic control, and more particularly to methods, apparatuses, systems, and non-transitory computer-readable mediums for classifying a region and an intensity of a contact with a full-surface contact localization system using ultrasonic piezoelectric transceiver sensors.

2. Description of Related Art

As robots enter dynamic spaces where obstacles such as, but not limited to, people, animals, and/or objects, may be present, making physical contact with the obstacles may be inevitable. Consequently, robots may need tactile sensing capabilities that may detect when and where a contact occurs in order to navigate these dynamic spaces. That is, providing robots with full-surface contact detection and localization sensing capabilities may provide the robots with a capability of perceiving and/or avoiding obstacles post-contact, which may also contribute to information related to the robot's surroundings (e.g., area and/or volume within a threshold distance).

Related approaches for emulating human skin and/or touch receptors may be based on capacitive, optical, resistive, and/or vision approaches. However, each of these approaches may have disadvantages that may prevent wider adoption of these approaches. For example, capacitance-based approaches are well suited for contact detection and localization of point contacts when multiple capacitive pressure sensors are deployed as a matrix that covers the surface. Alternatively or additionally, the electrical properties of an object (e.g., response to an electrical field) may affect the detection of a contact with a capacitance-based sensor. For example, electrically-conducting objects (e.g., metals) may be easier to detect than objects made of other materials (e.g., non-conductive materials). Furthermore, localization resolution may depend on sensor size, and as such, a greater number of sensors may be needed in order to realize a desired localization resolution.

As another example, optical and/or camera-based approaches may have a fixed field of view that may limit sensing areas, and as such, may necessitate a dense sensor deployment. Alternatively or additionally, performance of camera-based approaches may degrade when faced with visual occlusions, poor light conditions, and/or transparent or mirrored objects that may be difficult to detect visually. Furthermore, camera-based approaches may typically not be accurate over very short ranges (e.g., less than 10 centimeters (cm)) depending on camera focal length. As another example, proprioceptive (resistive) approaches may use sensors (e.g., joint torque sensors, motor torque sensors, position sensors, velocity sensors, momentum sensors, and the like) coupled with inverse kinematics and/or dynamics to infer a contact region and/or a contact force. However, these proprioceptive approaches may provide poor estimation results of contact region and/or contact force due to noisy and/or time varying properties of the motors.

Thus, there exists a need for further improvements to tactile sensing approaches, as the need for navigating in dynamic spaces may be constrained by an inability to assess a region and an intensity of a contact. Improvements are presented herein. These improvements may also be applicable to other movement control and/or mapping technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, systems, and non-transitory computer-readable mediums for classifying a region and an intensity of a contact are disclosed by the present disclosure. Aspects of the present disclosure provide for determining a motion based on the region of the contact, the intensity of the contact, and an operating mode.

According to an aspect of the present disclosure, a method for classifying a region and an intensity of a contact by an apparatus is provided. The method includes obtaining, from a plurality of acoustic sensors provided on an inner surface of a bumper of the apparatus, a combined acoustic signal, the combined acoustic signal being based on an input signal provided to each of the plurality of acoustic sensors, the plurality of acoustic sensors attached apart from each other, determining, using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the combined acoustic signal, and determining a motion of the apparatus based on the region of the contact, the intensity of the contact, and an operating mode of the apparatus.

In some embodiments, the plurality of acoustic sensors may include a plurality of piezoelectric transceivers. In such embodiments, the obtaining of the combined acoustic signal may be performed by the plurality of piezoelectric transceivers.

In some embodiments, the method may further include extracting signal magnitudes corresponding to the combined acoustic signal based on comparing each acoustic signal of the combined acoustic signal from a corresponding acoustic sensor of the plurality of acoustic sensors with a reference acoustic signal from a reference acoustic sensor.

In some embodiments, the plurality of acoustic sensors may include a bridge circuit. In such embodiments, the extracting of the signal magnitudes may include inputting the combined acoustic signal and the reference acoustic signal to the bridge circuit to obtain a difference signal between the combined acoustic signal and the reference acoustic signal. The difference signal may include the signal magnitudes corresponding to the combined acoustic signal.

In some embodiments, the operating mode of the apparatus may be a contact avoidance mode. In such embodiments, the determining of the motion of the apparatus may include updating a path plan of the apparatus to move away from the contact, based on the region of the contact and the intensity of the contact.

In some embodiments, the operating mode of the apparatus may be an edge following mode. In such embodiments, the determining of the motion of the apparatus may include determining, based on the intensity of the contact, whether at least one of a light contact and a heavy contact is detected, based on the heavy contact being detected, adjusting a path plan of the apparatus to move towards a previous region where a previous light contact was previously detected, based on the light contact being detected, determining whether the region of the contact corresponds to the path plan of the apparatus, and based on the region of the contact not corresponding to the path plan of the apparatus, adjusting the path plan of the apparatus to move towards the previous region where the previous light contact was previously detected.

In some embodiments, the obtaining of the combined acoustic signal may include providing the input signal to each of the plurality of acoustic sensors. In such embodiments, the combined acoustic signal may be received by the plurality of acoustic sensors while each of the plurality of acoustic sensors may transmit the input signal provided to each of the plurality of acoustic sensors. An excitation frequency of the input signal may correspond to the operating mode of the apparatus.

In some embodiments, the method may further include providing the plurality of acoustic sensors with an input calibration signal corresponding to the operating mode of the apparatus, obtaining at least one calibration acoustic signal from the plurality of acoustic sensors, extracting calibration signal magnitudes from the at least one calibration acoustic signal, selecting, based on the calibration signal magnitudes, a calibration frequency having a maximum spectral power, and updating the excitation frequency of the input signal corresponding to the operating mode of the apparatus, based on the calibration frequency.

In some embodiments, the method may further include changing the operating mode of the apparatus from a first mode to a second mode, and changing the excitation frequency of the input signal from a first excitation frequency to a second excitation frequency that corresponds to the second mode.

In some embodiments, the obtaining of the combined acoustic signal may further include providing the input signal to a reference acoustic sensor different from the plurality of acoustic sensors, and comparing the combined acoustic signal with a reference acoustic signal from the reference acoustic sensor, resulting in at least one difference signal.

In some embodiments, the method may further include converting the at least one difference signal to at least one digital difference signal, phase matching the at least one digital difference signal, mixing the at least one phase-matched digital difference signal, and providing the at least one mixed phase-matched digital difference signal to the trained machine learning model as input.

In some embodiments, the trained machine learning model may have been trained using contact sample data including a plurality of impact intensities at regions corresponding to the plurality of regions of the outer surface of the bumper on a plurality of sensing materials. In such embodiments, the determining of the region of the contact on the bumper and the intensity of the contact may include obtaining, from the trained machine learning model, a mapping of the region of the contact to at least one region of the plurality of regions and a classification of the intensity of the contact.

In some embodiments, the plurality of acoustic sensors may include a number of acoustic sensors determined based on at least one of an accuracy threshold of the apparatus and a material type of the bumper of the apparatus, and the plurality of acoustic sensors may be provided at locations on the inner surface of the bumper of the apparatus determined based on the at least one of the accuracy threshold of the apparatus and the material type of the bumper of the apparatus.

According to an aspect of the present disclosure, an apparatus for classifying a region and an intensity of a contact is provided. The apparatus includes a plurality of piezoelectric transceivers provided on an inner surface of a bumper of the apparatus, a memory storing instructions, and one or more processors communicatively coupled to the memory. The one or more processors are configured to execute the instructions to obtain, from each of the plurality of piezoelectric transceivers, at least one acoustic signal, the at least one acoustic signal being based on an input signal provided to each of the plurality of piezoelectric transceivers, extract signal magnitudes corresponding to the at least one acoustic signal based on comparing each acoustic signal of the at least one acoustic signal from a corresponding piezoelectric transceiver of the plurality of piezoelectric transceivers with a reference acoustic signal from a reference acoustic sensor, determine, using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the signal magnitudes; and determine a motion of the apparatus based on the region of the contact, the intensity of the contact, and an operating mode of the apparatus.

In some embodiments, the apparatus further may include a bridge circuit. In such embodiments, the one or more processors may be further configured to execute further instructions to input the at least one acoustic signal and the reference acoustic signal to the bridge circuit to obtain a difference signal between each of the at least one acoustic signal and the reference acoustic signal. The difference signal may include the signal magnitudes corresponding to the at least one acoustic signal.

In some embodiments, the operating mode of the apparatus may be a contact avoidance mode. In such embodiments, the one or more processors may be further configured to execute further instructions to update a path plan of the apparatus to move away from the contact, based on the region of the contact and the intensity of the contact.

In some embodiments, the operating mode of the apparatus may be an edge following mode. In such embodiments, the one or more processors may be further configured to execute further instructions to determine, based on the intensity of the contact, whether at least one of a light contact and a heavy contact is detected, based on the heavy contact being detected, adjust a path plan of the apparatus to move towards a previous region where a previous light contact was previously detected, based on the light contact being detected, determine whether the region of the contact corresponds to the path plan of the apparatus, and based on the region of the contact not corresponding to the path plan of the apparatus, adjust the path plan of the apparatus to move towards the previous region where the previous light contact was previously detected.

In some embodiments, the one or more processors may be further configured to execute further instructions to provide the input signal to each of the plurality of piezoelectric transceivers. In such embodiments, the at least one acoustic signal may be received by the plurality of piezoelectric transceivers while each of the plurality of piezoelectric transceivers may transmit the input signal provided to each of the plurality of piezoelectric transceivers. An excitation frequency of the input signal may correspond to the operating mode of the apparatus.

In some embodiments, the one or more processors may be further configured to execute further instructions to provide the plurality of piezoelectric transceivers with an input calibration signal corresponding to the operating mode of the apparatus, obtain at least one calibration acoustic signal from the plurality of piezoelectric transceivers, extract calibration signal magnitudes from the at least one calibration acoustic signal, select, based on the calibration signal magnitudes, a calibration frequency having a maximum spectral power, and update the excitation frequency of the input signal corresponding to the operating mode of the apparatus, based on the calibration frequency.

In some embodiments, the one or more processors may be further configured to execute further instructions to provide the input signal to a reference piezoelectric transceiver different from the plurality of piezoelectric transceivers, compare each of the at least one acoustic signal with the reference acoustic signal from the reference piezoelectric transceiver, resulting in at least one difference signal, convert the at least one difference signal to at least one digital difference signal, phase match the at least one digital difference signal, mix the at least one phase-matched digital difference signal, and provide the at least one mixed phase-matched digital difference signal to the trained machine learning model as input.

In some embodiments, the plurality of piezoelectric transceivers may include a number of piezoelectric transceivers that may be determined based on at least one of an accuracy threshold of the apparatus and a material type of the bumper of the apparatus. The plurality of piezoelectric transceivers may be provided at regions on the inner surface of the bumper of the apparatus that may be determined based on the at least one of the accuracy threshold of the apparatus and the material type of the bumper of the apparatus.

According to an aspect of the present disclosure, a full-surface contact localization system for classifying a region and an intensity of a contact is provided. The full-surface contact localization system includes a robot, a plurality of piezoelectric transceivers provided on an inner surface of a bumper of the robot, a memory storing instructions, and one or more processors communicatively coupled to the memory. The one or more processors are configured to execute the instructions to obtain, from each of the plurality of piezoelectric transceivers, a combined acoustic signal, the combined acoustic signal being based on an input signal provided to each of the plurality of piezoelectric transceivers, determine, using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the combined acoustic signal, and determine a motion of the robot based on the region of the contact, the intensity of the contact, and an operating mode of the robot.

According to an aspect of the present disclosure, an apparatus that includes means for classifying a region and an intensity of a contact is provided. The apparatus includes means for obtaining, from each of a plurality of acoustic sensors provided on an inner surface of a bumper of the apparatus, a combined acoustic signal, the combined acoustic signal being based on an input signal provided to each of the plurality of acoustic sensors, determining, using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the combined acoustic signal, and determining a motion of the apparatus based on the region of the contact, the intensity of the contact, and an operating mode of the apparatus.

According to an aspect of the present disclosure, a non-transitory computer-readable storage medium storing computer-executable instructions for classifying a region and an intensity of a contact is provided. The computer-executable instructions, when executed by at least one processor of a device, cause the device to obtain, from each of a plurality of piezoelectric transceivers, a combined acoustic signal, the combined acoustic signal being based on an input signal provided to each of the plurality of piezoelectric transceivers, determine, using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the combined acoustic signal, and determine a motion of the device based on the region of the contact, the intensity of the contact, and an operating mode of the device.

According to an aspect of the present disclosure, a method for classifying a region and an intensity of a contact by an apparatus is provided. The method includes providing an excitation signal to a plurality of acoustic transceivers and to a reference acoustic transceiver, the plurality of acoustic transceivers being provided on an inner surface of a bumper of the apparatus, obtaining, from each of the plurality of acoustic transceivers, at least one acoustic signal, the at least one acoustic signal being received by the plurality of acoustic transceivers while each of the plurality of acoustic transceivers transmit the excitation signal provided to each of the plurality of acoustic transceivers, extracting signal magnitudes corresponding to the at least one acoustic signal based on comparing each of the at least one acoustic signal from a corresponding acoustic transceiver of the plurality of acoustic transceivers based on a reference signal from the reference acoustic transceiver, and estimating, using a trained machine learning model based on the signal magnitudes, the region of the contact from among a plurality of contact regions on an outer surface of the bumper and the intensity of the contact from among a plurality of force levels, the trained machine learning model having been trained with acoustic signals and corresponding position and intensity information of impacts on the plurality of contact regions on the outer surface of the bumper.

According to an aspect of the present disclosure, a method for classifying a region and an intensity of a contact by an apparatus is provided. The method includes receiving, from a first acoustic sensor provided on an inner surface of a bumper of the apparatus, a combined acoustic signal including a first acoustic signal based on an input signal provided to the first acoustic sensor and one or more other acoustic signals based on the input signal provided to one or more other acoustic sensors adjacent to the first acoustic sensor, and determining, based on the combined acoustic signal using a trained machine learning model that has been trained with acoustic signals and corresponding position and intensity information of impacts on a plurality of regions of an outer surface of the bumper, the region of the contact on the bumper with respect to the plurality of regions and the intensity of the contact.

In an embodiment, the method further includes detecting a change in the combined acoustic signal based on comparing the combined acoustic signal with a reference acoustic signal from a reference acoustic sensor.

According to an aspect of the present disclosure, a method for classifying a region and an intensity of a contact by an apparatus is provided. The method includes obtaining, from a plurality of acoustic sensors provided on an inner surface of a bumper of the apparatus, at least one acoustic signal, the at least one acoustic signal being based on an input signal provided to each of the plurality of acoustic sensors, detecting a change in signal magnitudes corresponding to the at least one acoustic signal based on comparing each acoustic signal of the at least one acoustic signal from a corresponding acoustic sensor of the plurality of acoustic sensors with a reference acoustic signal from a reference acoustic sensor, and determining, based on the change exceeding a change threshold, and using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the signal magnitudes.

Additional aspects are set forth in part in the description that follows and, in part, may be apparent from the description, or may be learned by practice of the presented embodiments of the disclosure.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 2B depicts an example of contact regions of the full-surface contact localization system, in accordance with various aspects of the present disclosure;

FIGS. 2D to 2G depict examples of contact regions, in accordance with various aspects of the present disclosure;

FIG. 6B depicts another example of a data flow diagram of the full-surface contact localization system, in accordance with various aspects of the present disclosure;

FIG. 13 illustrates a flowchart of an example method of classifying a region and an intensity of a contact, in accordance with various aspects of the present disclosure;

FIG. 14 depicts a flowchart of another example method of classifying a region and an intensity of a contact, in accordance with various aspects of the present disclosure;

FIG. 15 depicts a flowchart of another example method of classifying a region and an intensity of a contact, in accordance with various aspects of the present disclosure; and FIG. 16 depicts a flowchart of another example method of classifying a region and an intensity of a contact, in accordance with various aspects of the present disclosure.

DETAILED DESCRIPTION

Figure 1:
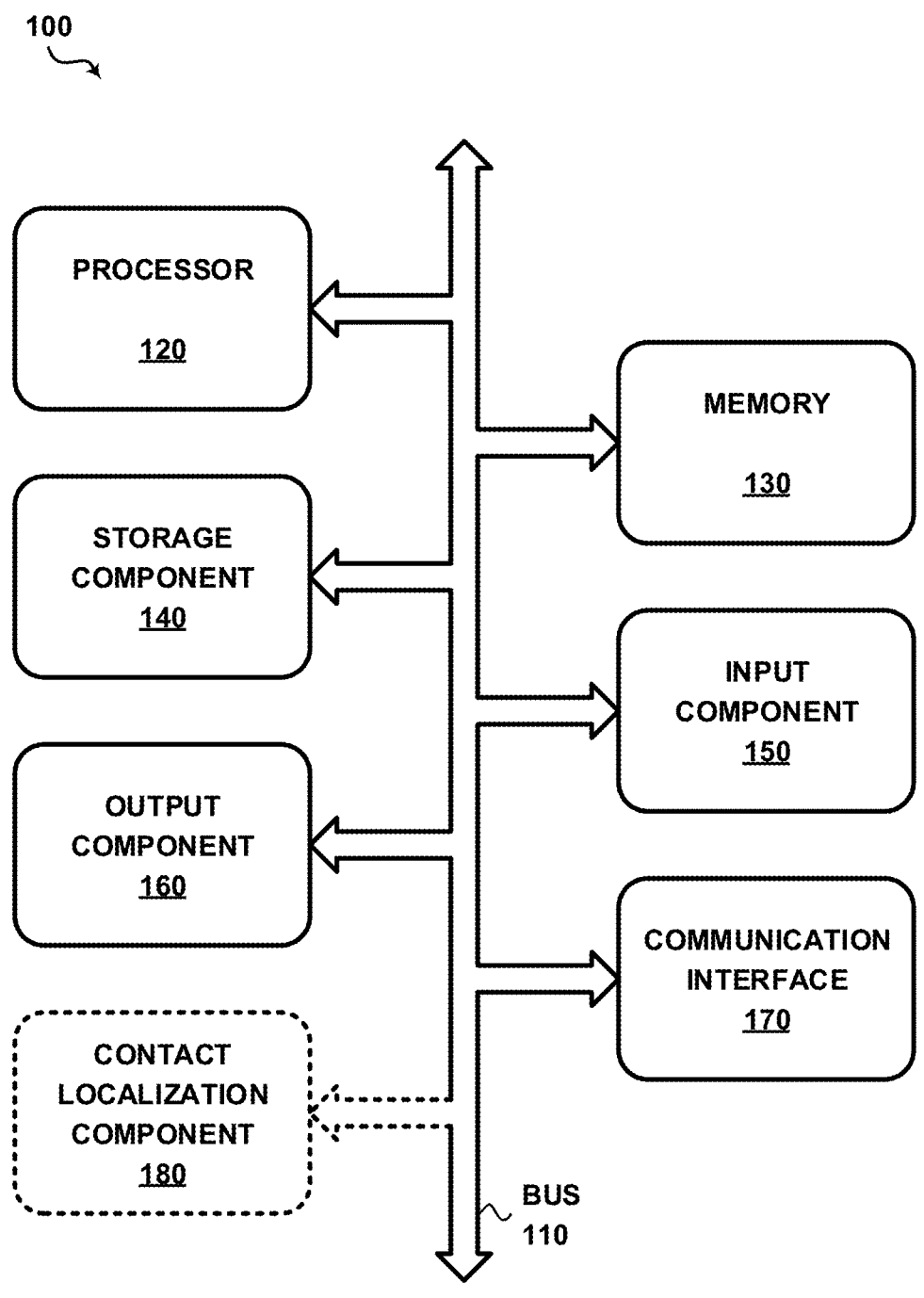
FIG. 1 depicts an example of a device that may be used in implementing one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it is to be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

The following description provides examples, and is not limiting of the scope, applicability, or embodiments set forth in the claims. Changes may be made in the function and/or arrangement of elements discussed without departing from the scope of the present disclosure. Various examples may omit, substitute, or add various procedures or components as appropriate. For example, the methods described may be performed in an order different from that described, and various steps may be added, omitted, and/or combined. Alternatively or additionally, features described with reference to some examples may be combined in other examples.

Various aspects and/or features may be presented in terms of systems that may include a number of devices, components, modules, and the like. It is to be understood and appreciated that the various systems may include additional devices, components, modules, and the like and/or may not include all of the devices, components, modules, and the like discussed in connection with the figures. A combination of these approaches may also be used.

As a general introduction to the subject matter described in more detail below, aspects described herein are directed towards apparatuses, methods, systems, and non-transitory computer-readable mediums for classifying a region and an intensity of a contact. Aspects described herein may be used to determine a motion of a robot based on the region of the contact, the intensity of the contact, and an operating mode of the robot.

Aspects presented herein may provide for a full-surface contact localization system that may mimic tactile sensing capabilities of human skin. The full-surface contact localization system may use acoustic wave sensing to realize a touch-receptive robot skin using fewer sensors to achieve full-surface contact detection and localization while overcoming at least some of the challenges presented by related sensing approaches that may rely on capacitive, optical, resistive, and/or vision sensors. That is, aspects presented herein may provide for full-surface contact localization that may be independent of field of view since the acoustic waves that may be generated by the full-surface contact localization system may be emitted in a widespread manner (e.g., substantially omnidirectional) from the surface of the robot. Aspects presented herein may provide for proximity detection of objects with different shapes and sizes, and/or optical, electrical, magnetic, mechanical properties, and the like, and may depend only on the acoustic reflectivity of the objects. Aspects presented herein may provide for acoustic sensors having a wide sensing area, thus needing only a handful of acoustic sensors to localize contact over an entire surface.

The aspects described herein may provide advantages over related sensing approaches by providing a full-surface contact localization system that may use a same acoustic sensor to transmit and receive acoustic signals for contact localization thereby potentially reducing the number of acoustic sensors that may be needed to be installed. The acoustic sensors may be excited using a monotone signal (e.g., instead of a chirp signal that may sweep across multiple frequencies), thus allowing for faster processing of the acoustic signals and faster contact detection. Alternatively or additionally, the frequency of the monotone excitation signal may be changed based on operating modes of the system and/or design constraints. The term "monotone signal" may refer to a type of signal or waveform in which one signal frequency is used to excite the piezoelectric transceiver. The monotone signal may not exhibit any significant variations, fluctuations, or changes in its intensity or frequency. Advantageously, aspects described herein may further provide for a trained machine learning model that may be configured to accurately estimate the region of the contact and the intensity of the contact based on signal magnitudes extracted from the acoustic signals, even when the contact occurs between two acoustic sensors. That is, aspects presented herein provide a full-surface contact localization system with a relatively high collision detection resolution (e.g., within 2 centimeters (cm)) that may be capable of detecting soft collisions (e.g., about 2 to 5 Newtons (N) of force) and/or hard collisions (e.g., about 10 to 20 N) on various types of materials (e.g., wood, metal, plastic, and the like) in the presence of other acoustic signals and/or vibrations from other sources (e.g., running motors).

As noted above, certain embodiments are discussed herein that relate to classifying a region and an intensity of a contact. Before discussing these concepts in further detail, however, an example of a computing device that may be used in implementing and/or otherwise providing various aspects of the present disclosure is discussed with respect to FIG. 1.

FIG. 1 depicts an example of a device 100 that may be used in implementing one or more aspects of the present disclosure in accordance with one or more illustrative aspects discussed herein. For example, device 100 may, in some instances, implement one or more aspects of the present disclosure by reading and/or executing instructions and performing one or more actions accordingly. In one or more arrangements, device 100 may represent, be incorporated into, and/or include a robotic device, a robot controller, a desktop computer, a computer server, a virtual machine, a network appliance, a mobile device (e.g., a laptop computer, a tablet computer, a personal digital assistant (PDA), a smart phone, any other type of mobile computing device, and the like), a wearable device (e.g., smart watch, headset, headphones, and the like), a smart device (e.g., a voice-controlled virtual assistant, a set-top box (STB), a refrigerator, an air conditioner, a microwave, a television, and the like), an Internet-of-Things (IoT) device, and/or any other type of data processing device.

For example, the device 100 may include a processor, a personal computer (PC), a printed circuit board (PCB) including a computing device, a mini-computer, a mainframe computer, a microcomputer, a telephonic computing device, a wired/wireless computing device (e.g., a smartphone, a PDA), a laptop, a tablet, a smart device, a wearable device, or any other similar functioning device.

In some embodiments, as shown in FIG. 1, the device 100 may include a set of components, such as a processor 120, a memory 130, a storage component 140, an input component 150, an output component 160, a communication interface 170, and a contact localization component 180. The set of components of the device 100 may be communicatively coupled via a bus 110.

The bus 110 may include one or more components that may permit communication among the set of components of the device 100. For example, the bus 110 may be a communication bus, a cross-over bar, a network, or the like. Although the bus 110 is depicted as a single line in FIG. 1, the bus 110 may be implemented using multiple (e.g., two or more) connections between the set of components of device 100. The present disclosure is not limited in this regard.

The device 100 may include one or more processors, such as the processor 120. The processor 120 may be implemented in hardware, firmware, and/or a combination of hardware and software. For example, the processor 120 may include a central processing unit (CPU), an application processor (AP), a graphics processing unit (GPU), an accelerated processing unit (APU), a microprocessor, a microcontroller, a digital signal processor (DSP), a field-programmable gate array (FPGA), an application-specific integrated circuit (ASIC), an image signal processor (ISP), a neural processing unit (NPU), a sensor hub processor, a communication processor (CP), an artificial intelligence (AI)-dedicated processor designed to have a hardware structure specified to process an AI model, a general purpose single-chip and/or multi-chip processor, or other programmable logic device, discrete gate or transistor logic, discrete hardware components, or any combination thereof designed to perform the functions described herein. A general purpose processor may include a microprocessor, or any conventional processor, controller, microcontroller, or state machine.

The processor 120 may also be implemented as a combination of computing devices, such as a combination of a DSP and a microprocessor, a combination of a main processor and an auxiliary processor, a plurality of microprocessors, one or more microprocessors in conjunction with a DSP core, or any other such configuration. In some embodiments, particular processes and methods may be performed by circuitry that is specific to a given function. In optional or additional embodiments, an auxiliary processor may be configured to consume less power than the main processor. Alternatively or additionally, the one or more processors may be implemented separately (e.g., as several distinct chips) and/or may be combined into a single form.

The processor 120 may control overall operation of the device 100 and/or of the set of components of device 100 (e.g., the memory 130, the storage component 140, the input component 150, the output component 160, the communication interface 170, and the contact localization component 180).

The device 100 may further include the memory 130. In some embodiments, the memory 130 may include volatile memory such as, but not limited to, random access memory (RAM), static RAM (SRAM), dynamic RAM (DRAM), and the like. In optional or additional embodiments, the memory 130 may include non-volatile memory such as, but not limited to, read only memory (ROM), electrically erasable programmable ROM (EEPROM), NAND flash memory, phase-change RAM (PRAM), magnetic RAM (MRAM), resistive RAM (RRAM), ferroelectric RAM (FRAM), magnetic memory, optical memory, and the like. However, the present disclosure is not limited in this regard, and the memory 130 may include other types of dynamic and/or static memory storage. In an embodiment, the memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further include the input component 150. The input component 150 may include one or more components that may permit the device 100 to receive information, such as via user input (e.g., a touch screen, a keyboard, a keypad, a mouse, a stylus, a button, a switch, a microphone, a camera, a virtual reality (VR) headset, haptic gloves, and the like). Alternatively or additionally, the input component 150 may include one or more sensors for sensing information (e.g., a global positioning system (GPS) component, an accelerometer, a gyroscope, an actuator, a transducer, a contact sensor, a proximity sensor, a ranging device, a camera, a video camera, a depth camera, a time-of-flight (TOF) camera, a stereoscopic camera, and the like). In an embodiment, the input component 150 may include more than one of a same sensor type (e.g., multiple cameras).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, a buzzer, an alarm, and the like).

The device 100 may further include the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as, FlashLinQ, WiMedia, Bluetooth™, Bluetooth™ Low Energy (BLE), ZigBee, Institute of Electrical and Electronics Engineers (IEEE) 802.11x (Wi-Fi), LTE, 5G, and the like. In optional or additional embodiments, the communication interface 170 may include an Ethernet interface, an optical interface, a coaxial interface, an infrared interface, a radio frequency (RF) interface, a USB interface, an IEEE 1094 (FireWire) interface, or the like.

In some embodiments, the device 100 may include the contact localization component 180, which may be configured to classify a region and an intensity of a contact on a surface of the device 100. For example, the contact localization component 180 may be configured to obtain a combined acoustic signal, determine, using a trained machine learning model, the region and intensity of the contact, and determine a motion of the apparatus based on the region of the contact, the intensity of the contact, and an operating mode of the device 100.

As used herein, the term "null measurement" may refer to a measurement technique that involves comparing or evaluating a difference between two analog signals, specifically when the difference between the two signals is balanced to a zero and/or a near-zero difference. For example, the null measurement may be performed using a Wheatstone bridge circuit by measuring electrical resistance or balancing voltage ratios. Instead of directly mixing or combining the transmitter and receiver signals, a null measurement according to embodiments of the present application may detect and quantify any differences or imbalances between the two signals using a Wheatstone bridge circuit. The null measurement may be conducted to find a point where the two signals are equal or balanced, indicating a specific condition or value of interest in the device 100 being measured. A null measurement may be performed to adjust certain parameters or components within the Wheatstone bridge setup to minimize or nullify any difference between the transmitter and receiver signals, allowing for precise measurement or calibration of the device 100.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A non-transitory memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may perform one or more functions described as being performed by another set of components shown in FIG. 1.

Having discussed an example of a device that may be used in providing and/or implementing various aspects of the present disclosure, a number of embodiments are now discussed in further detail. In particular, and as introduced above, some aspects of the present disclosure generally relate to classifying a region and an intensity of a contact.

Figure 2A:
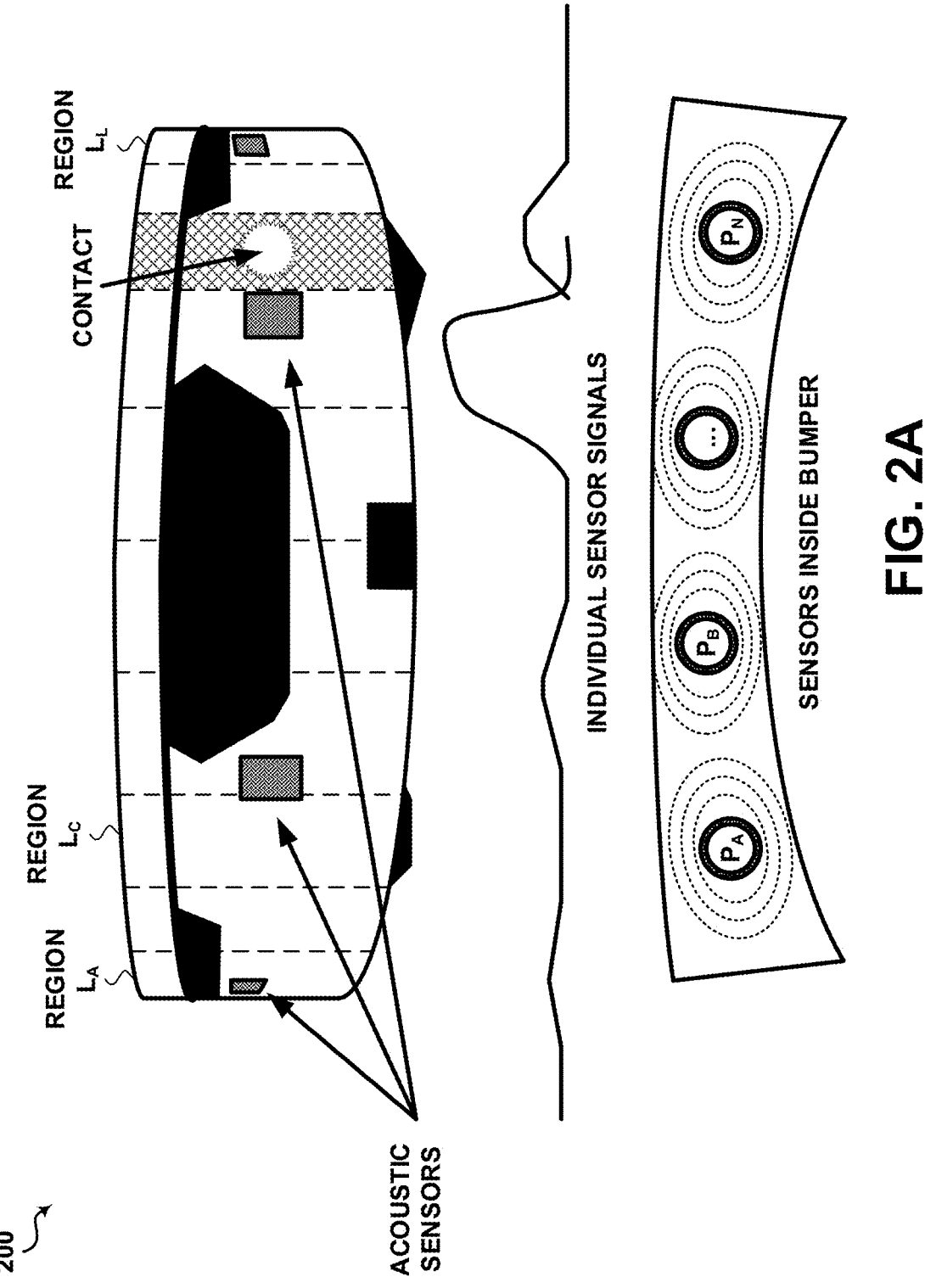
FIG. 2A illustrates an example application of a full-surface contact localization system, in accordance with various aspects of the present disclosure.

FIG. 2A illustrates an example application of a full-surface contact localization system, in accordance with various aspects of the present disclosure.

Referring to FIG. 2A, an example application 200 of the full-surface contact localization system that implements one or more aspects of the present disclosure is illustrated. In some embodiments, at least a portion of the operations and/or functions of the full-surface contact localization system as described with reference to FIG. 2A may be performed by the device 100 of FIG. 1, which may include the contact localization component 180. Alternatively or additionally, another computing device (e.g., a robotic device, a robot controller, a server, a laptop, a smartphone, a UE, a wearable device, a smart device, an IoT device, and the like) that includes the contact localization component 180 may perform at least a portion of the operations and/or functions of the full-surface contact localization system. For example, in some embodiments, the device 100 and the other computing device may perform the operations and/or functions of the full-surface contact localization system in conjunction. That is, the device 100 may perform a portion of the operations and/or functions of the full-surface contact localization system as described with reference to FIG. 2A and a remaining portion may be performed by one or more other computing devices.

As shown in FIG. 2A, the full-surface contact localization system may include one or more acoustic sensors (e.g., first acoustic sensor $P_A$, second acoustic sensor $P_B$, to N-th acoustic sensor $P_N$, where N is a positive integer greater than zero (0)) that may be provided (mounted) on an inner surface of an outside cover (e.g., a bumper) of a robot (e.g., a vacuum cleaner). In some embodiments, the one or more acoustic sensors may be configured to generate mechanical vibrations at a substantially similar and/or the same time that the acoustic sensor is receiving mechanical vibrations. That is, the one or more acoustic sensors may be configured to generate vibrations and sense changes in the acoustic coupling corresponding to a contact. The full-surface contact localization system may analyze the signal variations to localize the contact at a position along the surface of the outside cover. For example, the outside surface of the outside cover may be divided into a plurality of regions (e.g., first region $L_A$, second region $L_B$, third region $L_C$, to L-th region $L_L$, where L is positive integer greater than zero (0) and greater than or equal to N). In such an example, the full-surface contact localization system may classify the region of the contact as being positioned in a region from among the plurality of regions. As used herein, regions may refer to locations of the contact on the outside cover, and thus, the terms regions and locations may be used interchangeably. Alternatively or additionally, the full-surface contact localization system may classify the intensity of the contact to a degree of impact from a plurality of impact degrees (e.g., soft, hard, and the like). Consequently, as the robot navigates in an environment with obstacles, the full-surface contact localization system may detect a contact with an obstacle (e.g., a chair leg, a wall, and the like). Alternatively or additionally, the full-surface contact localization system may localize the contact such that a motion plan may be updated in order to move away from and/or avoid the contact. An example of a navigation scenario is described with reference to FIG. 3.

Each of the one or more acoustic sensors may have a wide sensing area over which the acoustic sensors may be sensitive to contact. Consequently, a relatively small number N of acoustic sensors may be needed to localize contact over an entire surface, where N is a positive integer greater than zero (0) (e.g., N=4). For example, the outside cover of the robot may be divided into L equally spaced regions (e.g., vertical segments) that may be used to localize the detected contact, where L is a positive integer greater than N (e.g., L>N; L=18).

Although FIG. 2A depicts four (4) acoustic sensors provided on the inner surface of the outside cover of the robot, the present disclosure is not limited in this regard. That is, the full-surface contact localization system may include fewer acoustic sensors (e.g., three (3) or less) and/or may include more acoustic sensors (e.g., more than (e.g., five (5) or more). In some embodiments, the number of acoustic sensors may be determined based on design constraints such as, but not limited to, an area (size) of the surface, a type of material of the surface, resolution constraints, and the like. For example, in some embodiments, the number and/or locations of the acoustic sensors on the inner surface of the outside cover of the robot may be determined based on an accuracy threshold being met. That is, the number and/or locations of the acoustic sensors may be determined such that the full-surface contact localization system meets and/or exceeds an accuracy threshold requirement. As another example, the distance between the acoustic sensors may be optimized based on a determined maximum sensing range and/or maximum sensing distance up to which the acoustic sensors meet and/or exceed a predetermined detection sensitivity threshold. That is, the number and/or locations of the acoustic sensors may be determined such that the combined sensing ranges of the acoustic sensors cover a desired area with a minimum number of acoustic sensors. Alternatively and/or additionally, the number and/or locations of the acoustic sensors may be further determined based on a type of material of the outside cover of the robot. That is, the number and/or locations of the acoustic sensors may be determined based on whether the outside cover of the robot includes, but is not limited to, wood, metal, plastic, and/or the like.

Alternatively or additionally, the number and/or shape of the contact regions may not be limited to the plurality of contact regions depicted in FIG. 2A. For example, the outer surface of the outside cover of the robot may be divided into a plurality of regions as illustrated in FIG. 2B. In such an embodiment, the outer surface of the outside cover of the robot may be divided into a plurality of regions including first region $L_{AA}$ to (JK)-th region $L_{JK}$, where J and K are positive integers greater than zero (0). In some embodiments J and K may be equal to a same value. In other optional or additional embodiments, J and K may be different from each other. In another example, the number of regions in the plurality of regions may total L. That is, the full-surface contact localization system may classify the region of the contact as being positioned in a region from among the plurality of regions depicted in FIG. 2B. Although FIG. 2B depicts the regions as being equally sized and spaced for ease of description, the present disclosure is not limited in this regard, and the plurality of regions may include regions of different sizes and/or shapes without departing from the scope of the present disclosure.

Figure 2C:
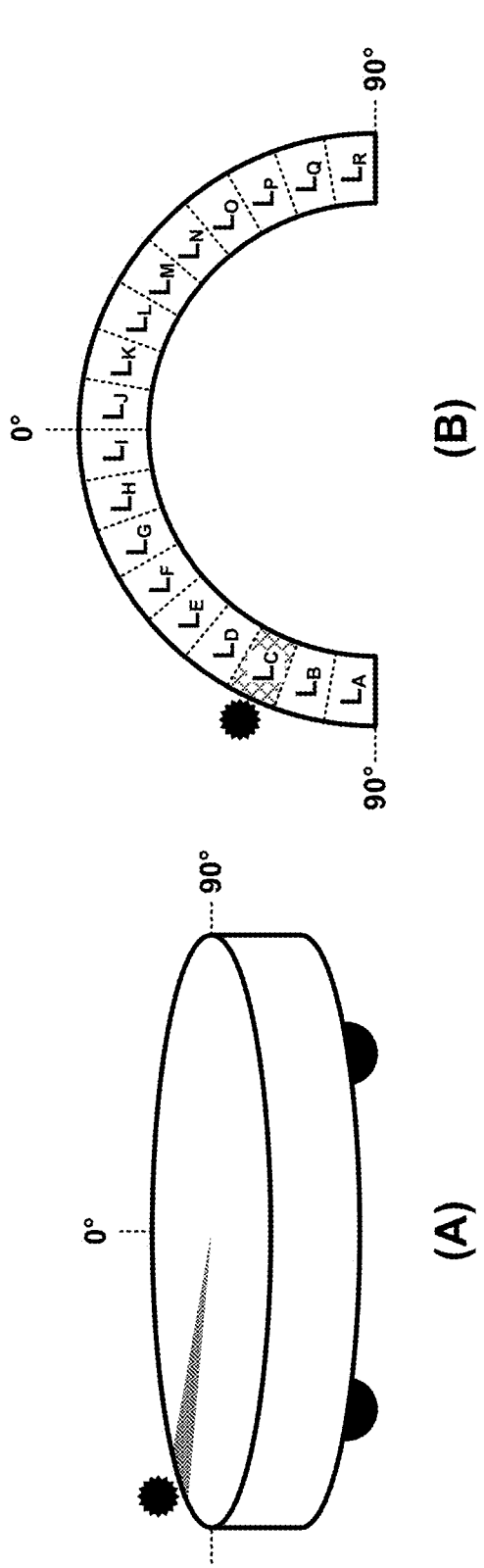
FIG. 2C illustrates an example of contact regions corresponding to angle regions, in accordance with various aspects of the present disclosure.

FIG. 2C illustrates an example of contact regions corresponding to angle regions, in accordance with various aspects of the present disclosure. Referring to FIG. 2C, the full-surface contact localization system may detect a contact an obstacle (e.g., a chair leg, a wall, and the like) by classifying the region of the contact as being positioned in a region from among the plurality of regions (e.g., first region $L_A$ to R-th region $L_R$). In some embodiments, each region of the plurality of regions may be mapped to a corresponding range of angles with respect to a reference location of the outside cover (e.g., bumper) of robot (e.g., vacuum cleaner). That is, in such embodiments, the full-surface contact localization system may provide an indication of a region in which the contact has been detected and/or an indication of an angle region (e.g., range of angles) corresponding to the detected contact.

Table (C) of FIG. 2C shows an example mapping in which the first region $L_A$ corresponds to angles greater than 80° and less than or equal to 90° to the left of the reference location, the second region $L_B$ corresponds to angles greater than 70° and less than or equal to 80° to the left of the reference location, the third region $L_C$ corresponds to angles greater than 60° and less than or equal to 70° to the left of the reference location, the fourth region $L_D$ corresponds to angles greater than 50° and less than or equal to 60° to the left of the reference location, the fifth region $L_E$ corresponds to angles greater than 40° and less than or equal to 50° to the left of the reference location, the sixth region $L_F$ corresponds to angles greater than 30° and less than or equal to 40° to the left of the reference location, the seventh region $L_G$ corresponds to angles greater than 20° and less than or equal to 30° to the left of the reference location, the eighth region Ly corresponds to angles greater than 10° and less than or equal to 20° to the left of the reference location, the nineth region $L_I$ corresponds to angles greater than 0° and less than or equal to 10° to the left of the reference location, the tenth region L corresponds to angles greater than or equal 0° and less than or equal to 10° to the right of the reference location, the eleventh region $L_K$ corresponds to angles greater than 10° and less than or equal to 20° to the right of the reference location, the twelfth region $L_L$ corresponds to angles greater than 20° and less than or equal to 30° to the right of the reference location, the thirteenth region $L_M$ corresponds to angles greater than 30° and less than or equal to 40° to the right of the reference location, the fourteenth region Ly corresponds to angles greater than 40° and less than or equal to 50° to the right of the reference location, the fifteenth region $L_O$ corresponds to angles greater than 50° and less than or equal to 60° to the right of the reference location, the sixteenth region $L_P$ corresponds to angles greater than 60° and less than or equal to 70° to the right of the reference location, the seventeenth region $L_Q$ corresponds to angles greater than 70° and less than or equal to 80° to the right of the reference location, and the eighteenth region $L_R$ corresponds to angles greater than 80° and less than or equal to 90° to the right of the reference location.

For example, as shown in (A) and (B) of FIG. 2C, the full-surface contact localization system may detect a contact at the third region $L_C$, which may be mapped to angles greater than 60° and less than or equal to 70° to the left of the reference location, as shown in Table (C) of FIG. 2C.

It is to be understood that although FIG. 2C depicts a particular mapping of regions to angle ranges for ease of description, the present disclosure is not limited in this regard, and the plurality of regions may additional (e.g., more than 18) regions and/or fewer (e.g., less than 18) regions that may be mapped to different angle ranges without departing from the scope of the present disclosure.

Alternatively or additionally, the area covered by the full-surface contact localization system may be different (e.g., smaller/shorter, larger/longer) than the area depicted by FIG. 2C (e.g., a semicircular portion of a circle). For example, as shown in FIG. 2D, the full-surface contact localization system may be configured to detect a contact around an entirety of an external perimeter of the robot. In an embodiment, the external perimeter may be divided into eight (8) regions (e.g., first region $L_A$, second region $L_B$, third region $L_C$, fourth region $L_D$, fifth region $L_E$, sixth region $L_F$, seventh region $L_G$, and eighth region $L_H$). In such an embodiment, the first region $L_A$ may be mapped to angles greater than or equal to 0° and less than 45°, the second region $L_B$ may be mapped to angles greater than or equal to 45° and less than 90°, the third region $L_C$ may be mapped to angles greater than or equal to 90° and less than 135°, the fourth region $L_D$ may be mapped to angles greater than or equal to 135° and less than 180°, the fifth region $L_E$ may be mapped to angles greater than or equal to 180° and less than 225°, the sixth region $L_F$ may be mapped to angles greater than or equal to 225° and less than 270°, the seventh region $L_G$ may be mapped to angles greater than or equal to 270° and less than 315°, and the eighth region $L_H$ may be mapped to angles greater than or equal to 315° and less than 360° (0°). However, the present disclosure is not limited in this regard, and the external perimeter of the robot may be divided into a different number of regions and/or different angle ranges.

In some embodiments, at least one portion of the external perimeter of the robot may be designated as a region in which contacts are not detected, as shown in FIG. 2E. That is, the plurality of acoustic sensors may be placed in such a manner as to not provide detection coverage within the designated no detection region. Alternatively or additionally, the full-surface contact localization system may be configured (e.g., trained) to prevent detection of contacts (and/or prevent/suppress reporting the detection of contacts) within the designated no detection region.

Referring to FIG. 2F, the external perimeter may be divided into a plurality of regions in which the regions have different sizes (e.g., lengths, angle ranges) that may provide different levels of accuracy across the detection area (e.g., the external perimeter of the robot). For example, as shown in FIG. 2F, the first to fourth regions $L_A$ to $L_D$ may be smaller (e.g., smaller angle range) than other regions, and as such, contacts detected by these regions may have a higher level of accuracy (e.g., smaller margin of error) when compared to other detection regions. As further shown in FIG. 2F, the sixth region $L_F$ may be larger (e.g., larger angle range) than other regions, and as such, a contact detected by this region may have a lower level of accuracy (e.g., larger margin of error) when compared to other detection regions. Alternatively or additionally, a portion of the external perimeter of the robot may be designated as a no detection region.

In some embodiments, the full-surface contact localization system may be configured to group the plurality of regions into groups having one or more regions. As shown in FIG. 2G, the groups may have different numbers of regions and/or may correspond to detection areas having different sizes (e.g., lengths, angle ranges). For example, group $G_A$ may consist of first region $L_A$, group $G_B$ may consist of second region $L_B$, group $G_C$ may consist of third region $L_C$, group $G_D$ may consist of fourth region $L_D$, group $G_E$ may consist of fifth region $L_E$, sixth region $L_F$, seventh region $L_G$, and eighth region $L_H$, and group $G_F$ may consist of thirteenth region $L_M$, fourteenth region $L_N$, fifteenth region $L_O$, and sixteenth region $L_P$. Alternatively or additionally, ninth region $L_I$, tenth region $L_J$, eleventh region $L_K$, and twelfth region $L_L$ may not be assigned to a group and, as such, may be designated as a no detection region/group.

That is, in such an example, the full-surface contact localization system may classify the detection region as being positioned in group $G_A$ when the detection occurs in first region $L_A$, the full-surface contact localization system may classify the detection region as being positioned in group $G_B$ when the detection occurs in second region $L_B$, the full-surface contact localization system may classify the detection region as being positioned in group $G_C$ when the detection occurs in third region $L_C$, the full-surface contact localization system may classify the detection region as being positioned in group $G_D$ when the detection occurs in fourth region $L_D$, the full-surface contact localization system may classify the detection region as being positioned in group $G_E$ when the detection occurs in fifth region $L_E$, sixth region $L_F$, seventh region $L_G$, or eighth region Ly, the full-surface contact localization system may classify the detection region as being positioned in group $G_F$ when the detection occurs in thirteenth region $L_M$, fourteenth region Ly, fifteenth region $L_O$, or sixteenth region $L_P$. Alternatively or additionally, the full-surface contact localization system may not detect (e.g., ignore) and/or report a detection when the detection occurs in ninth region $L_I$, tenth region $L_J$, eleventh region $L_K$, or twelfth region $L_L$.

While the present disclosure may focus on a particular application (e.g., a robot vacuum cleaner) for ease of description, the present disclosure is not limited in this regard. That is, it may be understood that the present disclosure may be applied to various other applications. For example, the present disclosure may be applied to a robotic arm in which contact may be detected and localized along one or more surfaces of the robot (e.g., a robot arm, a robot hand) as the robot interacts with the surrounding environment and/or humans. In such an example, by localizing the contact, the robot motion may be controlled to move away from the contact. As another example, the present disclosure may be applied to an appliance (e.g., a refrigerator, an oven, a washing machine, and the like). In such an example, contact may be detected along a door of the appliance to detect whether the door is properly closed and/or whether the door is ajar. Thus, the aspects described herein may be generally applied to a wide variety of environments, scenarios, and/or implementations that may not be limited to the aspects described herein.

Figure 3:
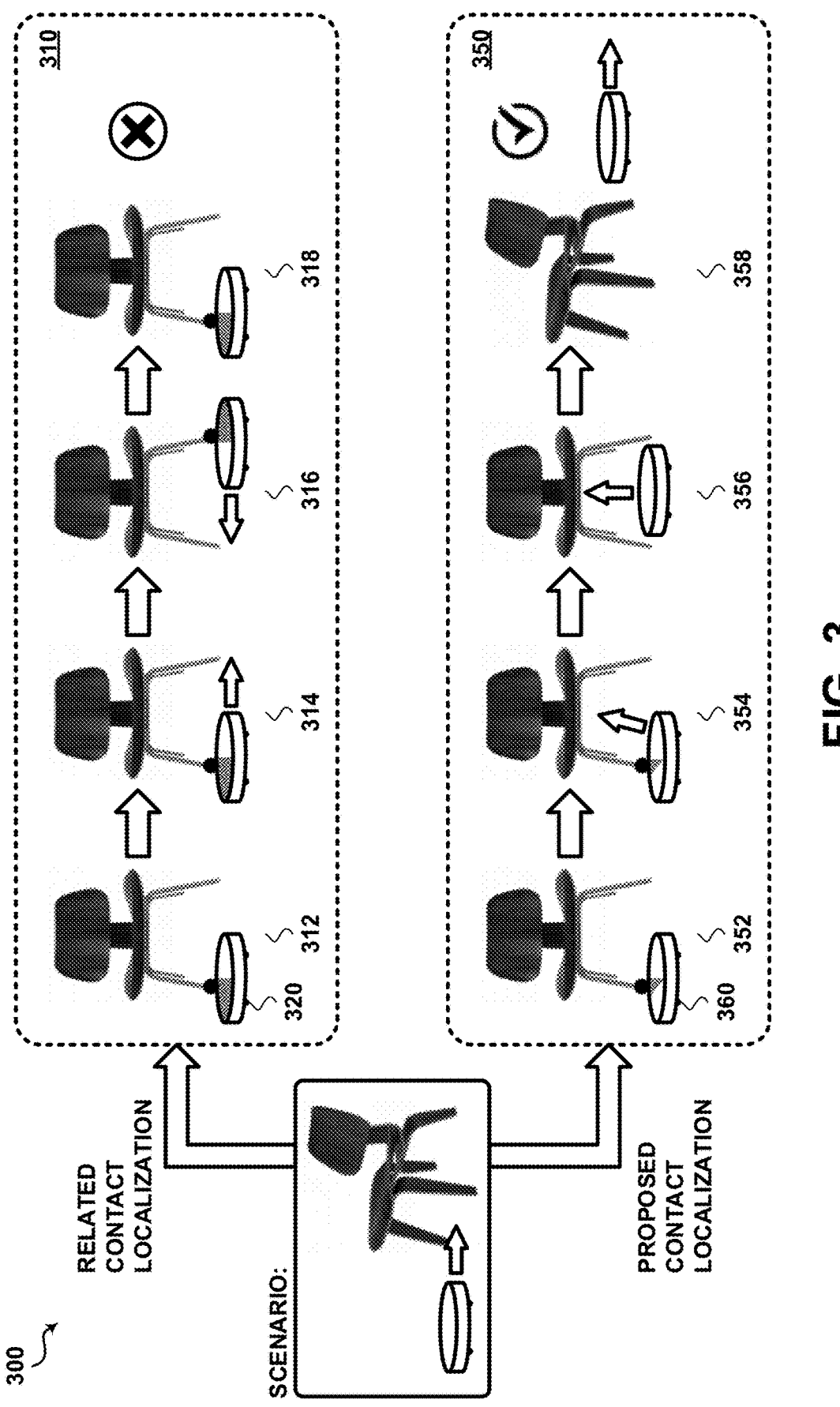
FIG. 3 illustrates an example navigation scenario using the full-surface contact localization system, in accordance with various aspects of the present disclosure.

FIG. 3 illustrates an example navigation scenario using the full-surface contact localization system, in accordance with various aspects of the present disclosure.

Referring to FIG. 3, a navigation scenario 300 of the full-surface contact localization system that implements one or more aspects of the present disclosure is illustrated. In some embodiments, at least a portion of the navigation scenario 300 as described with reference to FIG. 3 may be performed by the device 100 of FIG. 1, which may include the contact localization component 180. Alternatively or additionally, another computing device (e.g., a robotic device, a robot controller, a server, a laptop, a smartphone, a UE, a wearable device, a smart device, an IoT device, and the like) that includes the contact localization component 180 may perform at least a portion of the navigation scenario 300. For example, in some embodiments, the device 100 and the other computing device may perform the navigation scenario 300 in conjunction. That is, the device 100 may perform a portion of the navigation scenario 300 as described with reference to FIG. 3 and a remaining portion of the navigation scenario 300 may be performed by one or more other computing devices.

As shown in FIG. 3, the navigation scenario 300 may include a robot vacuum cleaner attempting to navigate through the legs of a chair. In a related robot vacuum cleaner 320, the navigation 310 of the related robot vacuum cleaner 320 may start with the related robot vacuum cleaner 320 bumping into the left leg of the chair (operation 312). The related robot vacuum cleaner 320 may localize a left side of the related robot vacuum cleaner 320 as the region of the contact with the obstacle and plan to move 90 degrees (90°) to right in order to avoid the obstacle (operation 314). In operation 316, the related robot vacuum cleaner 320 may bump into the right leg of the chair. The related robot vacuum cleaner 320 may localize the second contact to the right side of the related robot vacuum cleaner 320 and plan to move 90° to the left in order to avoid the obstacle. Consequently, the related robot vacuum cleaner 320 may repeatedly bump with the left leg and the right leg of the chair and may not be able to successfully navigate between the chair legs (operation 318).

In some embodiments, a robot vacuum cleaner 360 may include a contact localization component 180. In such embodiments, a navigation 350 of the robot vacuum clear 360 may start with the robot vacuum cleaner 360 bumping into the left leg of the chair (operation 352). The robot vacuum cleaner 360 may, using the full-surface contact localization system, localize the contact within a relatively small resolution (e.g., within 2 cm and/or 10° slice), and accordingly, may plan to move slightly to the right (e.g., 30°) rather than the large direction change (e.g., 90°) determined by the related robot vacuum cleaner 320. In operation 356, the robot vacuum cleaner 360 may continue through the chair legs without hitting the right leg and avoiding the left leg. As a result, the robot vacuum cleaner 360 may successfully navigate through the chair legs without repeatedly bumping the chair legs (operation 358).

That is, related robot vacuum cleaners 320 may detect whether a right side and/or a left side of the robot vacuum cleaner has made contact with an obstacle. Therefore, a navigation and/or path planning functionality of the related robot vacuum cleaners 320 may be provided with sufficient information to adjust movements (e.g., directions) in relatively large steps (e.g., 90° to the right, 90° to the left). Advantageously, aspects described herein provide for a full-surface contact localization system that may localize a contact within a higher resolution (e.g., within 2 cm and/or 10°). Thus, navigation and/or path planning functionality of the robot vacuum cleaners 360 may be provided with sufficient information to adjust movements (e.g., directions) in relatively small steps (e.g., 10° to the right, 10° to the left).

Other navigation scenarios (e.g., motion control) are described with reference to FIG. 11.

Figure 4:
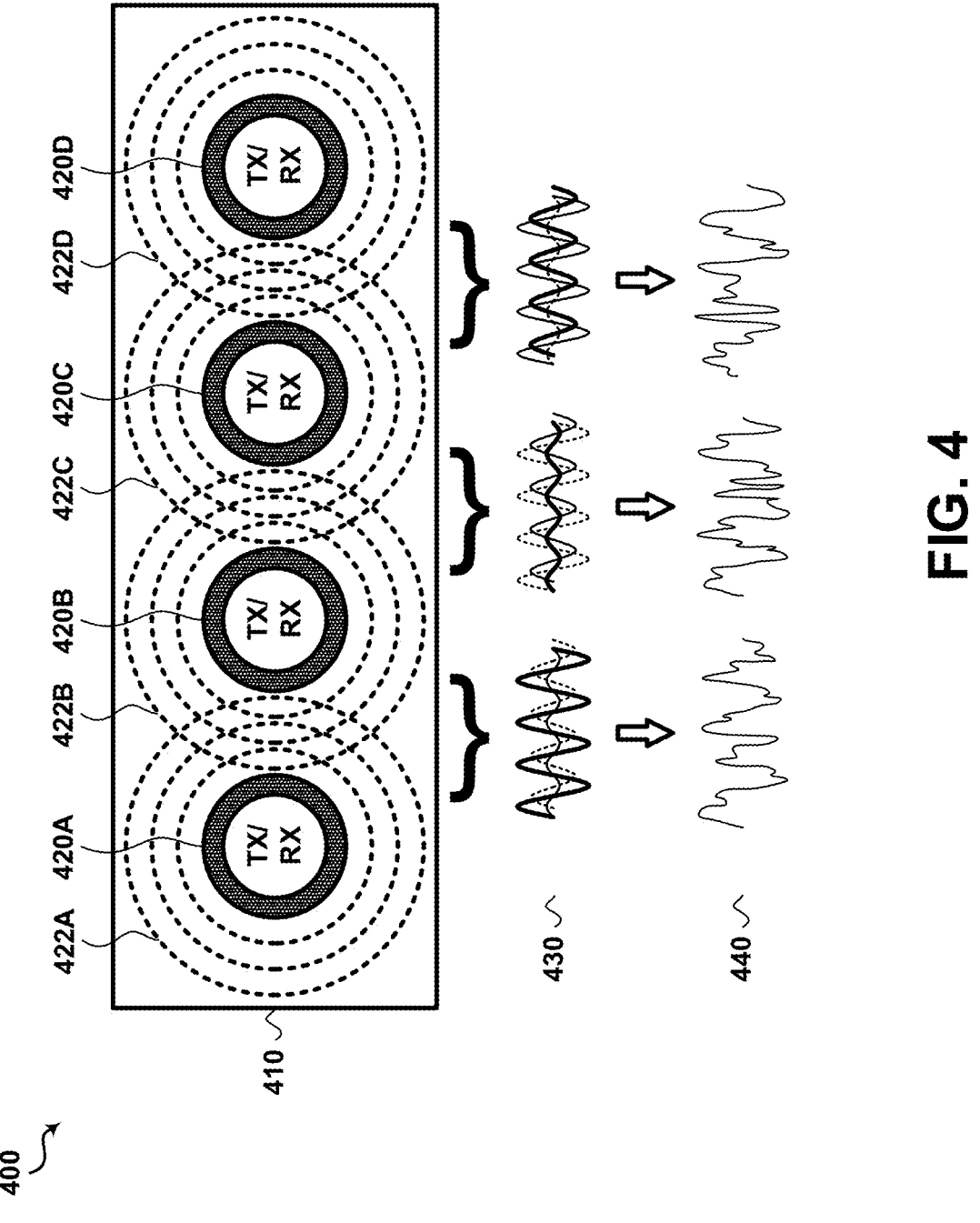
FIG. 4 depicts an example of acoustic signals that may be used to classify a region and an intensity of a contact, in accordance with various aspects of the present disclosure.

FIG. 4 depicts an example of acoustic signals that may be used to classify a region and an intensity of a contact, in accordance with various aspects of the present disclosure.

Referring to FIG. 4, one or more acoustic sensors (e.g., first acoustic sensor 420A, second acoustic sensor 420B, third acoustic sensor 420C, and fourth acoustic sensor 420D, hereinafter generally referred to as "420") may be provided (mounted) on an inner surface of an outside panel 410 (e.g., a bumper) of a device 100 (e.g., a robotic limb, a vacuum cleaner, an appliance, and the like). For example, the acoustic sensor 420 may rest on the inner surface of an outside panel 410 on top of an acoustic layer that may be configured to optimize acoustic generation and transmission from the acoustic sensor 420 to the outside panel 410. Consequently, the full surface of the outside panel 410 may function as an active sensor. In some embodiments, the acoustic layer may be and/or may include an adhesive (e.g., a thermoplastic adhesive) that may attach the acoustic sensor 420 to the outside panel 410. As another example, the acoustic sensor 420 may be mechanically attached to the outside panel 410 (e.g., using one or more screws). However, the present disclosure is not limited in this regard, and other attachment methods may be utilized without departing from the scope of the present disclosure.

In some embodiments, each acoustic sensor 420 may be and/or may include an acoustic transducer such as, but not limited to, a piezoelectric transducer, an ultrasonic piezoelectric transceiver, a ceramic transducer, a crystal transducer, a film transducer, a magnetostrictive transducer, a capacitive transducer, a magnetic coil (e.g., a speaker), and the like. In some embodiments, an ultrasonic piezoelectric transceiver may be preferred due to a low-cost and/or a widespread availability of such types of transducers. As used herein, an acoustic sensor and/or transducer may refer to a device that may convert an applied electric charge to a mechanical vibration (e.g., sound) and/or a device that may convert an incident mechanical vibration into an electrical signal (e.g., voltage, current, impedance, and the like). Alternatively or additionally, the acoustic sensors 420 described herein may generate and/or receive acoustic signals that may be within a human audible range and/or may be outside of the human audible range. Furthermore, the acoustic sensors 420 of the present disclosure may generate and/or receive acoustic signals that may travel via a gas (e.g., air), a liquid, and/or a solid.

The acoustic sensor 420, according to some embodiments, may be configured to generate vibrational energy based on an excitation signal. For example, the acoustic sensor 420 may generate, based on the excitation signal, an acoustic aura and/or acoustic field (e.g., first acoustic aura 422A, second acoustic aura 422B, third acoustic aura 422C, and fourth acoustic aura 422D, hereinafter "422" generally) that may extend in a widespread manner (e.g., substantially omnidirectional) from the acoustic sensor 420. That is, the acoustic aura 422 may extend in substantially every direction (e.g., front/back, up/down, left/right) from the acoustic sensor 420. It is to be understood that the two-dimensional representations of the acoustic aura 422 in FIG. 4 are for example only and are not intended to be limiting. As such, in practice, the acoustic sensor 420 may form a three-dimensional (3D) acoustic aura 422 that may be centered around the acoustic sensor 420. That is, the present disclosure is not limited in this regard.

In some embodiments, the excitation signal provided to the acoustic sensor 420 to generate the acoustic aura 422 may be and/or may include an alternating current (AC) voltage. For example, the excitation signal may have a predetermined monotone frequency (e.g., 40 kilohertz (kHz), several megahertz (MHz), and the like). In some embodiments, the frequency of the excitation signal may be determined based on design constraints such as, but not limited to, the number of acoustic sensors 420, a distance between the acoustic sensors 420, the type of material of the outside panel 410, resolution constraints, and the like. For example, an excitation frequency may be selected that may maximize a signal variation due to contact based on the acoustic response of the acoustic sensors 420, along with any mounting materials, provided on the outside panel 410. Alternatively or additionally, the excitation frequency may be selected to be outside a range of frequencies that may be detected and/or heard by humans (e.g., outside of 20 Hz to 20 KHz). In some embodiments, the excitation frequency may contain one or more frequencies. For example, the excitation signal may be and/or may include a pulse having two or more frequencies.

In some embodiments, the frequency of the excitation signal may be set based on an operating mode of the device 100. For example, the excitation signal frequency may be set to a first frequency when the device 100 is in a first operating mode, and/or the excitation signal frequency may be set to a second frequency, that may be different from the first frequency, when the device 100 is in a second operating mode, as described with reference to FIG. 9. In some optional or additional embodiments, the excitation signal frequency may be set and/or adjusted based on a calibration process as described with reference to FIG. 8.

The acoustic sensors 420 may be operated in a full-duplex mode in which each acoustic sensor 420 may simultaneously generate vibrational energy based on the excitation signal and receive (sense) the reflected acoustic signals from the outside panel 410. Alternatively or additionally, the acoustic sensors 420 may be operated in a half-duplex mode in which the acoustic sensor 420 may separately generate the vibrational energy based on the excitation signal and receive the reflected acoustic signals from the outside panel 410. For example, the acoustic sensor 420 may only generate the vibrational energy based on the excitation signal during transmitting time periods and/or may only receive the reflected acoustic signals during listening time periods. Throughout the present disclosure, the acoustic sensors 420 may be assumed to operate in the full-duplex mode. However, the present disclosure is not limited in this regard. For example, in some embodiments, the acoustic sensors 420 may include a first transducer configured to transmit the vibrational energy and a second transducer configured to receive the reflected acoustic signals. In such embodiments, the acoustic sensors 420 may operate in the full-duplex mode and/or in the half-duplex mode, as described above.

The acoustic sensors 420 may be excited by the excitation signal, which may cause the acoustic sensors 420 to vibrate at a substantially similar and/or the same frequency of the excitation signal. Alternatively or additionally, the acoustic sensors 420 may vibrate at one or more harmonics of the excitation signal. As another example, the acoustic sensors 420 may vibrate at one or more combinations of frequencies (e.g., additions, differences) of the excitation signal. The acoustic coupling between the acoustic sensors 420 and the outside panel 410 may be conducted through a flexible medium (e.g., acoustic layer, thermoplastic adhesive) and may cause the full surface of the outside panel 410 to vibrate in response to the transmitted acoustic waves created by the acoustic sensors 420. That is, the acoustic sensors 420 may cause the outside panel 410 to vibrate at a substantially similar and/or the same frequency of the excitation signal. Consequently, the outside surface of the outside panel 410 may function as a continuous and wide sensing area. Advantageously, a simple mounting strategy of acoustically coupling the acoustic sensors 420 to a back surface of the outside panel 410 may provide for deployment of the full-surface contact localization system on complex surface topologies without the need for surface modifications.

Since the acoustic sensors 420 may be excited simultaneously (and/or at a substantially similar time), the acoustic waves (or acoustic surface waves) 430 from each acoustic sensor 420 may travel through the surface of the outside panel 410 and may combine with each other to create complex signals 440. As used herein, the acoustic surface wave (ASW) may refer to an acoustic wave that propagates through the surface of an object (e.g., outside panel 410). The ASW may travel (propagate) at a speed that may be faster (e.g., greater) than an acoustic wave propagating through a gas (e.g., air). In some embodiments, the complex signals 440 may form a frequency-dependent vibration (e.g., acoustic surface wave) pattern that may be observed over the surface of the outside panel 410. For example, the vibration pattern may be similar to a Chladni pattern. That is, the vibration pattern may consist of nodes and anti-nodes that may spread across the surface of the outside panel 410 in a pattern analogous to Chladni patterns. Consequently, the vibration pattern may enable each acoustic sensor 420 to sense (detect) changes in a wider area when compared to a sensing area of an independent acoustic sensor 420.

The vibration pattern on the surface of the outside panel 410 may depend on a total number of acoustic sensors 420 and their respective mounting locations. For example, a signal magnitude at any location of the outside panel 410 may be a combination of the acoustic waves at that location combined with reflections of the waves bouncing off of surface edges. Therefore, as the total number of acoustic sensors 420 increases, the vibration pattern may increase in complexity, which may provide additional information to determine the region of the signal interference due to a contact.

In some embodiments, the vibration pattern may change when an obstacle (e.g., a human, an animal, an object) comes into contact with the surface of the outside panel 410. The changes to the vibration pattern may remain for the duration of the contact with the surface of the outside panel 410. For example, when the obstacle comes into contact with the surface of the outside panel 410, the obstacle may become acoustically coupled to at least one of the acoustic sensors 420, which may cause the vibration pattern to change. Alternatively or additionally, the change to the vibration pattern may be affected by the amount (level) of force applied to the surface of the outside panel 410. For example, a magnitude of the change to the vibration pattern may be proportional to the amount of force applied at the contact region. That is, the magnitude of the change may increase as the amount of force is increased. However, the present disclosure is not limited in this regard. For example, the magnitude of the change to the vibration pattern and the amount of applied force may exhibit other types of relationships without departing from the scope of the present disclosure.

In addition, when the obstacle stops contacting the surface of the outside panel 410, the vibration pattern may return back to a substantially similar and/or the same pattern (e.g., amplitudes, frequencies) prior to the contact. Therefore, analysis and/or signal processing of the complex signals 440 that generate the vibration pattern may yield information with which to obtain contact detection and localization information. However, analysis of the complex signals 440 and how the complex signals 440 may be affected by a contact on the surface of the outside panel 410 may be challenging to model using related signal processing methods. Consequently, a trained machine learning model may be needed to perform contact detection and localization using the complex signals 440. A full-surface contact localization system utilizing a trained machine learning model, according to some embodiments, is described with reference to FIGS. 5 to 11.

Alternatively or additionally, the vibration pattern on the surface of the outside panel 410 may be affected by other factors such as, but not limited to, material, size, thickness, and shape of the surface. These additional factors may affect the speed of sound in the surface and may influence the wavelengths of the resulting vibration (acoustic wave) pattern, and may govern the positions of the formed nodes and/or anti-nodes. As another example, the material of the obstacle and the size of the area making contact with the surface of the outside panel 410 may disturb the vibration pattern differently, which may lead to dissimilar signal variations.

Figure 5:
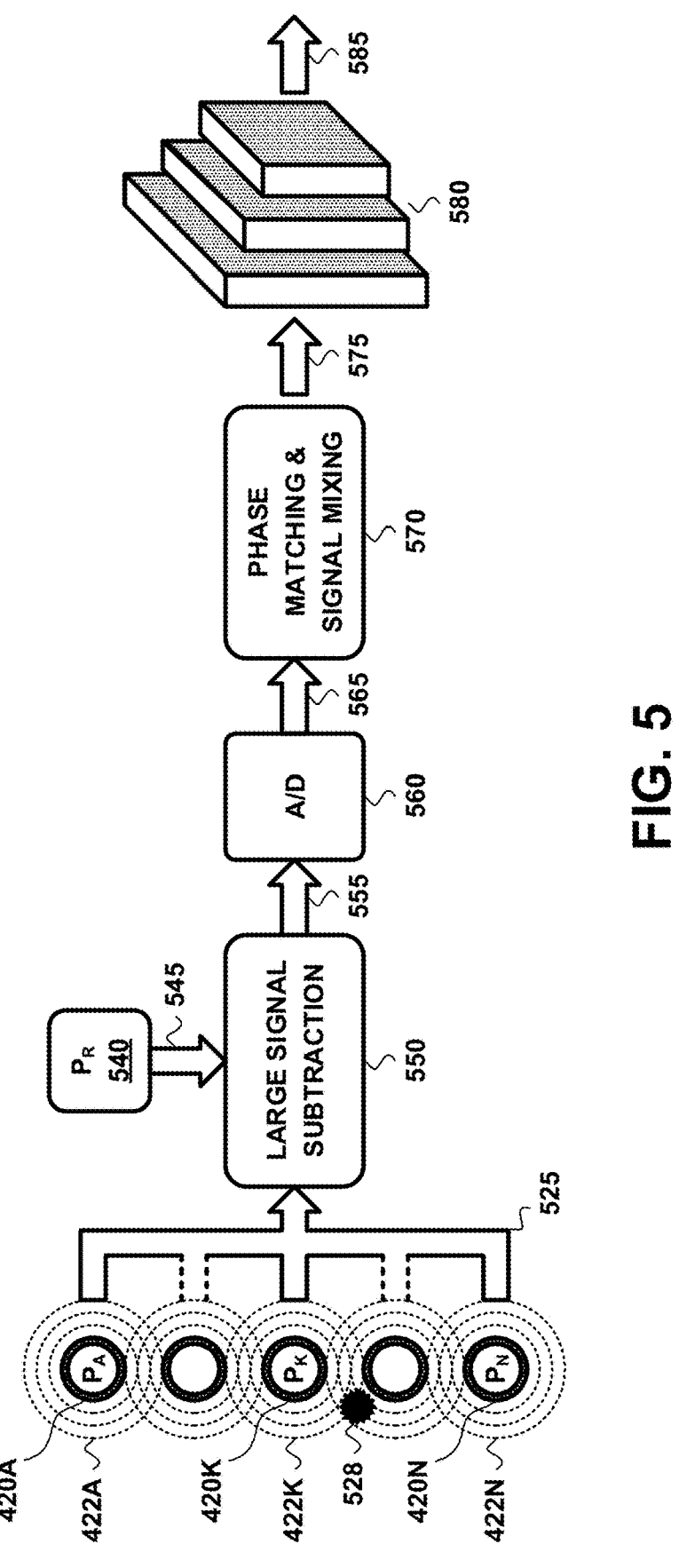
FIG. 5 depicts an example of a block diagram of the full-surface contact localization system, in accordance with various aspects of the present disclosure.

FIG. 5 depicts an example of a block diagram of the full-surface contact localization system, in accordance with various aspects of the present disclosure.

Referring to FIG. 5, a block diagram of the full-surface contact localization system 500 that implements one or more aspects of the present disclosure is illustrated. In some embodiments, at least a portion of the full-surface contact localization system 500 as described with reference to FIG. 5 may be performed by the device 100 of FIG. 1, which may include the contact localization component 180. Alternatively or additionally, another computing device (e.g., a robotic device, a robot controller, a server, a laptop, a smartphone, a UE, a wearable device, a smart device, an IoT device, and the like) that includes the contact localization component 180 may perform at least a portion of the full-surface contact localization system 500. For example, in some embodiments, the device 100 and the other computing device may perform the full-surface contact localization system 500 in conjunction. That is, the device 100 may perform a portion of the full-surface contact localization system 500 as described with reference to FIG. 5 and a remaining portion of the full-surface contact localization system 500 may be performed by one or more other computing devices.

In some embodiments, the full-surface contact localization system 500 depicted in FIG. 5 may be used to implement at least a portion of at least one of the example application 200 of FIG. 2A, and the navigation scenario 300 of FIG. 3, and may include additional features not mentioned above.

As shown in FIG. 5, the full-surface contact localization system 500 may include one or more acoustic sensors (e.g., first acoustic sensor 420A, $P_A$, to K-th acoustic sensor 420K, $P_K$, to N-th acoustic sensor 420N, $P_N$, where K is a positive integer less than N, hereinafter generally referred to as "420"), a reference acoustic sensor 540, $P_R$, a large signal subtraction component 550, an analog-to-digital (A/D) conversion component 560, a phase matching and signal mixing component 570, and a detection and localization component 580.

The one or more acoustic sensors 420 may be provided (mounted) on an inner surface of an outside panel 410 (e.g., bumper) of a device 100 (e.g., a robotic arm, a vacuum cleaner, an appliance) and may be excited with an excitation signal that may cause the outside panel 410 to vibrate, as described with reference to FIG. 4. The one or more acoustic sensors 420 may sense the vibration (acoustic wave) pattern of the outside panel 410, that may be affected by contact 528, and provide N raw signals 525 to the large signal subtraction component 550. In some embodiments, the one or more acoustic sensors 420 may continuously provide the N raw signals 525 to the large signal subtraction component 550. In optional or additional embodiments, the one or more acoustic sensors 420 may periodically (e.g., during listening time periods) provide the N raw signals 525 to the large signal subtraction component 550. That is, the one or more acoustic sensors 420 may provide at least one acoustic signal (e.g., raw signal 525).

In a case in which the one or more acoustic sensors 420 are operating in a full-duplex mode (e.g., simultaneously transmitting the excitation signal and receiving the vibration pattern), the N raw signals 525 may include a copy of the transmitted excitation signal along with the received vibration pattern, which may appear as undulations in the N raw signals 525. For example, the received vibration pattern may appear as increases and/or decreases in the amplitude (and/or phase) of the N raw signals 525.

The large signal subtraction component 550 may compare each raw signal 525 from each acoustic sensor 420 with a reference acoustic signal 545 provided by the reference acoustic sensor 540, $P_R$, in order to extract the received vibration pattern from the N raw signals 525. The reference acoustic sensor 540, $P_R$, may be and/or may include an acoustic sensor that may be substantially similar and/or the same as an acoustic sensor 420. The reference acoustic sensor 540, $P_R$, may be provided with a substantially similar and/or the same excitation signal as the one or more acoustic sensors 420. In some embodiments, the reference acoustic sensor 540, $P_R$, may not be provided (mounted) on the outside panel 410. For example, the reference acoustic sensor 540, $P_R$, may be provided in a different location within the device 100.

In some embodiments, the large signal subtraction component 550 may measure and output N analog difference signals 555 that may indicate differences between the reference acoustic signal 545 provided by the reference acoustic sensor 540, $P_R$, and a corresponding raw signal 525 received from each of the one or more acoustic sensors 420. That is, the large signal subtraction component 550 may provide N analog difference signals 555 that may be proportional to the undulations of the N raw signals 525 that may be caused by the received vibration pattern. In some embodiments, the large signal subtraction component 550 may demodulate the N raw signals 525 with the reference acoustic signal 545. However, the present disclosure is not limited in this regard. For example, the large signal subtraction component 550 may demodulate the N raw signals 525 with one or more harmonics of the reference acoustic signal 545. As another example, the large signal subtraction component 550 may demodulate the N raw signals 525 with the product of the reference acoustic signal 545 and another signal (e.g., similar to having a carrier frequency modulated with a data signal). That is, the reference signals (e.g., reference acoustic signal 545) and the demodulation configuration of the N raw signals 525 may be varied according to design constraints, such as, but not limited to, the detection of non-linear reflection properties, without departing from the scope of the present disclosure.

The A/D conversion component 560 may be configured to perform an analog-to-digital conversion (ADC) of the N analog difference signals 555 to generate N digital difference signals 565. In some embodiments, the A/D conversion component 560 may perform the ADC on a low frequency portion (e.g., less than a predetermined frequency) of the N analog difference signals 555. The A/D conversion component 560 may provide the N digital difference signals 565 to the phase matching and signal mixing component 570 to perform signal processing.

The phase matching and signal mixing component 570 may be configured to perform one or more signal processing operations on the N digital difference signals 565. For example, the phase matching and signal mixing component 570 may shift the phase of each of the N digital difference signals 565. As another example, the phase matching and signal mixing component 570 may mix the N phase-shifted digital difference signals 565 with a copy of the excitation signal to further correct for phase shifting caused by the acoustic sensors 420. In some embodiments, the phase matching and signal mixing component 570 may apply a low-pass filter to the phase corrected digital difference signals 565 to obtain signal variations that may be caused by the contact 528. That is, in a case in which the acoustic sensors 420 are excited using a substantially similar and/or the same excitation signal (e.g., having the same excitation frequency), applying the low-pass filter to the phase corrected digital difference signals 565 may result in an output signal with only amplitude variations (e.g., no frequency variations) in the signal. In optional or additional embodiments, the phase matching and signal mixing component 570 may compute Fourier Transforms (FT) of the N filtered phase corrected digital difference signals 565 to generate N signal magnitudes 575 corresponding to each of the one or more acoustic sensors 420. The phase matching and signal mixing component 570 may provide the N signal magnitudes 575 to the detection and localization component 580 for mapping the N signal magnitudes 575 to a region of the contact 528 from among a plurality of L contact regions along the outside panel 410 and an intensity of the contact 528, where L is a positive integer greater than N (e.g., L>N). In some embodiments, the N signal magnitudes 575 may only be provided to the detection and localization component 580 when the N signal magnitudes 575 exceed a predetermined change threshold. For example, the N signal magnitudes 575 may be provided to the detection and localization component 580 when the N signal magnitudes 575 indicate that a contact has occurred. Alternatively or additionally, the N signal magnitudes 575 may not be provided to the detection and localization component 580 when the N signal magnitudes 575 indicate that a contact has not occurred. In optional or additional embodiments, the N signal magnitudes 575 may be provided to the detection and localization component 580 whether or not the N signal magnitudes 575 indicate that a contact has occurred.

The detection and localization component 580 may be configured to classify the region and the intensity of the contact 528 based on the spectral data contained by the N signal magnitudes 575. The detection and localization component 580 may be and/or may include a trained machine learning model such as, but not limited to, a Multi-Layer Perceptron (MLP), and the like. However, the present disclosure is not limited in this regard, and other networks and/or models may be used without departing from the scope of the present disclosure. Notably, the aspects presented herein may be employed with any network and/or model capable of providing region and intensity of a contact from signal magnitudes. In some embodiments, the trained machine learning model may be trained using a dataset containing N signal magnitudes from N acoustic sensors in which a contact has been applied at a plurality of contact regions corresponding to each of the L contact regions corresponding to the outside panel 410 at various amounts of force (e.g., about 2 to 20 N). Consequently, during an inference and/or testing period following the training period, the trained machine learning model may provide a mapping of the region of the contact 528 to at least one region of the plurality of L contact regions corresponding to the outside panel 410 and a classification of the intensity of the contact 528 based on the N signal magnitudes 575.

The detection and localization component 580 may determine, by using the trained machine learning model, a region of the contact 528 from among a plurality of L contact regions along the outside panel 410, and an intensity (e.g., force level) of the contact 528, based on the provided N signal magnitudes 575. That is, the detection and localization component 580 may output contact information 585 that may include the region (e.g., position, group, angle) of the contact 528 and/or the intensity of the contact 528.

In some embodiments, the trained machine learning model may be trained to predict a region of the contact 528 from among a plurality of L contact regions along the outside panel 410 that may be equally sized (e.g., same length and/or angle range as shown in FIGS. 2B to 2D). Alternatively or additionally, the trained machine learning model may be trained to suppress detection of contacts occurring in one or more regions. That is, the trained machine learning model may designate one or more region as a no detection region as described with reference to FIG. 2E. In optional or additional embodiments, the trained machine learning model may be trained to predict a region of the contact 528 from among a plurality of L contact regions that may have different sizes (e.g., different lengths and/or angle ranges) as depicted in FIG. 2F. In some embodiments, the trained machine learning model may be trained to group one or more regions into a group as described with reference to FIG. 2G. Alternatively or additionally, the grouping of the regions may be performed by the detection and localization component 580 outside of the trained machine learning model.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Alternatively or additionally, a set of (one or more) components shown in FIG. 5 may perform one or more functions described as being performed by another set of components shown in FIG. 5.

Figure 6A:
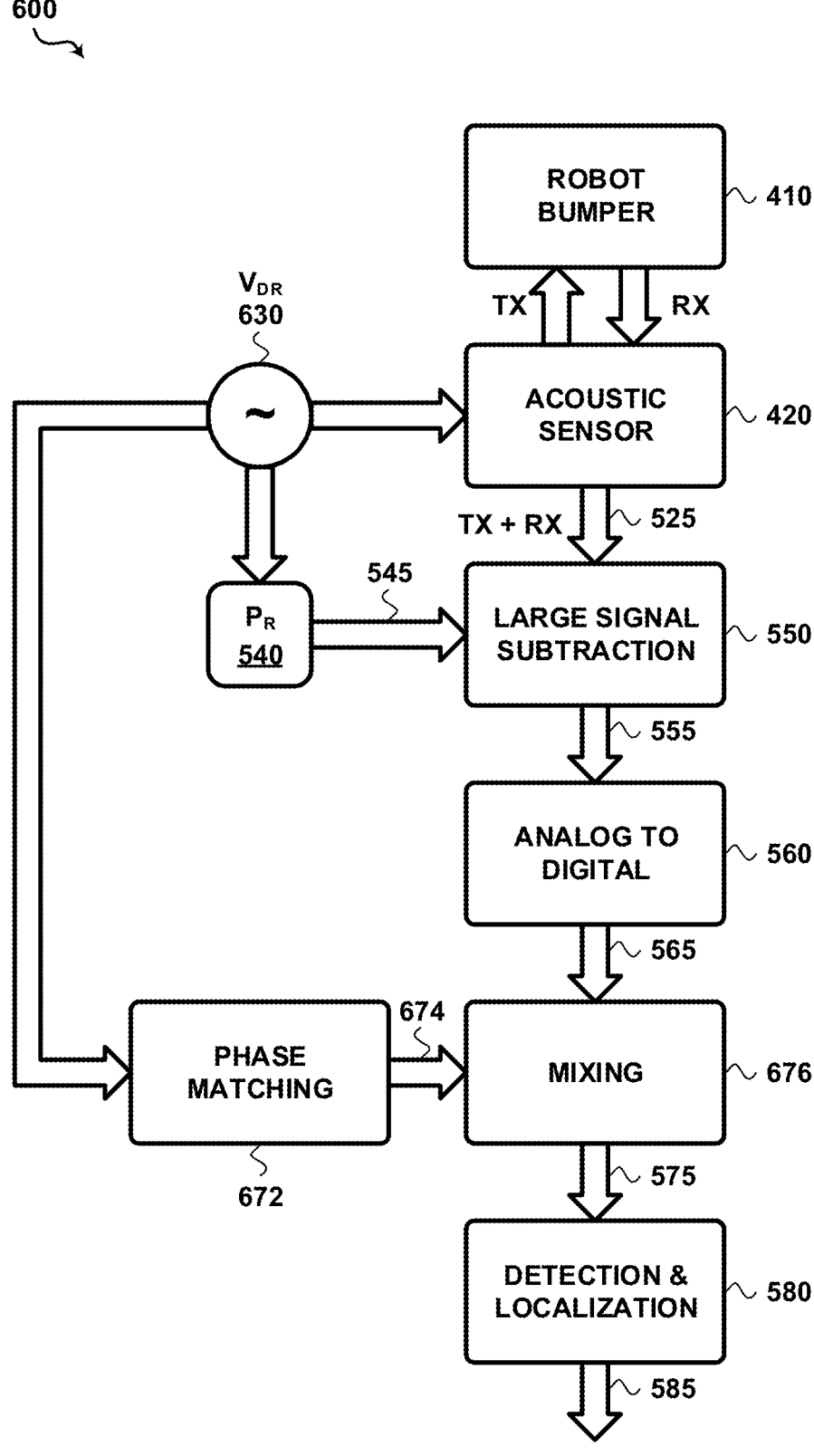
FIG. 6A illustrates an example of a data flow diagram of the full-surface contact localization system, in accordance with various aspects of the present disclosure.

FIG. 6A illustrates an example of a data flow diagram of the full-surface contact localization system, in accordance with various aspects of the present disclosure.

Referring to FIG. 6A, a data flow diagram 600 of the full-surface contact localization system 500 that implements one or more aspects of the present disclosure is illustrated. In some embodiments, at least a portion of the data flow diagram 600 as described with reference to FIG. 6A may be performed by the device 100 of FIG. 1, which may include the contact localization component 180. Alternatively or additionally, another computing device (e.g., a robotic device, a robot controller, a server, a laptop, a smartphone, a UE, a wearable device, a smart device, an IoT device, and the like) that includes the contact localization component 180 may perform at least a portion of the data flow diagram 600. For example, in some embodiments, the device 100 and the other computing device may perform the data flow diagram 600 in conjunction. That is, the device 100 may perform a portion of the data flow diagram 600 as described with reference to FIG. 6A and a remaining portion of the data flow diagram 600 may be performed by one or more other computing devices.

In some embodiments, the data flow diagram 600 depicted in FIG. 6A may be used to implement at least a portion of at least one of the example application 200 of FIG. 2A, the navigation scenario 300 of FIG. 3, and the full-surface contact localization system 500 of FIG. 5, and may include additional features not mentioned above.

As shown in FIG. 6A, an excitation signal 630, $V_{DR}$, may be used to drive the one or more acoustic sensors 420 and the reference acoustic sensor 540, $P_R$. In some embodiments, the excitation signal 630, $V_{DR}$, may be amplified using a pre-amplification stage 700 as described with reference to FIG. 7A.

Figure 7A:
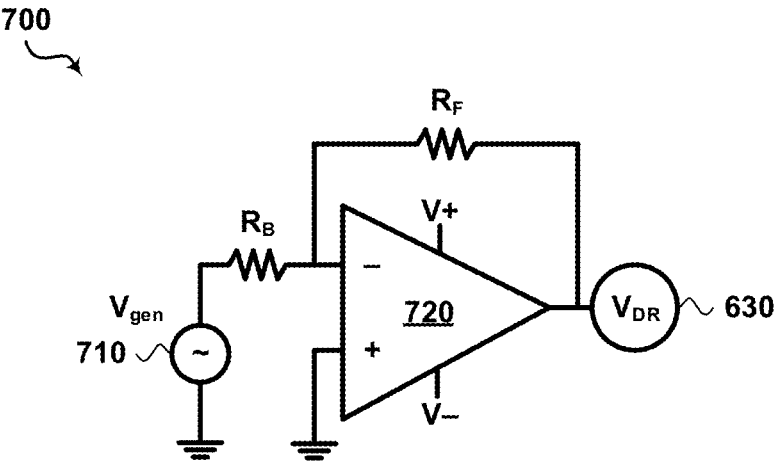
FIG. 7A depicts an example of a pre-amplification stage, in accordance with various aspects of the present disclosure.

Referring to FIG. 7A, a signal generator 710 may output a source signal $V_{gen}$ at an excitation frequency that may be input to a pre-amplifier stage 720 to generate the excitation signal 630, $V_{DR}$. In some embodiments, the resistors RB and RF may each have an impedance of about 100 kiloohms (kΩ). However, the present disclosure is not limited in this regard, and the pre-amplification stage 700 may have resistors having other impedance values.

Returning to FIG. 6A, the excitation signal 630, $V_{DR}$, may be applied to the acoustic sensor 420. As described with reference to FIG. 4, the acoustic sensor 420 may generate acoustic waves (vibrations) at a frequency that is substantially similar and/or the same as the excitation frequency of the excitation signal 630, $V_{DR}$-Consequently, the acoustic sensor 420 may cause the robot bumper 410 to vibrate and form a vibration (acoustic wave) pattern across the surface of the robot bumper 410. The one or more acoustic sensors 420 may sense the vibration pattern of the robot bumper 410, that may be affected by a contact (e.g., contact 528 of FIG. 5), and provide a raw signal 525 to the large signal subtraction component 550. For example, the excited acoustic sensor 420 may output a constant base voltage in the absence of a contact. However, upon contact, the amplitude and/or phase of the base voltage may vary by a relatively small amount.

The large signal subtraction component 550 may be configured to detect these minute variations in the presence of a large non-zero base voltage signal. For example, the reference acoustic sensor 540, $P_R$, may be mounted on a similar material as the one or more acoustic sensors 420 but may be independent of and/or not attached to the robot bumper 410. As such, the reference acoustic signal 545 generated by reference acoustic sensor 540, $P_R$, may be subtracted from the raw signal 525, which may cancel out the common non-zero base signal, and extract the variations due to the contact 528.

Figure 7B:
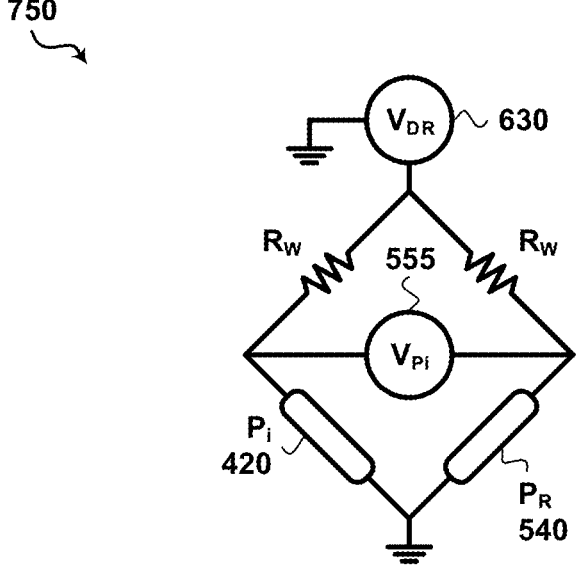
FIG. 7B illustrates an example of a large signal subtraction circuit, in accordance with various aspects of the present disclosure.

Referring to FIG. 7B, an example of a large signal subtraction circuit 550, in accordance with various aspects of the present disclosure, is illustrated. As shown in FIG. 7B, the excitation signal 630, $V_{DR}$, may be applied to several voltage dividers each consisting of a fixed resistance Ry in series with an acoustic sensor 420, $P_i$. The value of $R_W$ may be selected to match an impedance of the acoustic sensors 420. For example, the resistor $R_W$ may have an impedance of about 2.2 kΩ, but the present disclosure is not limited in this regard. The analog difference signal 555, $V_{P_i}$, may be measured across the acoustic sensor 420, $P_i$, and reference acoustic sensor 540, $P_R$. The pair of voltage dividers corresponding to the acoustic sensor 420, $P_i$, and the reference acoustic sensor 540, $P_R$, may form a balanced Wheatstone bridge with $V_{P_i}=V_{P_R}$. However, upon contact 528, the Wheatstone bridge may end up in an unbalanced state with $\Delta V_{P_i}=V_{P_i}-V_{P_R}$ denoting the signal variation due to contact. In some embodiments, $\Delta V_{P_i}$ may be computed using an on-circuit unity gain differential amplifier and may serve as the analog difference signal 555 output from the large signal subtraction circuit 550.

As used herein, a balancing circuit (e.g., a Wheatstone bridge) such as the large signal subtraction circuit 550 may refer to performing a null measurement technique on a circuit containing two voltage dividers from two arms of a bridge that may be excited using a common source voltage. The voltage difference across the two arms (e.g., $\Delta V_{P_i}$) may be considered as the output voltage of the balancing circuit. For example, when the voltage across both the arms is the same, the balancing circuit may be said to be balanced and may produce an output voltage of zero (0) volts (e.g., $V_{P_i}=V_{P_R}$ and $\Delta V_{P_i}=0V$). Alternatively or additionally, a relatively small voltage change in either arm may result in the bridge going out of balance, which may be indicated by a voltage $\Delta V_{P_i}\neq 0V$. The relatively small voltage changes may correspond to changes to the vibration pattern due to the contact 528. That is, performing a null measurement on the at least one acoustic signal may be used to extract spectral data corresponding to the vibration pattern (e.g., acoustic surface wave) in the at least one acoustic signal that may be caused by the contact 528. For example, the spectral data extracted from the at least one acoustic signal may allow for detecting a change in the signal magnitude of the vibration pattern and/or acoustic surface wave that may be caused by the contact 528.

As used herein, spectral data may refer to a collection of individual frequencies and their magnitudes that represent a time-domain signal, such as, but not limited to, the at least one acoustic signal. For example, the time-domain acoustic signal may be represented by a sum of the frequencies present in the acoustic signal that may be referred to as spectral information or data. The terms "frequency domain"

and "spectral data" may be used interchangeably in the present disclosure. In some embodiments, a Fourier transform (e.g., a Fast Fourier Transform (FFT)) may be performed on the time-domain signal to determine the frequencies present in the time-domain signal. Since the contact 528 may cause distinct changes in the amplitude and/or frequency of the time-domain acoustic signals based on the region and/or intensity of the contact, the spectral data (e.g., frequencies and their magnitudes) of the at least one acoustic signal may change similarly (e.g., proportionally) to the changes of the time-domain acoustic signal. Thus, the spectral data of the at least one acoustic signal may be used to differentiate between contact and no-contact situations, as well as, identify a region and/or intensity of a contact.

Returning to FIG. 6A, the analog difference signals 555, $\Delta V_{P_i}$, obtained from the large signal subtraction circuit 550 may be provided to the A/D conversion component 560 to obtain digital difference signals 565, $D_{P_i}$. Alternatively or additionally, the source signal $V_{gen}$ may also be converted from an analog signal to a digital source signal $D_{gen}$.

In some embodiments, the raw signals 525 received from each of the acoustic sensors 420 may be phase shifted because the acoustic sensors 420 may operate as a capacitor that may introduce a phase shift of $\theta=\pi/2$ between the input signals and the output signals of the acoustic sensors 420. In addition, other phase shifts may be caused by mounting of the acoustic sensors and/or by a contact 528, and as such, the effective phase shift of the acoustic sensors 420 may be represented by $\phi=\theta+\delta$, where $\delta$ may denote the additional phase shift components. Consequently, the digital difference signals 565, $D_{P_i}$, may also be phase shifted in relation to the digital source signal $D_{gen}$. Thus, mixing the digital difference signals 565, $D_{P_i}$, with the digital source signal $D_{gen}$ may result in only a portion of the signal variation due to the contact 528 being captured. To that end, a phase matching component 672 may apply a phase correction step to the source signal $V_{gen}$. For example, the phase matching component 672 may compute the approximate average phase $\phi$ of the digital difference signals 565, $D_{P_i}$, and may digitally shift the digital source signal $D_{gen}$ to substantially match the average phase $\phi$. The phase-corrected digital source signal 674 may be denoted by $D_{gen_{pc}}$. In some embodiments, the phase matching component 672 may digitally shift the digital source signal $D_{gen}$ by adding an appropriate delay to the digital source signal $D_{gen}$.

The signal mixing component 676 may digitally mix the digital difference signals 565, $D_{P_i}$, with the phase-corrected digital source signal 674, $D_{gen_{pc}}$. Alternatively or additionally, the signal mixing component 676 may pass the mixed difference signals through a low-pass filter (LPF) to obtain the signal variations that may be due to contact 528 as low frequency changes (e.g., near DC). These mixed and low-passed signals may be represented by an equation similar to Equation 1.

$$M_{P_i}=\mathrm{LowPass}(D_{P_i}\times D_{gen_{pc}}) \qquad \text{[Eq. 1]}$$

In some embodiments, motor noise may be a persistent source of low frequency noise that may affect the operation of the full-surface contact localization system 500. Thus, it may be desirable to identify and filter out motor noise from the mixed signal $M_{P_i}$. In such embodiments, the signal mixing component 676 may analyze the mixed signal $M_{P_i}$ in the frequency domain by performing an FFT and selecting frequency bins in the low-pass band in which the motor noise may be absent. The signal magnitudes in these selected frequency bins may be summed up into a single signal magnitude 575, $S_{P_i}$, for each acoustic sensor 420, which may be used as the output of the signal mixing component 676. For example, the signal magnitude 575, $S_{P_i}$, may be represented by an equation similar to Equation 2.

$$S_{P_i} = \sum_{f_l}^{f_h} FFT(M_{P_i}) \qquad \text{[Eq. 2]}$$

In some embodiments, as described above with reference to FIG. 4, the excitation frequency may contain one or more frequencies. In such embodiments, the signal mixing component 676 may be further configured to separate the one or more frequencies by using tuners, local oscillators, and the like.

Although FIG. 6A depicts the signal mixing component 676 as being located after the A/D conversion component 560, the present disclosure is not limited in this regard. For example, in some embodiments, the signal mixing component 676 may be located prior to the A/D conversion component 560, and may be configured to mix the analog difference signals 555, $\Delta V_{P_i}$, obtained from the large subtraction component 550, with a phase-corrected analog source signal provided by the phase matching component 672. In such embodiments, the signal mixing component 676 perform the signal mixing using analog circuitry to generate analog mixed difference signals. Alternatively or additionally, the signal mixing component 676 may pass the analog mixed difference signals through an LPF circuit to obtain the signal variations that may be due to contact 528 as low frequency changes (e.g., near DC). The filtered analog mixed difference signals may be subsequently digitized by the A/D conversion component 560 and the digitized signals may be provided to the detection and localization component 580 for further processing. That is, various processing analog and/or digital operations may be performed on the analog raw signals 525 prior to providing the processed signals to the detection and localization component 580 without departing from the scope of the present disclosure.

The detection and localization component 580 may be configured to classify the region and the intensity of the contact 528 based on the spectral data contained by the N signal magnitudes $$575, \{S_{P_i}\}_{i=1}^{N},$$

provided by the signal mixing component 676. In some embodiments, the detection and localization component 580 may be configured to classify the region and the intensity of the contact 528 based on a portion of the N signal magnitudes 575. That is, in such embodiments, the detection and localization component 580 may omit at least one of the signal magnitudes 575 from at least one of the acoustic sensors 420.

As described with reference to FIG. 4, the N signal magnitudes 575 may result from a complicated non-linear vibration (acoustic wave) pattern on the sensing surface of the robot bumper 410 that may be difficult to model using related signal processing approaches. In addition, sudden impacts and/or collisions may create dynamic transients that may need to be captured as well. Thus, the detection and localization component 580 may be and/or may include a trained machine learning model such as, but not limited to, a Multi-Layer Perceptron (MLP), and the like. However, the present disclosure is not limited in this regard, and other networks and/or models may be used without departing from the scope of the present disclosure. Notably, the aspects presented herein may be employed with any network and/or model capable of providing region and intensity of a contact from signal magnitudes.

The detection and localization component 580 may determine (or estimate), by using the trained machine learning model, a region of the contact 528 from among a plurality of L contact regions along the outside panel 410, and an intensity (e.g., force level) of the contact 528, based on the spectral data contained by the provided N signal magnitudes $$575, \{S_{P_i}\}_{i=1}^{N}.$$

For example, the trained machine learning model may be trained to identify patterns in the provided N signal magnitudes 575 to predict the region of the contact 528 from among the plurality of L contact regions along the outside panel 410, and/or an intensity (e.g., force level) of the contact 528. That is, the detection and localization component 580 may output contact information 585 that may indicate the region (e.g., position, location, group, angle) of the contact 528 from among the plurality of L contact regions and/or the intensity of the contact 528. For example, as described with reference to FIGS. 2C to 2G, the contact information 585 may indicate a region of the contact 528 that may be mapped to an angle range of the outside panel 410. Alternatively or additionally, the contact information 585 may indicate a group of regions that includes the region of the contact 528. In some embodiments, the detection and localization component 580 may be configured (e.g., the trained machine learning model may be trained) to provide different accuracy (e.g., precision) levels across the along the outside panel 410. In optional or additional embodiments, the detection and localization component 580 may be configured (e.g., the trained machine learning model may be trained) to ignore contacts and/or suppress reporting of contacts in one or more regions from among the plurality of L contact regions.

In some embodiments, the detection and localization component 580 may characterize the intensity of the contact 528 between a light contact and a heavy contact. For example, a light contact may be determined as being a contact with a force level that may be less than a threshold value (e.g., 5 N). As another example, a heavy contact may be determined as being a contact with a force level that may be greater than another threshold value (e.g., 10 N). In other optional or additional embodiments, the detection and localization component 580 may characterize the intensity of the contact 528 from among a plurality of P force levels. For example, the plurality of P force levels may include 2 N, 5 N, 10 N, and 20 N. However, the present disclosure is not limited in this regard, and the plurality of P force levels may include fewer, additional, or different power levels than those described herein.

In some embodiments, the trained machine learning model 580 may consist of a three-layered MLP with fully-connected layers having N-512-128-64-L neurons. That is, the input feature size N may be equal to the number of acoustic sensors in the full-scale contact localization system, and the N signal magnitudes $$575, \{S_{P_i}\}_{i=1}^{N},$$

may be respectively provided to the N nodes of the input feature layer. Alternatively or additionally, the number of output classes L may be equal to the number of contact regions of the outside panel 410.

The trained machine learning model 580 may be trained using a dataset containing sets of N signal magnitudes from N acoustic sensors in which a contact has been applied on the sensing surface at each of the L contact regions at various amounts of force (e.g., 2 N, 5 N, 10 N, and 20 N) for one (1) second using a flat metal contact having a diameter of one (1) cm attached to a digital force gauge. The average summed signal magnitude over the one (1) second may be considered as one input sample. Alternatively or additionally, the trained machine learning model 580 may be trained in an end-to-end manner using a cross-entropy (or logarithmic) loss and an Adam optimizer.

Consequently, during an inference and/or testing period following the training period, the trained machine learning model may provide a mapping of the region of the contact 528 to at least one region of the plurality of L contact regions and a classification of the intensity of the contact 528 based on the N signal magnitudes 575.

In some embodiments, the trained machine learning model may be updated (e.g., further trained) with different and/or additional datasets in order to meet one or more design constraints of the full-surface contact localization system such as, but not limited to, an accuracy threshold for the location of the contact. Alternatively or additionally, the number and/or location of the one or more acoustic sensors may be adjusted (e.g., increased, decreased) based on results provided by the trained machine learning model. That is, the number and/or location of the one or more acoustic sensors may be adjusted such that the trained machine learning model classifies the region of the impact according to the accuracy threshold of the full-surface contact localization system. For example, as shown in Table 1, the mean absolute error (MAE) may be decreased (e.g., the accuracy may be increased) by increasing the number of acoustic sensors used to classify the region of the impact

TABLE 1

| Mean Absolute Error (MAE) for Different Sensor Combinations. | | |
|---|---|---|
| | | Mean Absolute Error |
| One Sensor | $P_1$ | 6.0 |
| | $P_2$ | 6.0 |
| | $P_3$ | 6.0 |
| Two Sensors | $P_1 P_2$ | 2.3 |
| | $P_1 P_3$ | 1.6 |
| | $P_1 P_4$ | 1.0 |
| Three Sensors | $P_1 P_2 P_3$ | 0.1 |
| | $P_1 P_2 P_4$ | 0.1 |
| | $P_1 P_3 P_4$ | 0.1 |
| Four Sensors | $P_1 P_2 P_3 P_4$ | 0.0 |

The number and arrangement of components shown in FIG. 6A are provided as an example. In practice, there may be additional components, fewer components, different components, or differently arranged components than those shown in FIG. 6A. Furthermore, two or more components shown in FIG. 6A may be implemented within a single component, or a single component shown in FIG. 6A may be implemented as multiple, distributed components. Alternatively or additionally, a set of (one or more) components shown in FIG. 6A may perform one or more functions described as being performed by another set of components shown in FIG. 6A.

FIG. 6B illustrates another example of a data flow diagram of the full-surface contact localization system, in accordance with various aspects of the present disclosure.

Referring to FIG. 6A, a data flow diagram 650 of the full-surface contact localization system 500 that implements one or more aspects of the present disclosure is illustrated. In some embodiments, at least a portion of the data flow diagram 650 as described with reference to FIG. 6B may be performed by the device 100 of FIG. 1, which may include the contact localization component 180. Alternatively or additionally, another computing device (e.g., a robotic device, a robot controller, a server, a laptop, a smartphone, a UE, a wearable device, a smart device, an IoT device, and the like) that includes the contact localization component 180 may perform at least a portion of the data flow diagram 650. For example, in some embodiments, the device 100 and the other computing device may perform the data flow diagram 650 in conjunction. That is, the device 100 may perform a portion of the data flow diagram 650 as described with reference to FIG. 6B and a remaining portion of the data flow diagram 650 may be performed by one or more other computing devices.

The data flow diagram 650 may include and/or may be similar in many respects to the data flow diagram 600 described above with reference to FIG. 6A, and may include additional features not mentioned above. Furthermore, one or more components of the data flow diagram 650 may include and/or may be similar in many respects to corresponding components described above with reference to FIG. 6A, and may include additional features not mentioned above. Consequently, repeated descriptions of the data flow diagram 650 described above with reference to FIG. 6A may be omitted for the sake of brevity.

In some embodiments, the data flow diagram 650 depicted in FIG. 6B may be used to implement at least a portion of at least one of the example application 200 of FIG. 2A, the navigation scenario 300 of FIG. 3, and the full-surface contact localization system 500 of FIG. 5, and may include additional features not mentioned above.

As shown in FIG. 6B, the excitation signal $V_{DR}$ 630 may be used to drive one or more acoustic sensors (e.g., first acoustic sensor $P_A$ 420A, second acoustic sensor $P_B$ 420B, third acoustic sensor $P_C$ 420C, and first acoustic sensor $P_D$ 420D, hereinafter generally referred to as "420") and the reference acoustic sensor $P_R$ 540. In some embodiments, the acoustic sensors 420 may generate acoustic waves (vibrations) at a frequency that may be substantially similar and/or the same as the excitation frequency of the excitation signal $V_{DR}$ 630. That is, based on the excitation signal $V_{DR}$ 630, the first acoustic sensor $P_A$ 420A may generate and apply first acoustic waves $Tx_A$ at a first mounting location of the first acoustic sensor $P_A$ 420A on the robot bumper 410, the second acoustic sensor $P_B$ 420B may generate and apply second acoustic waves $Tx_B$ at a second mounting location of the second acoustic sensor $P_B$ 420B on the robot bumper 410, the third acoustic sensor $P_C$ 420C may generate and apply third acoustic waves $Tx_C$ at a third mounting location of the third acoustic sensor $P_C$ 420C on the robot bumper 410, and the fourth acoustic sensor $P_D$ 420D may generate and apply fourth acoustic waves $Tx_D$ at a fourth mounting location of the fourth acoustic sensor $P_D$ 420D on the robot bumper 410. Consequently, the acoustic sensors 420 may cause the robot bumper 410 to vibrate and form a vibration (acoustic wave) pattern across the surface of the robot bumper 410 as represented by the dashed lines in the robot bumper 410 illustrated in FIG. 6B. It is to be understood that the vibration pattern depicted in FIG. 6B is a non-limiting example of a vibration pattern that may be generated by the full-surface contact localization system 500, and that the full-surface contact localization system 500 may generate other vibration patterns without deviating from the scope of the present disclosure.

As described with reference to FIG. 4, each of the acoustic sensors 420 may generate, based on the excitation signal $V_{DR}$ 630, acoustic auras and/or acoustic fields that may extend in a widespread manner (e.g., substantially omnidirectional) from each of the acoustic sensors 420 and may combine with each other to create complex signals (e.g., complex signals 440 of FIG. 4). As a result, each of the acoustic sensors 420 may be able to sense (e.g., detect changes) a wider area when compared to a sensing area of an independent acoustic sensor 420.

For example, the first acoustic sensor $P_A$ 420A may receive a combination of first acoustic signals $Rx_A$ corresponding to the first acoustic waves $Tx_A$ and second acoustic signals $Rx_B$ corresponding to the second acoustic waves $Tx_B$, and as such, the first acoustic sensor $P_A$ 420A may provide a first raw signal 525A that includes the first acoustic waves $Tx_A$, the first acoustic signals $Rx_A$, and the second acoustic signals $Rx_B$ to a first large signal subtraction component 550A. In some embodiments, a signal strength of the received acoustic signals (e.g., first acoustic signals $Rx_A$, second acoustic signals $Rx_B$) may vary based on the relative positions of the corresponding acoustic sensors (e.g., first acoustic sensor $P_A$ 420A, second acoustic sensor $P_B$ 420B). For example, a first signal strength of the first acoustic signals $Rx_A$ received by the first acoustic sensor $P_A$ 420A may be larger (e.g., greater) than a second signal strength of the second acoustic signals $Rx_B$ received by the first acoustic sensor $P_A$ 420A.

As another example, the second acoustic sensor $P_B$ 420B may receive a combination of the second acoustic signals $Rx_B$, the first acoustic signals $Rx_A$, and third acoustic signals $Rx_C$ corresponding to the third acoustic waves $Tx_C$, and as a result, the second acoustic sensor $P_B$ 420B may provide a second raw signal 525B that includes the second acoustic waves $Tx_B$, the second acoustic signals $Rx_B$, the first acoustic signals $Rx_A$, and the third acoustic signals $Rx_C$ to a second large signal subtraction component 550B.

As another example, the third acoustic sensor $P_C$ 420C may receive a combination of the third acoustic signals $Rx_C$, the second acoustic signals $Rx_B$, and fourth acoustic signals $Rx_D$ corresponding to the fourth acoustic waves $Tx_D$, and as such, the third acoustic sensor $P_C$ 420C may provide a third raw signal 525C that includes the third acoustic waves $Tx_C$, the third acoustic signals $Rx_C$, the second acoustic signals $Rx_B$, and the fourth acoustic signals $Rx_D$ to a third large signal subtraction component 550C.

As another example, the fourth acoustic sensor $P_D$ 420D may receive a combination of the fourth acoustic signals $Rx_D$ and the third acoustic signals $Rx_C$, and as such, the fourth acoustic sensor $P_D$ 420D may provide a fourth raw signal 525D that includes the fourth acoustic waves $Tx_D$, the fourth acoustic signals $Rx_D$, and the third acoustic signals $Rx_C$ to a fourth large signal subtraction component 550D.

That is, each of the acoustic sensors 420 may receive a combination of acoustic signals (e.g., complex signals 440 of FIG. 4) that may include acoustic signals caused by that acoustic sensor and by neighboring acoustic sensors. Accordingly, each of the acoustic sensors 420 may have an extended sensing area that may include at least a portion of neighboring sensing areas, when compared to a sensing area of an independent acoustic sensor 420. However, the present disclosure is not limited by these example combinations, and each of the acoustic sensors 420 may receive different combinations of the first to fourth acoustic signals $Rx_A$ to $Rx_D$.

Continuing to refer to FIG. 6B, the first to fourth large signal subtraction components 550A to 550D may receive the first to fourth raw signals 525A to 525D, respectively. As described with reference to FIGS. 6A and 7B, the first to fourth large signal subtraction components 550A to 550D may respectively extract the first to fourth acoustic waves $Tx_A$ to $Tx_D$ from the first to fourth raw signals 525A to 525D, based on the reference acoustic signal 545 provided by the reference acoustic sensor 540. For example, the first large signal subtraction component 550A may provide a first analog difference signal 555A that may be proportional to undulations of the first raw signal 525A, which may be caused by the received combination of the first acoustic signals $Rx_A$ and the second acoustic signals $Rx_B$. As another example, the second large signal subtraction component 550B may provide a second analog difference signal 555B that may be proportional to undulations of the second raw signal 525B, which may be caused by the received combination of the second acoustic signals $Rx_B$, the first acoustic signals $Rx_A$, and the third acoustic signals $Rx_C$. As another example, the third large signal subtraction component 550C may provide a third analog difference signal 555C that may be proportional to undulations of the third raw signal 525C, which may be caused by the received combination of the third acoustic signals $Rx_C$, the second acoustic signals $Rx_B$, and the fourth acoustic signals $Rx_D$. As another example, the fourth large signal subtraction component 550D may provide a fourth analog difference signal 555D that may be proportional to undulations of the fourth raw signal 525D, which may be caused by the received combination of the fourth acoustic signals $Rx_D$ and the third acoustic signals $Rx_C$.

The first to fourth analog difference signals 555A to 555D may be respectively provided to processing components (e.g., first processing component 678A, second processing component 678B, third processing component 678C, and fourth processing component 678D, hereinafter generally referred to as "678"). In an embodiment, the processing components 678 may be configured to process the first to fourth analog difference signals 555A to 555D in a manner similar to those described with reference to the A/D conversion component 560, the phase matching component 672, and the mixing component 676 of FIG. 6A. That is, the processing components 678 may convert the first to fourth analog difference signals 555A to 555D to digital difference signals (e.g., similar to the digital difference signals 565 of FIG. 6A) and digitally mix the digital difference signals with a phase-corrected digital source signal (e.g., similar to the phase-corrected digital source signal 674 of FIG. 6A), and generate signal magnitudes (e.g., first signal magnitudes 575A, second signal magnitudes 575B, third signal magnitudes 575C, and fourth signal magnitudes 575D, hereinafter generally referred to as "575") for each of the acoustic sensors 420.

As shown in FIG. 6B, the first to fourth signal magnitudes 575A to 575D may be provided to the detection and localization component 580 for further processing. The detection and localization component 580 may include and/or may be similar in many respects to the detection and localization component 580 described above with reference to FIGS. 5 and 6A, and may include additional features not mentioned above. Consequently, repeated descriptions of the detection and localization component 580 described above with reference to FIGS. 5 and 6A may be omitted for the sake of brevity.

In some embodiments, the detection and localization component 580 may be configured to process and search for differences between the first to fourth signal magnitudes 575A to 575D. For example, the trained machine learning model of the detection and localization component 580 may be trained to identify patterns in the first to fourth signal magnitudes 575A to 575D to predict the region of the contact 528 from among the plurality of contact regions (e.g., first region $L_A$ to eighteenth region $L_R$) along the outside panel 410, and/or an intensity (e.g., force level) of the contact 528.

Figure 6C:
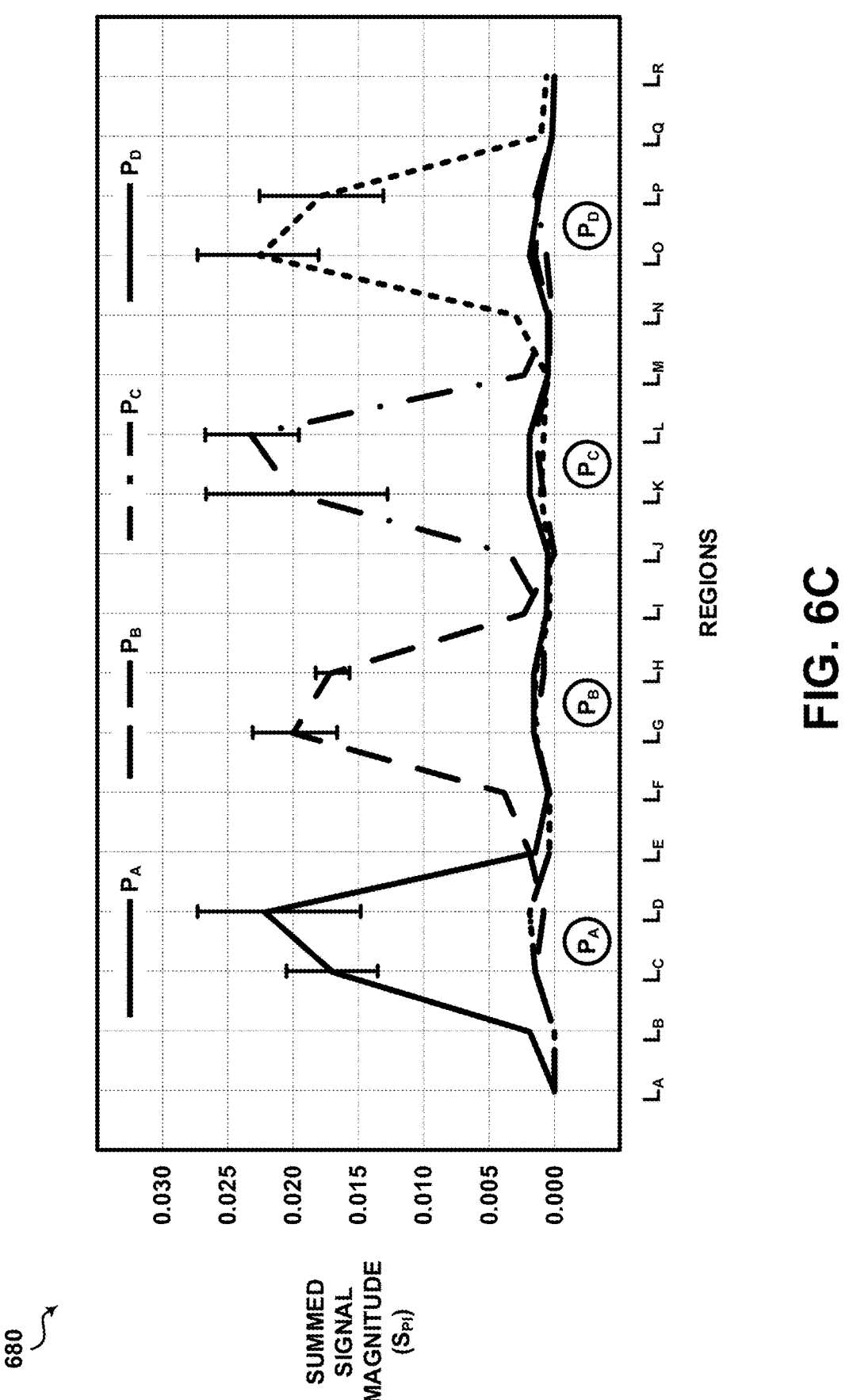
FIG. 6C illustrates an example of summed signal magnitudes for an exemplary full-surface contact localization system, in accordance with various aspects of the present disclosure.

FIG. 6C illustrates an example of summed signal magnitudes for an exemplary full-surface contact localization system, in accordance with various aspects of the present disclosure. Referring to FIG. 6C, the summed signal magnitudes for contacts at eighteen (18) regions (e.g., first region $L_A$ to eighteenth region $L_R$) are depicted.

As shown in FIG. 6C, four (4) acoustic sensors (e.g., first to fourth acoustic sensors $P_A$ to $P_D$) are symmetrically mounted along the length of an acrylic sheet of dimensions 54 centimeters (cm)×6 cm×0.16 cm. The first to eighteenth regions $L_A$ to $L_R$ are separated every three (3) cm and a metal object having a diameter of one (1) cm makes contact with the acrylic sheet. The signal magnitudes depict the sensitivity range of each acoustic sensor. In addition, the vertical bars denote the standard deviation in the recorded signal. As shown in FIG. 6C, four (4) acoustic sensors may be sufficient to cover the entire length (e.g., 54 cm) of the acrylic sheet. That is, the full-surface contact localization system of the present disclosure may accurately determine on which one of eighteen regions covering the length of a sheet a contact occurred using only four (4) acoustic sensors. For example, according to aspects of the present disclosure, one or more region may not be populated by a sensor in order to determine whether the contact occurred at that region.

Referring to FIGS. 6B and 6C together, a contact at the fifteenth region $L_O$ may result in the fourth signal magnitude 575D having a high amplitude and the remaining first to third signal magnitudes 575A to 575C having a lower amplitude. In such an example, the trained machine learning model of the detection and localization component 580 may be trained to identify that such a pattern of the first to fourth signal magnitudes 575A to 575D may correspond to the contact 528 being at the fifteenth region $L_O$. As another example, a contact at the ninth region L may result in the second signal magnitude 575B and the third signal magnitude 575C having a similar amplitude and the remaining first and fourth signal magnitudes 575A and 575D having a relatively low amplitude. In such an example, the trained machine learning model of the detection and localization component 580 may be trained to identify that such a pattern of the first to fourth signal magnitudes 575A to 575D may correspond to the contact 528 being at the ninth region $L_I$. It is to be understood that the trained machine learning model may be trained to identify additional and/or different patterns of the first to fourth signal magnitudes 575A to 575D to predict the region and/or intensity of a contact.

Although FIG. 6B illustrates the data flow diagram 650 as having four (4) acoustic sensors (e.g., first to fourth acoustic sensors 420A to 420D) and the outside panel 410 being divided into eighteen (18) regions (e.g., first region $L_A$ to eighteenth region $L_R$), the present disclosure is not limited in this regard, and the data flow diagram 650 may be implemented with a different number of acoustic sensors and/or locations. Notably, the aspects presented herein may be employed with any full-surface contact localization system in which the number of acoustic sensors is less than the number of regions.

The number and arrangement of components shown in FIG. 6B are provided as an example. In practice, there may be additional components, fewer components, different components, or differently arranged components than those shown in FIG. 6B. Furthermore, two or more components shown in FIG. 6B may be implemented within a single component, or a single component shown in FIG. 6B may be implemented as multiple, distributed components. Alternatively or additionally, a set of (one or more) components shown in FIG. 6B may perform one or more functions described as being performed by another set of components shown in FIG. 6B.

Figure 8:
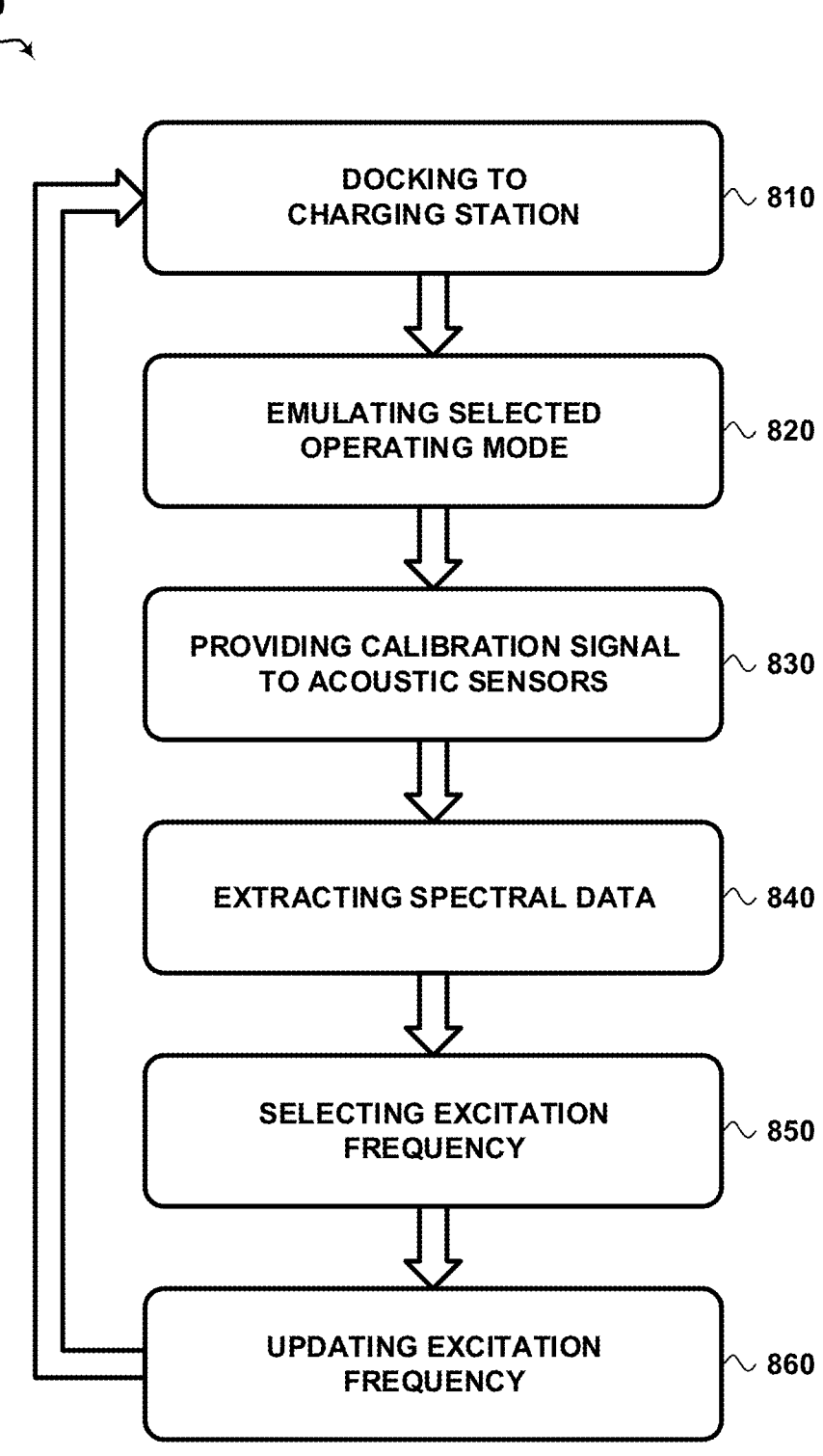
FIG. 8 depicts an example of a calibration process of the full-surface contact localization system, in accordance with various aspects of the present disclosure.

FIG. 8 depicts an example of a calibration process of the full-surface contact localization system 500, in accordance with various aspects of the present disclosure.

Referring to FIG. 8, a calibration process 800 of the full-surface contact localization system 500 that implements one or more aspects of the present disclosure is illustrated. In some embodiments, at least a portion of the calibration process 800 as described with reference to FIG. 8 may be performed by the device 100 of FIG. 1, which may include the contact localization component 180. Alternatively or additionally, another computing device (e.g., a robotic device, a robot controller, a server, a laptop, a smartphone, a UE, a wearable device, a smart device, an IoT device, and the like) that includes the contact localization component 180 may perform at least a portion of the calibration process 800. For example, in some embodiments, the device 100 and the other computing device may perform the calibration process 800 in conjunction. That is, the device 100 may perform a portion of the calibration process 800 as described with reference to FIG. 8 and a remaining portion of the calibration process 800 may be performed by one or more other computing devices.

In some embodiments, the calibration process 800 depicted in FIG. 8 may be used set and/or adjust an excitation frequency of the full-surface contact localization system 500. For example, the performance of the acoustic sensors 420 may be affected after long term use, due to a mechanical defect (e.g., a dent) in the outside panel, and/or contamination on at least one of the acoustic sensors 420, and a more optimal excitation frequency may be selected to restore performance. In some embodiments, the calibration process 800 may be performed while the device 100 (e.g., robot vacuum cleaner, robotic limb, appliance) is charging at a charging station.

In operation 810, the calibration process 800 may include docking at a charging station. Alternatively or additionally, the calibration process 800 includes entering an operating mode in which the calibration process 800 may be performed (e.g., stand-by mode, sleep mode, self-test mode, and the like).

In operation 820, the calibration process 800 may include emulating mode settings for a selected operating mode. That is, the calibration process 800 may include setting the excitation signal frequency to a value corresponding to the excitation signal frequency setting of the selected operating mode. Alternatively or additionally, the calibration process 800 may include setting other mode settings corresponding to the selected operating mode.

In operation 830, the calibration process 800 may include providing a calibration signal to the one or more acoustic sensors 420. That is, the one or more acoustic sensors 420 may be excited with a calibration signal that may cause the outside panel 410 to vibrate, as described with reference to FIG. 4. In some embodiments, the calibration signal may be a chirp signal that may change frequency from a start frequency to an end frequency. The frequency range of the chirp signal may be determined based on various factors that may include the previous excitation frequency, the selected operating mode, mounting configuration of the acoustic sensors 420, and the like.

In operation 840, the calibration process 800 may include extracting spectral data from the digital difference signals $$565, \left\{D_{P_i}\right\}_{i=1}^{N},$$

obtained from the acoustic sensors 420. For example, the calibration process 800 may include analyzing the digital difference signals 575 in the frequency domain by performing a Fast Fourier Transform (FFT).

In operation 850, the calibration process 800 may include selecting an excitation frequency having a highest (e.g., maximum) spectral power in the ultrasonic range, and as such, may maximize a signal variation due to contact based on the acoustic response of the acoustic sensors 420. That is, the excitation frequency may be selected to be outside a range of frequencies that may be detected and/or heard by humans (e.g., outside of 20 Hz to 20 kHz). In some embodiments, the calibration process 800 may include selecting different excitation frequencies for two or more of the acoustic sensors 420.

In operation 860, the calibration process 800 may include updating the excitation frequency corresponding to the mode settings for the selected operating mode of the device 100 to match the selected excitation frequency. That is, the device 100 may use the updated excitation frequency in subsequent operations of the selected operating mode of the device 100. After completing the update, the calibration process 800 may return to operation 810.

Figure 9:
FIG. 9 illustrates an example of an operating mode changing process of the full-surface contact localization system, in accordance with various aspects of the present disclosure.
Figure 9:
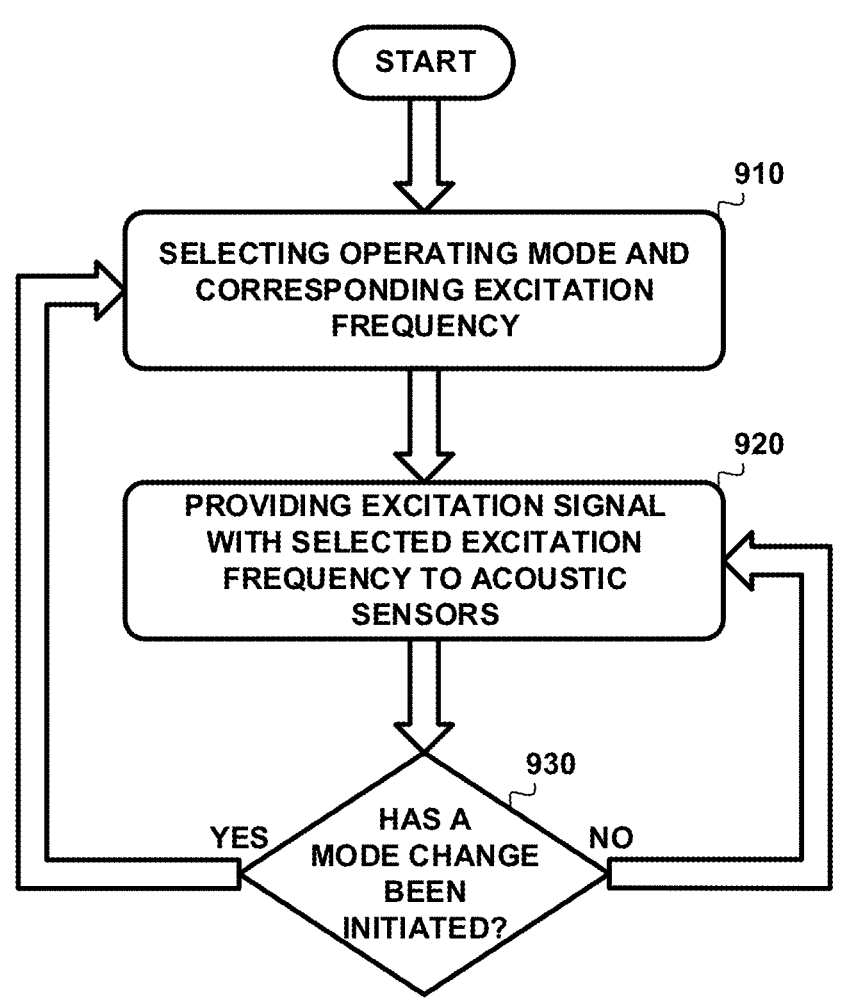

FIG. 9 illustrates an example of an operating mode changing process of the full-surface contact localization system, in accordance with various aspects of the present disclosure.

Referring to FIG. 9, an operating mode changing process 900 of the full-surface contact localization system 500 that implements one or more aspects of the present disclosure is illustrated. In some embodiments, at least a portion of the operating mode changing process 900 as described with reference to FIG. 9 may be performed by the device 100 of FIG. 1, which may include the contact localization component 180. Alternatively or additionally, another computing device (e.g., a robotic device, a robot controller, a server, a laptop, a smartphone, a UE, a wearable device, a smart device, an IoT device, and the like) that includes the contact localization component 180 may perform at least a portion of the calibration process 800. For example, in some embodiments, the device 100 and the other computing device may perform the operating mode changing process 900 in conjunction. That is, the device 100 may perform a portion of the operating mode changing process 900 as described with reference to FIG. 9 and a remaining portion of the operating mode changing process 900 may be performed by one or more other computing devices.

The operating mode changing process 900 depicted in FIG. 9 may be used to change an excitation frequency of the full-surface contact localization system 500 based on a change to the operating mode of the device 100 (e.g., robot vacuum cleaner, robotic limb, appliance). In some embodiments, the device 100 may have multiple operating modes that may have respective excitation frequencies. That is, a first operating mode of the device 100 may utilize a first excitation frequency, and a second operating mode of the device 100 may utilize a second excitation frequency that may be different from the first excitation frequency. For example, in a case where the device 100 is a robot vacuum cleaner, the first operating mode may correspond to a first motion control mode, and the second operating mode may correspond to a second motion control mode that may utilize a different excitation frequency due to design constraints of the second motion control mode. However, the present disclosure is not limited in this regard, and the device 100 may have multiple operating modes and/or multiple excitation frequencies based on other factors. Alternatively or additionally, the device 100 may have one operating mode and one excitation frequency.

In operation 910, the operating mode changing process 900 may include selecting an operating mode of the device 100 and a corresponding excitation frequency. In some embodiments, the corresponding excitation frequency may be been updated by the calibration process 800 of FIG. 8.

In operation 920, the operating mode changing process 900 may include providing an excitation signal with the selected excitation frequency to the one or more acoustic sensors 420. That is, the one or more acoustic sensors 420 may be excited with a calibration signal that may cause the outside panel 410 to vibrate, as described with reference to FIG. 4.

In operation 930, the operating mode changing process 900 may include determining whether an operating mode change has been initiated. Based on a determination that an operating mode change has been initiated (Yes at operation 930), the operating mode changing process 900 may proceed to operation 910 to change the excitation frequency based on the new operating mode. Based on a determination that an operating mode change has not been initiated (No at operation 930), the operating mode changing process 900 may proceed to operation 910 and continue to provide an excitation signal with the selected excitation frequency to the one or more acoustic sensors 420.

Figure 10:
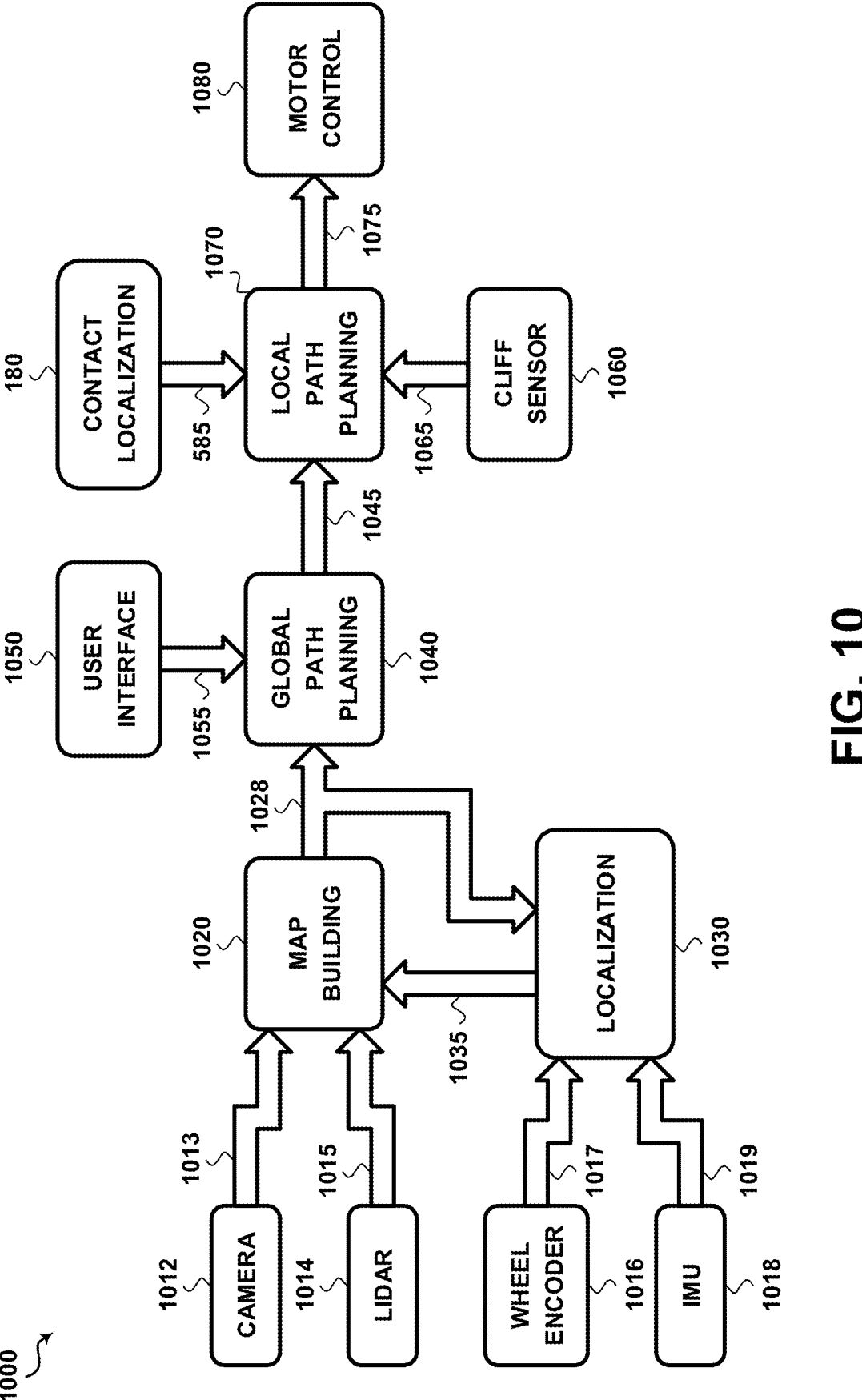
FIG. 10 depicts a block diagram of an example robot control system that incorporates the full-surface contact localization system, in accordance with various aspects of the present disclosure.

FIG. 10 depicts a block diagram of an example robot control system that incorporates the full-surface contact localization system, in accordance with various aspects of the present disclosure.

Referring to FIG. 10, a block diagram of an example robot control system 1000 incorporating the full-surface contact localization system 500 that implements one or more aspects of the present disclosure is illustrated. In some embodiments, at least a portion of the robot control system 1000 as described with reference to FIG. 10 may be performed by the device 100 of FIG. 1, which may include the contact localization component 180. Alternatively or additionally, another computing device (e.g., a robotic device, a robot controller, a server, a laptop, a smartphone, a UE, a wearable device, a smart device, an IoT device, and the like) that includes the contact localization component 180 may perform at least a portion of the robot control system 1000. For example, in some embodiments, the device 100 and the other computing device may perform the robot control system 1000 in conjunction. That is, the device 100 may perform a portion of the robot control system 1000 as described with reference to FIG. 10 and a remaining portion of the robot control system 1000 may be performed by one or more other computing devices.

In some embodiments, the robot control system 1000 depicted in FIG. 10 may be used to implement at least a portion of at least one of the example application 200 of FIG. 2A, the navigation scenario 300 of FIG. 3, and the full-surface contact localization system 500 of FIG. 5, and may include additional features not mentioned above. Alternatively or additionally, the robot control system 1000 may be used to control a robot vacuum cleaner. However, the present disclosure is not limited in this regard, and the robot control system 1000 may be used to control other types of devices such as, but not limited to, robotic limbs, appliances, and the like.

As shown in FIG. 10, the robot control system 1000 may include sensors such as, but not limited to, a camera 1012, a laser imaging, detection, and ranging (LIDAR) component 1014, a wheel encoder 1016, an inertial measurement unit (IMU) 1018, and a cliff sensor 1060.

A localization component 1030 may receive wheel odometry information 1017 from the wheel encoder 1016 and/or a heading angle 1019 from the IMU 1018. The localization component 1030 may provide location information 1035 to a map building component 1020.

The map building component 1020 may receive images 1013 from the camera 1012, pointclouds 1015 from the LIDAR component 1014, and the location information 1035 from the localization component 1030. The map building component 1020 may provide map information 1028 to the localization component 1030 and to a global path planning component 1040.

The global path planning component 1040 may receive the map information 1028 from the localization component 1030 and user commands 1055 from user interface 1050. The global path planning component 1040 may provide way points 1045 to a local path planning component 1070.

The local path planning component 1070 may receive contact information 585 from the contact localization component 180. The contact information 585 may include the location (e.g., region) of the contact 528 and the intensity of the contact 528. The local path planning component 1070 may further receive a floor distance 1065 from the cliff sensor 1060, and the way points 1045 from the global path planning component 1040. The local path planning component 1070 may provide a desired moving direction and speed 1075 to a motor control component 1080

The motor control component 1080 may control a motion of the device 100 (e.g., the robot vacuum cleaner) based on the desired moving direction and speed 1075 provided by the local path planning component 1070.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Alternatively or additionally, a set of (one or more) components shown in FIG. 10 may perform one or more functions described as being performed by another set of components shown in FIG. 10.

Figure 11:
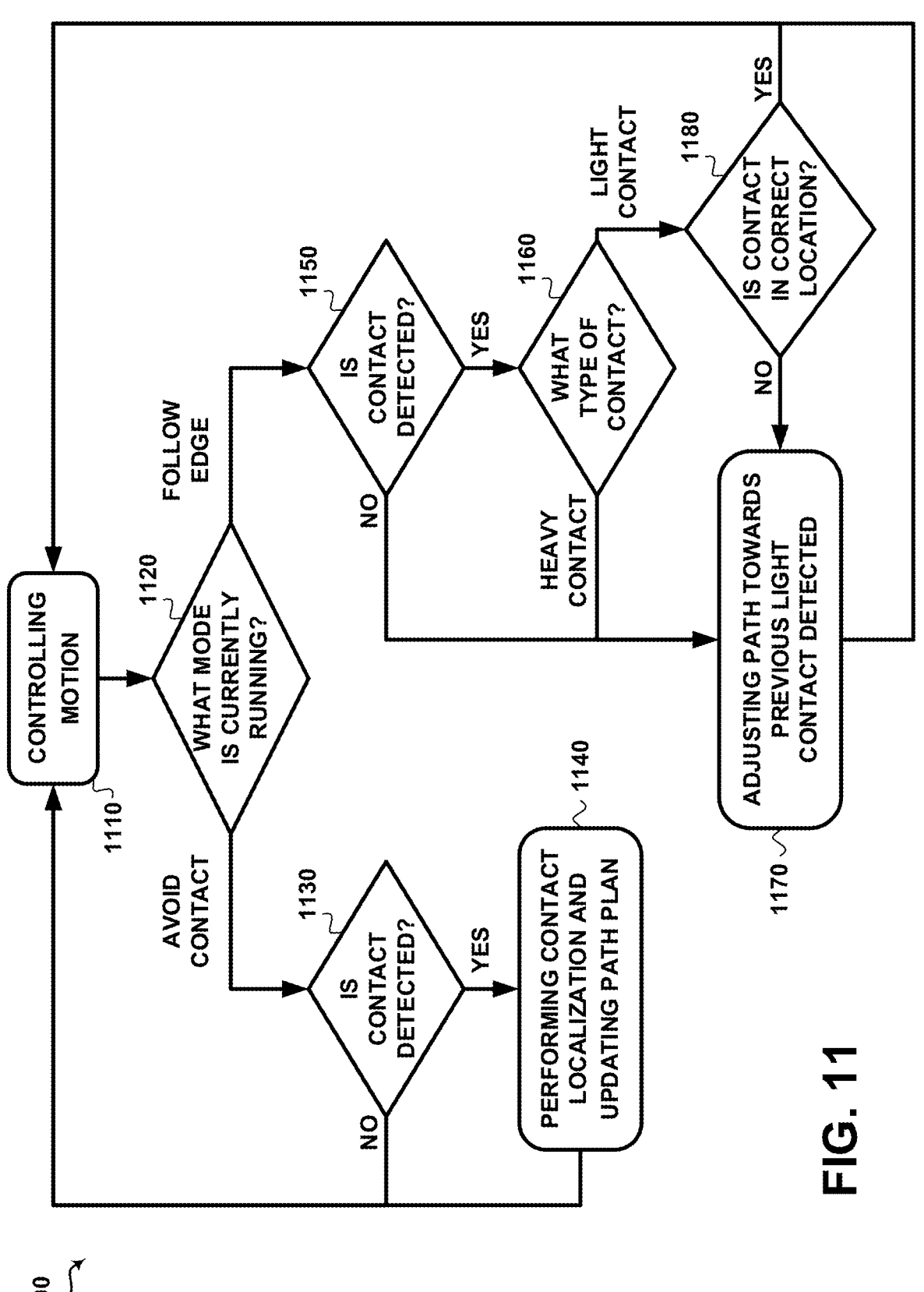
FIG. 11 illustrates a flowchart of an example motion control method, in accordance with various aspects of the present disclosure.

FIG. 11 illustrates a flowchart of an example motion control method, in accordance with various aspects of the present disclosure.

Referring to FIG. 11, a flowchart of an example motion control method 1100 incorporating the full-surface contact localization system 500 that implements one or more aspects of the present disclosure is illustrated. In some embodiments, at least a portion of the motion control method 1100 as described with reference to FIG. 11 may be performed by the device 100 of FIG. 1, which may include the contact localization component 180. Alternatively or additionally, another computing device (e.g., a robotic device, a robot controller, a server, a laptop, a smartphone, a UE, a wearable device, a smart device, an IoT device, and the like) that includes the contact localization component 180 may perform at least a portion of the motion control method 1100. For example, in some embodiments, the device 100 and the other computing device may perform the motion control method 1100 in conjunction. That is, the device 100 may perform a portion of the motion control method 1100 as described with reference to FIG. 11 and a remaining portion of the motion control method 1100 may be performed by one or more other computing devices.

In some embodiments, the motion control method 1100 depicted in FIG. 11 may be used to implement at least a portion of at least one of the example application 200 of FIG. 2A, the navigation scenario 300 of FIG. 3, the full-surface contact localization system 500 of FIG. 5, and the robot control system 1000 of FIG. 10, and may include additional features not mentioned above.

In operation 1110, the motion control method 1100 may include controlling a motion of the device 100 (e.g., the robot vacuum cleaner) based on a current path plan and/or a previously desired moving direction and speed.

In operation 1120, the motion control method 1100 may include determining a current operating mode. Based on the motion control method 1100 determining that the current operating mode is an "avoid contact" operating mode ("Avoid Contact" in operation 1120), the motion control method 1100 may proceed to operation 1130. The "avoid contact" operating mode may refer to a contact avoidance operating mode in which the motion control method 1100 may update a path plan to avoid contact and move away from an obstacle.

In operation 1130, the motion control method 1100 may include determining whether contact is detected. Based on the motion control method 1100 determining that contact is detected (Yes in operation 1130), the motion control method 1100 may proceed to operation 1140. Based on the motion control method 1100 determining that contact is not detected (No in operation 1130), the motion control method 1100 may return to operation 1110 and continue to control the motion of the device 100 according to the current path plan.

In operation 1140, based on contact being detected while in the "avoid contact" operating mode", the motion control method 1100 may include performing contact localization to obtain contact information 585 that may include the location of the contact 528 and the intensity of the contact 528. The motion control method 1100 may update the current path plan to avoid contact with the obstacle causing the contact 528, based on the contact information 585. The motion control method 1100 may return to operation 1110 to control the motion of the device 100 according to the updated path plan. That is, the motion control method 1100 may determine a motion of the device 100 based on the location of the contact 528, the intensity of the contact 528, and an operating mode of the device 100.

Based on the motion control method 1100 determining that the current operating mode is an "follow edge" operating mode ("Follow Edge" in operation 1120), the motion control method 1100 may proceed to operation 1150. The "follow edge" operating mode may refer to an operating mode in which the motion control method 1100 may maintain a light contact with an obstacle (e.g., a wall). That is, when light contact is detected, the motion control method 1100 may maintain the current path plan.

In operation 1150, the motion control method 1100 may include determining whether contact is detected. Based on the motion control method 1100 determining that contact is detected (Yes in operation 1150), the motion control method 1100 may proceed to operation 1160. Based on the motion control method 1100 determining that contact is not detected (No in operation 1150), the motion control method 1100 may proceed to operation 1170.

In operation 1160, the motion control method 1100 may include determining the type of contact that is detected. Based on the motion control method 1100 determining that light contact is detected ("Light Contact" in operation 1160), the motion control method 1100 may proceed to operation 1180. In some embodiments, the motion control method 1100 may determine that light contact is detected based on the contact information 585 indicating that the intensity of the contact 528 may be classified as light contact (e.g., the intensity of the contact is less than or equal to 5 N). Based on the motion control method 1100 determining that contact is not detected ("Heavy Contact" in operation 1160), the motion control method 1100 may proceed to operation 1170. In some embodiments, the motion control method 1100 may determine that heavy contact is detected based on the contact information 585 indicating that the intensity of the contact 528 may be classified as heavy contact (e.g., the intensity of the contact is greater than or equal to 10 N). However, the present disclosure is not limited in this regard, and other methods or criteria may be used to classify the intensity of the contact 528.

In operation 1170, based on contact not being detected or on a heavy contact being detected, the motion control method 1100 may adjust the path plan towards a location at which a light contact was previously detected. That is, the motion control method 1100 may attempt to adjust the path plan to re-establish a light contact with the obstacle. The motion control method 1100 may return to operation 1110 to control the motion of the device 100 according to the adjusted path plan.

In operation 1180, based on light contact being detected, the motion control method 1100 may determine whether the contact information 585 indicates that the region of the contact 528 is in the correct location of the outside panel 410. That is, the motion control method 1100 may determine whether the region of the contact 528 indicates that the device 100 is located in the correct position with respect to the obstacle. Based on the motion control method 1100 determining that the light contact is in the correct region (Yes in operation 1180), the motion control method 1100 may return to operation 1110 to continue to control the motion of the device 100 according to the current path plan. Based on the motion control method 1100 determining that the light contact is not in the correct region (No in operation 1180), the motion control method 1100 may proceed to operation 1170 to re-establish a light contact with the obstacle at the correct region.

Advantageously, the methods, apparatuses, systems, and non-transitory computer-readable mediums for classifying a region and an intensity of a contact, described above with reference to FIGS. 1 to 11, provide a full-surface contact localization system with a relatively high collision detection resolution (e.g., within 2 cm) that may be capable of detecting collisions in a wide range of force levels (e.g., about 2 to 20 N) on various types of materials (e.g., wood, metal, plastic, and the like) in the presence of other acoustic signals and/or vibrations from other sources (e.g., running motors). Furthermore, aspects presented herein provide for using a monotone signal to excite full-duplex acoustic sensors which may allow for faster processing of the acoustic signals and faster contact detection when compared to related sensing approaches. In addition, aspects presented herein provide a trained machine learning model configured to determine contact region and intensity from complex acoustic wave pattern signals generated by the acoustic sensors.

Figure 12:
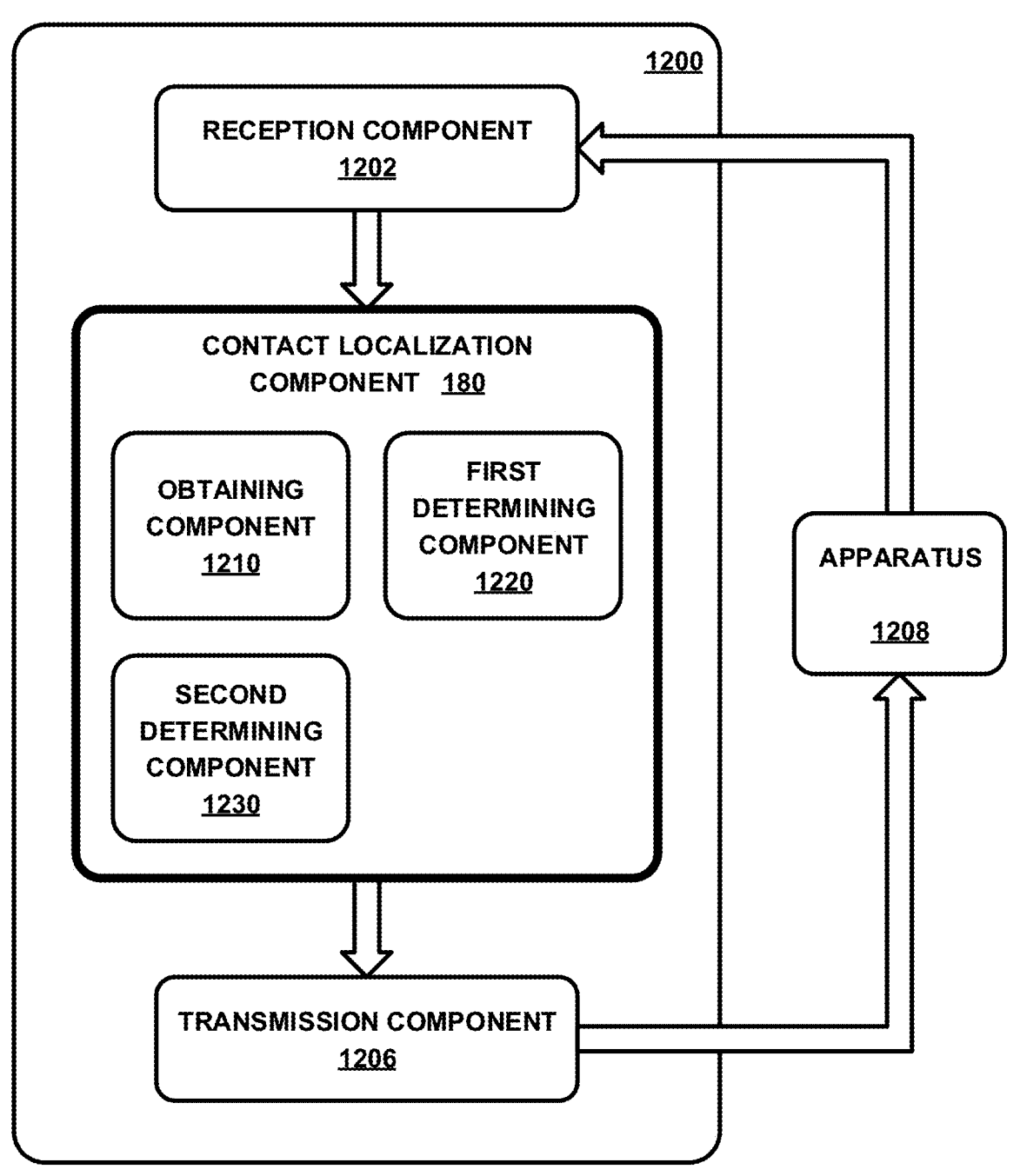
FIG. 12 depicts a block diagram of an example apparatus for classifying a region and an intensity of a contact, in accordance with various aspects of the present disclosure.

FIG. 12 illustrates a block diagram of an example apparatus for classifying a region and an intensity of a contact, in accordance with various aspects of the present disclosure. The apparatus 1200 may be a computing device (e.g., device 100 of FIG. 1) and/or a computing device may include the apparatus 1200. In some embodiments, the apparatus 1200 may include a reception component 1202 configured to receive communications (e.g., wired, wireless) from another apparatus (e.g., apparatus 1208), a contact localization component 180 configured to classify a region and an intensity of a contact, and a transmission component 1206 configured to transmit communications (e.g., wired, wireless) to another apparatus (e.g., apparatus 1208). The components of the apparatus 1200 may be in communication with one another (e.g., via one or more buses or electrical connections). As shown in FIG. 12, the apparatus 1200 may be in communication with another apparatus 1208 (such as, but not limited to, a robotic device, a robot controller, a server, a laptop, a smartphone, a UE, a wearable device, a smart device, an IoT device, and the like) using the reception component 1202 and/or the transmission component 1206.

In some embodiments, the apparatus 1200 may be configured to perform one or more operations described herein in connection with FIGS. 1 to 11. Alternatively or additionally, the apparatus 1200 may be configured to perform one or more processes described herein, such as, but not limited to, method 1300 of FIG. 13, method 1400 of FIG. 14, method 1500 of FIG. 15, and/or method 1600 of FIG. 16. In some embodiments, the apparatus 1200 may include one or more components of the device 100 described with reference to FIG. 1.

The reception component 1202 may receive communications, such as control information, data communications, or a combination thereof, from the apparatus 1208 (e.g., a robotic device, a robot controller, a server, a laptop, a smartphone, a UE, a wearable device, a smart device, an IoT device, and the like). The reception component 1202 may provide received communications to one or more other components of the apparatus 1200, such as the contact localization component 180. In some embodiments, the reception component 1202 may perform signal processing on the received communications, and may provide the processed signals to the one or more other components. In some embodiments, the reception component 1202 may include one or more antennas, a receive processor, a controller/processor, a memory, or a combination thereof, of the device 100 described with reference to FIG. 1.

The transmission component 1206 may transmit communications, such as control information, data communications, or a combination thereof, to the apparatus 1208 (e.g., a robotic device, a robot controller, a server, a laptop, a smartphone, a UE, a wearable device, a smart device, an IoT device, and the like). In some embodiments, the contact localization component 180 may generate communications and may transmit the generated communications to the transmission component 1206 for transmission to the apparatus 1208. In some embodiments, the transmission component 1206 may perform signal processing on the generated communications, and may transmit the processed signals to the apparatus 1208. In other embodiments, the transmission component 1206 may include one or more antennas, a transmit processor, a controller/processor, a memory, or a combination thereof, of the device 100 described with reference to FIG. 1. In some embodiments, the transmission component 1206 may be co-located with the reception component 1202 such as in a transceiver and/or a transceiver component.

The contact localization component 180 may be configured to classify a region and an intensity of a contact. In some embodiments, the contact localization component 180 may include a set of components, such as an obtaining component 1210 configured to obtain a combined acoustic signal, a first determining component 1220 configured to determine, using a trained machine learning model, the region and intensity of the contact, and a second determining component 1230 configured to determine a motion of the apparatus based on the region of the contact, the intensity of the contact, and an operating mode of the apparatus.

In some embodiments, the set of components may be separate and distinct from the contact localization component 180. In other embodiments, one or more components of the set of components may include or may be implemented within a controller/processor (e.g., the processor 120), a memory (e.g., the memory 130), or a combination thereof, of the device 100 described above with reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIGS. 1 to 11.

Referring to FIG. 13, in operation, an apparatus 1200 may perform a method 1300 of classifying a region and an intensity of a contact. The method 1300 may be performed by at least one of the device 100 (which may include the processor 120, the memory 130, and the storage component 140, and which may be the entire device 100 and/or include one or more components of the device 100, such as the input component 150, the output component 160, the communication interface 170, and/or the contact localization component 180) and/or the apparatus 1200. The method 1300 may be performed by the device 100, the apparatus 1200, and/or the contact localization component 180 in communication with the apparatus 1208 (e.g., a robotic device, a robot controller, a server, a laptop, a smartphone, a UE, a wearable device, a smart device, an IoT device, and the like).

At block 1310 of FIG. 13, the method 1300 may include obtaining, from a plurality of acoustic sensors provided on an inner surface of a bumper of the apparatus, a combined acoustic signal, the combined acoustic signal being based on an input signal provided to each of the plurality of acoustic sensors, the plurality of acoustic sensors attached apart from each other. For example, in an aspect, the device 100, the contact localization component 180, and/or the obtaining component 1210 may be configured to or may include means for obtaining, from a plurality of acoustic sensors 420 provided on an inner surface of a bumper of the apparatus, a combined acoustic signal 525, the combined acoustic signal 525 being based on an input signal provided to each of the plurality of acoustic sensors 420, the plurality of acoustic sensors attached apart from each other.

For example, the obtaining at block 1310 may include exciting the plurality of acoustic sensors 420 with a monotone excitation signal that may cause the outside panel 410 to vibrate, as described with reference to FIG. 4. In such embodiments, the plurality of acoustic sensors 420 may be provided (mounted) on an inner surface of an outside panel 410 (e.g., bumper) of a device 100 (e.g., a robotic arm, a vacuum cleaner, an appliance).

In some embodiments, the obtaining at block 1310 may include obtaining the combined acoustic signal from a plurality of piezoelectric transceivers provided on an inner surface of a bumper 410 of the device 100.

In optional or additional embodiments, the obtaining at block 1310 may include providing the input signal 630 to each of the plurality of acoustic sensors 420. Alternatively or additionally, an excitation frequency of the input signal 630 may correspond to the operating mode of the device 100.

In other optional or additional embodiments, the obtaining at block 1310 may include providing the plurality of acoustic sensors with an input calibration signal corresponding to the operating mode of the apparatus, obtaining at least one calibration acoustic signal from the plurality of acoustic sensors, extracting calibration signal magnitudes from the at least one calibration acoustic signal, selecting, based on the calibration signal magnitudes, a calibration frequency having a maximum spectral power, and updating the excitation frequency of the input signal corresponding to the operating mode of the apparatus, based on the calibration frequency.

In other optional or additional embodiments, the obtaining at block 1310 may include changing the operating mode of the apparatus from a first mode to a second mode, and changing the excitation frequency of the input signal from a first excitation frequency to a second excitation frequency that corresponds to the second mode.

In other optional or additional embodiments, the obtaining at block 1310 may include providing the input signal 630 to a reference acoustic sensor 540 different from the plurality of acoustic sensors 420, and comparing the combined acoustic signal 420 with the reference acoustic signal 545 from the reference acoustic sensor 540, resulting in at least one difference signal 555.

In other optional or additional embodiments, the obtaining at block 1310 may include converting the at least one difference signal 555 to at least one digital difference signal 565, phase matching the at least one digital difference signal 565, mixing the at least one phase-matched digital difference signal 565, and providing the at least one mixed phase-matched digital difference signal 565 to the trained machine learning model 580 as input.

In other optional or additional embodiments, the plurality of acoustic sensors may include a number of acoustic sensors determined based on at least one of an accuracy threshold of the apparatus and a material type of the bumper of the apparatus, and the plurality of acoustic sensors may be provided at locations on the inner surface of the bumper of the apparatus determined based on the at least one of the accuracy threshold of the apparatus and the material type of the bumper of the apparatus.

Further, for example, the obtaining at block 1310 may be performed to provide analog difference signals 555 that may be proportional to the undulations of the raw signals 525 that may be caused by the received vibration (acoustic wave) pattern. The provided analog difference signals 555 may be digitized, phase matched, and mixed in order to prepare the analog difference signals 555 to be provided to a trained machine learning model that may characterize a location of the contact 528 along a length of the outside panel 410 and an intensity of the contact 528.

At block 1320 of FIG. 13, the method 1300 may include determining, using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the combined acoustic signal. For example, in an aspect, the device 100, the contact localization component 180, and/or the first determining component 1220 may be configured to or may include means for determining, using a trained machine learning model 580 that has been trained with acoustic signals and corresponding position and intensity information of impacts on a plurality of regions of an outer surface of the bumper, the region of the contact on the bumper with respect to the plurality of regions and the intensity of the contact, based on the combined acoustic signal 525.

For example, the determining at block 1320 may include outputting contact information 585 that may indicate the region of the contact 528 from among the plurality of L contact regions corresponding to the outside panel 410 and the intensity of the contact 528 from among a light contact and a heavy contact.

In some embodiments, the trained machine learning model 580 may have been trained using contact sample data including a plurality of impact intensities at a plurality of regions on a plurality of sensing materials. In such embodiments, the determining at block 1320 may include obtaining, from the trained machine learning model, a mapping of the region of the contact 528 to at least one region of the plurality of regions and a classification of the intensity of the contact 528.

Further, for example, the determining at block 1320 may be performed to characterize a region of the contact 528 along a length of the outside panel 410 and an intensity of the contact 528.

At block 1330 of FIG. 13, the method 1300 may include determining a motion of the apparatus based on the region of the contact, the intensity of the contact, and an operating mode of the apparatus. For example, in an aspect, the device 100, the contact localization component 180, and/or the second determining component 1230 may be configured to or may include means for determining a motion of the apparatus 100 based on the region of the contact 528, the intensity of the contact 528, and an operating mode of the apparatus 100.

For example, the determining at block 1330 may include controlling a motion of the device 100 (e.g., the robot vacuum cleaner) based on a current path plan and/or a previously desired moving direction and speed, as described with reference to FIG. 11.

In some embodiments, the operating mode of the apparatus may be a contact avoidance mode. In such embodiments, the determining at block 1330 may include updating a path plan of the apparatus 100 to move away from the contact 528, based on the region of the contact 528 and the intensity of the contact 528, as described with reference to FIG. 11.

In other optional or additional embodiments, the operating mode of the apparatus may be an edge following mode. In such embodiments, the determining at block 1330 may include determining, based on the intensity of the contact, whether at least one of a light contact and a heavy contact is detected, based on the heavy contact being detected, adjusting a path plan of the apparatus to move towards a previous region where a previous light contact was previously detected, based on the light contact being detected, determining whether the region of the contact corresponds to the path plan of the apparatus, and based on the region of the contact not corresponding to the path plan of the apparatus, adjusting the path plan of the apparatus to move towards the previous region where the previous light contact was previously detected, as described with reference to FIG. 11.

In an optional or additional aspect that may be combined with any other aspects, the method 1300 may further include extracting signal magnitudes corresponding to the combined acoustic signal based on comparing each acoustic signal of the combined acoustic signal from a corresponding acoustic sensor of the plurality of acoustic sensors with a reference acoustic signal from a reference acoustic sensor. For example, in an aspect, the device 100, and/or the contact localization component 180, may be configured to or may include means for extracting signal magnitudes 575 corresponding to the combined acoustic signal 525 based on comparing each acoustic signal of the combined acoustic signal 525 from a corresponding acoustic sensor of the plurality of acoustic sensors 420 with a reference acoustic signal 545 from a reference acoustic sensor 540.

In such an optional or additional aspect, the method 1300 may further include comparing each raw signal 525 from each acoustic sensor 420 with the reference acoustic signal 545 provided by the reference acoustic sensor 540, in order to extract the received vibration pattern from the N raw signals 525, as described with reference to FIGS. 5, 6A, and 6B.

In such an optional or additional aspect, the method 1300 may further include inputting the combined acoustic signal 525 and the reference acoustic signal 545 to the bridge circuit 750 to obtain a difference signal 555 between the combined acoustic signal 525 and the reference acoustic signal 545. In such embodiments, the difference signal 555 may include the signal magnitudes corresponding to the at least one acoustic signal 525.

Referring to FIG. 14, in operation, an apparatus 1200 may perform a method 1400 of classifying a region and an intensity of a contact. The method 1400 may be performed by at least one of the device 100 (which may include the processor 120, the memory 130, and the storage component 140, and which may be the entire device 100 and/or include one or more components of the device 100, such as the input component 150, the output component 160, the communication interface 170, and/or the contact localization component 180) and/or the apparatus 1200. The method 1400 may be performed by the device 100, the apparatus 1200, and/or the contact localization component 180 in communication with the apparatus 1208 (e.g., a robotic device, a robot controller, a server, a laptop, a smartphone, a UE, a wearable device, a smart device, an IoT device, and the like).

At block 1410, the method 1400 may include providing an excitation signal to a plurality of acoustic transceivers and to a reference acoustic transceiver, the plurality of acoustic transceivers being provided on an inner surface of a bumper of the apparatus. For example, in an aspect, the device 100, the contact localization component 180, and/or the obtaining component 1210 may be configured to or may include means for providing an excitation signal 630 to a plurality of acoustic transceivers 420 and to a reference acoustic transceiver 540, the plurality of acoustic transceivers 420 being provided on an inner surface of a bumper of the apparatus.

At block 1420, the method 1400 may include obtaining, from each of the plurality of acoustic transceivers, at least one acoustic signal, the at least one acoustic signal being received by the plurality of acoustic transceivers while each of the plurality of acoustic transceivers transmit the excitation signal provided to each of the plurality of acoustic transceivers. For example, in an aspect, the device 100, the contact localization component 180, and/or the obtaining component 1210 may be configured to or may include means for obtaining, from each of the plurality of acoustic transceivers 420, at least one acoustic signal 525, the at least one acoustic signal 525 being received by the plurality of acoustic transceivers 420 while each of the plurality of acoustic transceivers 420 transmit the excitation signal provided to each of the plurality of acoustic transceivers 420.

At block 1430, the method 1400 may include extracting signal magnitudes corresponding to the at least one acoustic signal based on comparing each of the at least one acoustic signal from a corresponding acoustic transceiver of the plurality of acoustic transceivers based on a reference signal from the reference acoustic transceiver. For example, in an aspect, the device 100, the contact localization component 180, and/or the obtaining component 1210 may be configured to or may include means for extracting signal magnitudes corresponding to the at least one acoustic signal 525 based on comparing each of the at least one acoustic signal 525 from a corresponding acoustic transceiver of the plurality of acoustic transceivers based on a reference acoustic signal 545 from the reference acoustic transceiver 540.

At block 1440 of FIG. 14, the method 1400 may include estimating, using a trained machine learning model based on the signal magnitudes, the region of the contact from among a plurality of contact regions on an outer surface of the bumper and the intensity of the contact from among a plurality of force levels, the trained machine learning model having been trained with acoustic signals and corresponding position and intensity information of impacts on the plurality of contact regions on the outer surface of the bumper. For example, in an aspect, the device 100, the contact localization component 180, and/or the first determining component 1220 may be configured to or may include means for estimating, using a trained machine learning model 580 based on the signal magnitudes, the region of the contact 528 from among a plurality of contact regions on an outer surface of the bumper and the intensity of the contact 528 from among a plurality of force levels, the trained machine learning model having been trained with acoustic signals and corresponding position and intensity information of impacts on the plurality of contact regions on the outer surface of the bumper.

Referring to FIG. 15, in operation, an apparatus 1200 may perform a method 1500 of classifying a region and an intensity of a contact. The method 1500 may be performed by at least one of the device 100 (which may include the processor 120, the memory 130, and the storage component 140, and which may be the entire device 100 and/or include one or more components of the device 100, such as the input component 150, the output component 160, the communication interface 170, and/or the contact localization component 180) and/or the apparatus 1200. The method 1500 may be performed by the device 100, the apparatus 1200, and/or the contact localization component 180 in communication with the apparatus 1208 (e.g., a robotic device, a robot controller, a server, a laptop, a smartphone, a UE, a wearable device, a smart device, an IoT device, and the like).

At block 1510, the method 1500 may include receiving, from a first acoustic sensor provided on an inner surface of a bumper of the apparatus, a combined acoustic signal comprising a first acoustic signal based on an input signal provided to the first acoustic sensor and one or more other acoustic signals based on the input signal provided to one or more other acoustic sensors adjacent to the first acoustic sensor. For example, in an aspect, the device 100, the contact localization component 180, and/or the obtaining component 1210 may be configured to or may include means for receiving, from a first acoustic sensor 420A provided on an inner surface of a bumper 410 of the apparatus, a combined acoustic signal 525 comprising a first acoustic signal 525A based on an input signal 630 provided to the first acoustic sensor 420A and one or more other acoustic signals 525 based on the input signal 630 provided to one or more other acoustic sensors 420 adjacent to the first acoustic sensor 420A.

At block 1520, the method 1500 may include determining, based on the combined acoustic signal using a trained machine learning model that has been trained with acoustic signals and corresponding position and intensity information of impacts on a plurality of regions of an outer surface of the bumper, the region of the contact on the bumper with respect to the plurality of regions and the intensity of the contact. For example, in an aspect, the device 100, the contact localization component 180, and/or the first determining component 1220 may be configured to or may include means for determining, based on the combined acoustic signal 525 using a trained machine learning model 580 that has been trained with acoustic signals and corresponding position and intensity information of impacts on a plurality of regions of an outer surface of the bumper, the region of the contact on the bumper 410 with respect to the plurality of regions and the intensity of the contact 528.

In an optional or additional aspect that may be combined with any other aspects, the method 1500 may further include detecting a change in the combined acoustic signal based on comparing the combined acoustic signal with a reference acoustic signal from a reference acoustic sensor. For example, in an aspect, the device 100, the contact localization component 180, and/or the obtaining component 1210, may be configured to or may include means for detecting a change in the combined acoustic signal 525 based on comparing the combined acoustic signal 525 with a reference acoustic signal 545 from a reference acoustic sensor 540.

Referring to FIG. 16, in operation, an apparatus 1200 may perform a method 1600 of classifying a region and an intensity of a contact. The method 1600 may be performed by at least one of the device 100 (which may include the processor 120, the memory 130, and the storage component 140, and which may be the entire device 100 and/or include one or more components of the device 100, such as the input component 150, the output component 160, the communication interface 170, and/or the contact localization component 180) and/or the apparatus 1200. The method 1600 may be performed by the device 100, the apparatus 1200, and/or the contact localization component 180 in communication with the apparatus 1208 (e.g., a robotic device, a robot controller, a server, a laptop, a smartphone, a UE, a wearable device, a smart device, an IoT device, and the like).

At block 1610, the method 1600 may include obtaining, from a plurality of acoustic sensors provided on an inner surface of a bumper of the apparatus, at least one acoustic signal, the at least one acoustic signal being based on an input signal provided to each of the plurality of acoustic sensors. For example, in an aspect, the device 100, the contact localization component 180, and/or the obtaining component 1210 may be configured to or may include means for obtaining, from a plurality of acoustic sensors 420 provided on an inner surface of a bumper 410 of the apparatus, at least one acoustic signal 525, the at least one acoustic signal 525 being based on an input signal 630 provided to each of the plurality of acoustic sensors 420.

At block 1620, the method 1600 may include detecting a change in signal magnitudes corresponding to the at least one acoustic signal based on comparing each acoustic signal of the at least one acoustic signal from a corresponding acoustic sensor of the plurality of acoustic sensors with a reference acoustic signal from a reference acoustic sensor. For example, in an aspect, the device 100 and/or the contact localization component 180 may be configured to or may include means for detecting a change in signal magnitudes 575 corresponding to the at least one acoustic signal 525 based on comparing each acoustic signal of the at least one acoustic signal 525 from a corresponding acoustic sensor of the plurality of acoustic sensors 420 with a reference acoustic signal 545 from a reference acoustic sensor 540.

At block 1630, the method 1600 may include determining, based on the change exceeding a change threshold, and using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the signal magnitudes. For example, in an aspect, the device 100, the contact localization component 180, and/or the first determining component 1220 may be configured to or may include means for determining, based on the change exceeding a change threshold, and using a trained machine learning model 580 that has been trained with acoustic signals and corresponding position and intensity information of impacts on a plurality of regions of an outer surface of the bumper 410, the region of the contact on the bumper 410 with respect to the plurality of regions and the intensity of the contact, based on the signal magnitudes 575.

The following aspects are illustrative only and aspects thereof may be combined with aspects of other embodiments or teaching described herein, without limitation.

Aspect 1 is a method for classifying a region and an intensity of a contact by an apparatus. The method includes obtaining, from a plurality of acoustic sensors provided on an inner surface of a bumper of the apparatus, a combined acoustic signal, the combined acoustic signal being based on an input signal provided to each of the plurality of acoustic sensors, the plurality of acoustic sensors attached apart from each other, determining, using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the combined acoustic signal, and determining a motion of the apparatus based on the region of the contact, the intensity of the contact, and an operating mode of the apparatus.

In Aspect 2, the plurality of acoustic sensors of Aspect 1 may include a plurality of piezoelectric transceivers. In such aspects, the obtaining of the combined acoustic signal of the method of Aspect 1 may be performed by the plurality of piezoelectric transceivers.

In Aspect 3, the method of Aspect 1 or 2 may further include extracting signal magnitudes corresponding to the combined acoustic signal based on comparing each acoustic signal of the combined acoustic signal from a corresponding acoustic sensor of the plurality of acoustic sensors with a reference acoustic signal from a reference acoustic sensor.

In Aspect 4, the plurality of acoustic sensors of any of the Aspects 1 to 3 may further include a bridge circuit. In such aspects, the extracting of the signal magnitudes of the method of Aspect 1 or 3 may include inputting the combined acoustic signal and the reference acoustic signal to the bridge circuit to obtain a difference signal between the combined acoustic signal and the reference acoustic signal, and the difference signal may include the signal magnitudes corresponding to the combined acoustic signal.

In Aspect 5, the operating mode of the apparatus may be a contact avoidance mode. In such aspects, the determining of the motion of the apparatus of the method of any of the Aspects 1 to 4 may include updating a path plan of the apparatus to move away from the contact, based on the region of the contact and the intensity of the contact.

In Aspect 6, the operating mode of the apparatus may be an edge following mode. In such aspects, the determining of the motion of the apparatus of the method of any of the Aspects 1 to 4 may include determining, based on the intensity of the contact, whether at least one of a light contact and a heavy contact is detected, based on the heavy contact being detected, adjusting a path plan of the apparatus to move towards a previous region where a previous light contact was previously detected, based on the light contact being detected, determining whether the region of the contact corresponds to the path plan of the apparatus, and based on the region of the contact not corresponding to the path plan of the apparatus, adjusting the path plan of the apparatus to move towards the previous region where the previous light contact was previously detected.

In Aspect 7, the method of any of Aspects 1 to 6 may include providing the input signal to each of the plurality of acoustic sensors, the combined acoustic signal being received by the plurality of acoustic sensors while each of the plurality of acoustic sensors transmit the input signal provided to each of the plurality of acoustic sensors, an excitation frequency of the input signal corresponding to the operating mode of the apparatus.

In Aspect 8, the method of any of Aspects 1 to 7 may include providing the one or more acoustic sensors with an input calibration signal corresponding to the operating mode of the apparatus, obtaining at least one calibration acoustic signal from the one or more acoustic sensors, extracting calibration signal magnitudes from the at least one calibration acoustic signal, selecting, based on the calibration signal magnitudes, a calibration frequency having a maximum spectral power, and updating the excitation frequency of the input signal corresponding to the operating mode of the apparatus, based on the calibration frequency.

In Aspect 9, the method of any of Aspects 1 to 8 may include changing the operating mode of the apparatus from a first mode to a second mode, and changing the excitation frequency of the input signal from a first excitation frequency to a second excitation frequency that corresponds to the second mode.

In Aspect 10, the method of any of Aspects 1 to 9 may include providing the input signal to a reference acoustic sensor different from the plurality of acoustic sensors, and comparing the combined acoustic signal with the reference acoustic signal from the reference acoustic sensor, resulting in at least one difference signal.

In Aspect 11, the method of any of Aspects 1 to 10 may include converting the at least one difference signal to at least one digital difference signal, phase matching the at least one digital difference signal, mixing the at least one phase-matched digital difference signal, and providing the at least one mixed phase-matched digital difference signal to the trained machine learning model as input.

In Aspect 12, the trained machine learning model may have been trained using contact sample data including a plurality of impact intensities at a plurality of regions corresponding to the plurality of regions of outer surface of the bumper on a plurality of sensing materials. In such aspects, the method of any of Aspects 1 to 11 may include obtaining, from the trained machine learning model, a mapping of the region of the contact to at least one region of the plurality of regions and a classification of the intensity of the contact.

In Aspect 13, the plurality of acoustic sensors includes a number of acoustic sensors determined based on at least one of an accuracy threshold of the apparatus and a material type of the bumper of the apparatus, and the plurality of acoustic sensors are provided at locations on the inner surface of the bumper of the apparatus determined based on the at least one of the accuracy threshold of the apparatus and the material type of the bumper of the apparatus.

Aspect 14 is an apparatus for classifying a region and an intensity of a contact. The apparatus includes a plurality of piezoelectric transceivers provided on an inner surface of a bumper of the apparatus, a memory storing instructions, and one or more processors communicatively coupled to the memory. The one or more processors are configured to execute the instructions to perform one or more of the methods of any of Aspects 1 to 13.

Aspect 15 is a full-surface contact localization system for classifying a region and an intensity of a contact. The full-surface contact localization system includes a robot, a plurality of piezoelectric transceivers provided on an inner surface of a bumper of the robot, a memory storing instructions, and one or more processors communicatively coupled to the memory. The one or more processors are configured to execute the instructions to perform one or more of the methods of any of Aspects 1 to 13.

Aspect 16 is an apparatus for classifying a region and an intensity of a contact. The apparatus includes means for performing one or more of the methods of any of Aspects 1 to 13.

Aspect 17 is a non-transitory computer-readable storage medium storing computer-executable instructions for classifying a region and an intensity of a contact. The computer-executable instructions are configured, when executed by one or more processors of a device, to cause the device to perform one or more of the methods of any of Aspects 1 to 13.

Aspect 18 is a method for classifying a region and an intensity of a contact by an apparatus. The method includes providing an excitation signal to a plurality of acoustic transceivers and to a reference acoustic transceiver, the plurality of acoustic transceivers being provided on an inner surface of a bumper of the apparatus, obtaining, from each of the plurality of acoustic transceivers, at least one acoustic signal, the at least one acoustic signal being received by the plurality of acoustic transceivers while each of the plurality of acoustic transceivers transmit the excitation signal provided to each of the plurality of acoustic transceivers, extracting signal magnitudes corresponding to the at least one acoustic signal based on comparing each of the at least one acoustic signal from a corresponding acoustic transceiver of the one or more acoustic transceivers based on a reference signal from the reference acoustic transceiver, and estimating, using a trained machine learning model based on the signal magnitudes, the region of the contact from among a plurality of contact regions on an outer surface of the bumper and the intensity of the contact from among a plurality of force levels, the trained machine learning model having been trained with acoustic signals and corresponding position and intensity information of impacts on the plurality of contact regions on the outer surface of the bumper.

In Aspect 19, the method of Aspect 18 may include methods of any of Aspects 1 to 13.

Aspect 20 is a method for classifying a region and an intensity of a contact by an apparatus. The method includes receiving, from a first acoustic sensor provided on an inner surface of a bumper of the apparatus, a combined acoustic signal comprising a first acoustic signal based on an input signal provided to the first acoustic sensor and one or more other acoustic signals based on the input signal provided to one or more other acoustic sensors adjacent to the first acoustic sensor, and determining, based on the combined acoustic signal using a trained machine learning model that has been trained with acoustic signals and corresponding position and intensity information of impacts on a plurality of regions of an outer surface of the bumper, the region of the contact on the bumper with respect to the plurality of regions and the intensity of the contact.

In Aspect 21, the method of Aspect 20 may include detecting a change in the combined acoustic signal based on comparing the combined acoustic signal with a reference acoustic signal from a reference acoustic sensor.

In Aspect 22, the method of Aspect 20 or 21 may include methods of any of Aspects 1 to 13.

Aspect 23 is a method for classifying a region and an intensity of a contact by an apparatus. The method includes obtaining, from a plurality of acoustic sensors provided on an inner surface of a bumper of the apparatus, at least one acoustic signal, the at least one acoustic signal being based on an input signal provided to each of the plurality of acoustic sensors, detecting a change in signal magnitudes corresponding to the at least one acoustic signal based on comparing each acoustic signal of the at least one acoustic signal from a corresponding acoustic sensor of the plurality of acoustic sensors with a reference acoustic signal from a reference acoustic sensor, and determining, based on the change exceeding a change threshold, and using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the signal magnitudes.

In Aspect 24, the method of Aspect 23 may include methods of any of Aspects 1 to 13.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EEPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLAs) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings (e.g., FIGS. 1 and 5 to 12) may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, and the like, that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which includes one or more executable instructions for implementing the specified logical functions. The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and the like), and may be used interchangeably with "one or more." Where only one item is intended, the term "one" or similar language is used. Also, as used herein, the terms "has," "have," "having," "includes," "including," or the like are intended to be open-ended terms. Further, the phrase "based on" is intended to mean "based, at least in part, on" unless explicitly stated otherwise. In addition, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment. As used herein, such terms as "1st" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations may be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Furthermore, the described features, advantages, and characteristics of the present disclosure may be combined in any suitable manner in one or more embodiments. One skilled in the relevant art may recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

What is claimed is:

1. A method for classifying a region and an intensity of a contact by an apparatus, comprising:

determining an excitation frequency of an input signal that corresponds to an operating mode of the apparatus;

generating mechanical vibrations on a portion of the apparatus by providing the input signal to each of a plurality of acoustic sensors, the plurality of acoustic sensors provided on an inner surface of a bumper of the apparatus, the plurality of acoustic sensors attached apart from each other;

obtaining, from the plurality of acoustic sensors, a combined acoustic signal, the combined acoustic signal being based on the input signal;

extracting signal magnitudes corresponding to the combined acoustic signal based on comparing the combined acoustic signal with a reference acoustic signal from a reference acoustic sensor, wherein the reference acoustic signal is generated by providing the input signal to the reference acoustic sensor;

determining, using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the combined acoustic signal; and determining a motion of the apparatus based on the region of the contact, the intensity of the contact, and the operating mode of the apparatus.

2. The method of claim 1, wherein the plurality of acoustic sensors comprise a plurality of piezoelectric transceivers, and wherein the obtaining of the combined acoustic signal is performed by the plurality of piezoelectric transceivers.

3. The method of claim 1, wherein the plurality of acoustic sensors further comprise a bridge circuit, wherein the extracting of the signal magnitudes comprises inputting the combined acoustic signal and the reference acoustic signal to the bridge circuit to obtain a difference signal between the combined acoustic signal and the reference acoustic signal, and wherein the difference signal comprises the signal magnitudes corresponding to the combined acoustic signal.

4. The method of claim 1, wherein the operating mode of the apparatus is a contact avoidance mode, and wherein the determining of the motion of the apparatus comprises updating a path plan of the apparatus to move away from the contact, based on the region of the contact and the intensity of the contact.

5. The method of claim 1, wherein the operating mode of the apparatus is an edge following mode, and wherein the determining of the motion of the apparatus comprises:

determining, based on the intensity of the contact, whether at least one of a light contact and a heavy contact is detected;

based on the heavy contact being detected, adjusting a path plan of the apparatus to move towards a previous region where a previous light contact was previously detected;

based on the light contact being detected, determining whether the region of the contact corresponds to the path plan of the apparatus; and based on the region of the contact not corresponding to the path plan of the apparatus, adjusting the path plan of the apparatus to move towards the previous region where the previous light contact was previously detected.

6. The method of claim 1, wherein the obtaining of the combined acoustic signal comprises:

providing the input signal to each of the plurality of acoustic sensors, wherein the combined acoustic signal is received by the plurality of acoustic sensors while each of the plurality of acoustic sensors transmit the input signal provided to each of the plurality of acoustic sensors.

7. The method of claim 6, further comprising:

providing the plurality of acoustic sensors with an input calibration signal corresponding to the operating mode of the apparatus;

obtaining at least one calibration acoustic signal from the plurality of acoustic sensors;

extracting calibration signal magnitudes from the at least one calibration acoustic signal;

selecting, based on the calibration signal magnitudes, a calibration frequency having a maximum spectral power; and updating the excitation frequency of the input signal corresponding to the operating mode of the apparatus, based on the calibration frequency.

8. The method of claim 6, further comprising:

changing the operating mode of the apparatus from a first mode to a second mode; and changing the excitation frequency of the input signal from a first excitation frequency to a second excitation frequency that corresponds to the second mode.

9. The method of claim 6, wherein the obtaining of the combined acoustic signal further comprises:

providing the input signal to the reference acoustic sensor different from the plurality of acoustic sensors; and comparing the combined acoustic signal with the reference acoustic signal from the reference acoustic sensor, resulting in at least one difference signal.

10. The method of claim 9, further comprising:

converting the at least one difference signal to at least one digital difference signal;

phase matching the at least one digital difference signal;

mixing the at least one phase-matched digital difference signal; and providing the at least one mixed phase-matched digital difference signal to the trained machine learning model as input.

11. The method of claim 1, wherein the trained machine learning model has been trained using contact sample data comprising a plurality of impact intensities at regions corresponding to the plurality of regions of the outer surface of the bumper on a plurality of sensing materials, and wherein the determining of the region of the contact on the bumper and the intensity of the contact comprises obtaining, from the trained machine learning model, a mapping of the region of the contact to at least one region of the plurality of regions and a classification of the intensity of the contact.

12. An apparatus for classifying a region and an intensity of a contact, comprising:

a plurality of piezoelectric transceivers provided on an inner surface of a bumper of the apparatus, the plurality of piezoelectric transceivers being attached apart from each other;

a memory storing instructions; and one or more processors communicatively coupled to the memory; wherein the one or more processors are configured to execute the instructions to:

determining an excitation frequency of an input signal that corresponds to an operating mode of the apparatus;

generate mechanical vibrations on a portion of the apparatus by providing the input signal to each of the plurality of piezoelectric transceivers;

obtain, from each of the plurality of piezoelectric transceivers, at least one acoustic signal, the at least one acoustic signal being based on an input the input signal provided to each of the plurality of piezoelectric transceivers;

extract signal magnitudes corresponding to the at least one acoustic signal based on comparing each acoustic signal of the at least one acoustic signal from a corresponding piezoelectric transceiver of the plurality of piezoelectric transceivers with a reference acoustic signal, wherein the reference acoustic signal is generated by providing the input signal to a reference piezoelectric transceiver;

determine, using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the signal magnitudes; and determine a motion of the apparatus based on the region of the contact, the intensity of the contact, and the operating mode of the apparatus.

13. The apparatus of claim 12, wherein the apparatus further comprises a bridge circuit, wherein the one or more processors are further configured to execute further instructions to input the at least one acoustic signal and the reference acoustic signal to the bridge circuit to obtain a difference signal between each of the at least one acoustic signal and the reference acoustic signal, and wherein the difference signal comprises the signal magnitudes corresponding to the at least one acoustic signal.

14. The apparatus of claim 12, wherein the operating mode of the apparatus is a contact avoidance mode, and wherein the one or more processors are further configured to execute further instructions to update a path plan of the apparatus to move away from the contact, based on the region of the contact and the intensity of the contact.

15. The apparatus of claim 12, wherein the operating mode of the apparatus is an edge following mode, and wherein the one or more processors are further configured to execute further instructions to:

determine, based on the intensity of the contact, whether at least one of a light contact and a heavy contact is detected;

based on the heavy contact being detected, adjust a path plan of the apparatus to move towards a previous region where a previous light contact was previously detected;

based on the light contact being detected, determine whether the region of the contact corresponds to the path plan of the apparatus; and based on the region of the contact not corresponding to the path plan of the apparatus, adjust the path plan of the apparatus to move towards the previous region where the previous light contact was previously detected.

16. The apparatus of claim 12, wherein the one or more processors are further configured to execute further instructions to:

provide the input signal to each of the plurality of piezoelectric transceivers, wherein the at least one acoustic signal is received by the plurality of piezoelectric transceivers while each of the plurality of piezoelectric transceivers transmit the input signal provided to each of the plurality of piezoelectric transceivers.

17. The apparatus of claim 16, wherein the one or more processors are further configured to execute further instructions to:

provide the plurality of piezoelectric transceivers with an input calibration signal corresponding to the operating mode of the apparatus;

obtain at least one calibration acoustic signal from the plurality of piezoelectric transceivers;

extract calibration signal magnitudes from the at least one calibration acoustic signal;

select, based on the calibration signal magnitudes, a calibration frequency having a maximum spectral power; and update the excitation frequency of the input signal corresponding to the operating mode of the apparatus, based on the calibration frequency.

18. The apparatus of claim 16, wherein the one or more processors are further configured to execute further instructions to:

provide the input signal to the reference piezoelectric transceiver different from the plurality of piezoelectric transceivers;

compare each of the at least one acoustic signal with the reference acoustic signal from the reference piezoelectric transceiver, resulting in at least one difference signal;

convert the at least one difference signal to at least one digital difference signal;

phase match the at least one digital difference signal;

mix the at least one phase-matched digital difference signal; and provide the at least one mixed phase-matched digital difference signal to the trained machine learning model as input.

19. The apparatus of claim 12, wherein the plurality of piezoelectric transceivers comprises a number of piezoelectric transceivers determined based on at least one of an accuracy threshold of the apparatus and a material type of the bumper of the apparatus, and wherein the plurality of piezoelectric transceivers are provided at locations on the inner surface of the bumper of the apparatus determined based on the at least one of the accuracy threshold of the apparatus and the material type of the bumper of the apparatus.

20. A method for classifying a region and an intensity of a contact by an apparatus, comprising:

determining an excitation frequency of an excitation signal that corresponds to an operating mode of the apparatus;

generating mechanical vibrations on a portion of the apparatus by providing the excitation signal to each of a plurality of acoustic transceivers and to a reference acoustic transceiver, the plurality of acoustic transceivers being provided on an inner surface of a bumper of the apparatus, the plurality of acoustic transceivers attached apart from each other;

obtaining, from each of the plurality of acoustic transceivers, at least one acoustic signal, the at least one acoustic signal being received by the plurality of acoustic transceivers while each of the plurality of acoustic transceivers transmit the excitation signal provided to each of the plurality of acoustic transceivers;

extracting signal magnitudes corresponding to the at least one acoustic signal based on comparing each of the at least one acoustic signal from a corresponding acoustic transceiver of the plurality of acoustic transceivers based on a reference signal from the reference acoustic transceiver, wherein the reference signal is generated by the reference acoustic transceiver using the excitation signal; and estimating, using a trained machine learning model based on the signal magnitudes, the region of the contact from among a plurality of contact regions on an outer surface of the bumper and the intensity of the contact from among a plurality of force levels, the trained machine learning model having been trained with acoustic signals and corresponding position and intensity information of impacts on the plurality of contact regions on the outer surface of the bumper.

21. A method for classifying a region and an intensity of a contact by an apparatus, comprising:

determining an excitation frequency of an input signal that corresponds to an operating mode of the apparatus;

generating mechanical vibrations on a portion of the apparatus by providing the input signal to a first acoustic sensor provided on an inner surface of a bumper of the apparatus;

receiving, from the first acoustic sensor, a combined acoustic signal comprising a first acoustic signal based on the input signal provided to the first acoustic sensor and one or more other acoustic signals based on the input signal provided to one or more other acoustic sensors adjacent to the first acoustic sensor;

extracting signal magnitudes corresponding to the combined acoustic signal based on comparing the combined acoustic signal with a reference acoustic signal from a reference acoustic sensor, wherein the reference acoustic signal is generated by the reference acoustic sensor using the input signal; and determining, based on the signal magnitudes using a trained machine learning model that has been trained with acoustic signals and corresponding position and intensity information of impacts on a plurality of regions of an outer surface of the bumper, the region of the contact on the bumper with respect to the plurality of regions and the intensity of the contact.

22. The method of claim 21, further comprising:

detecting a change in the combined acoustic signal based on comparing the combined acoustic signal with a reference acoustic signal from the reference acoustic sensor.

23. A method for classifying a region and an intensity of a contact by an apparatus, comprising:

determining an excitation frequency of an input signal that corresponds to an operating mode of the apparatus;

generating mechanical vibrations on a portion of the apparatus by providing the input signal to each of a plurality of acoustic sensors, the plurality of acoustic sensors provided on an inner surface of a bumper of the apparatus, the plurality of acoustic sensors attached apart from each other;

obtaining, from the plurality of acoustic sensors, at least one acoustic signal, the at least one acoustic signal being based on the input signal provided to each of the plurality of acoustic sensors;

detecting a change in signal magnitudes corresponding to the at least one acoustic signal based on comparing each acoustic signal of the at least one acoustic signal from a corresponding acoustic sensor of the plurality of acoustic sensors with a reference acoustic signal from a reference acoustic sensor, wherein the reference acoustic signal is generated by the reference acoustic sensor using the input signal; and determining, based on the change exceeding a change threshold, and using a trained machine learning model that has been trained with acoustic signals and corresponding position and intensity information of impacts on a plurality of regions of an outer surface of the bumper, the region of the contact on the bumper with respect to the plurality of regions and the intensity of the contact, based on the signal magnitudes.

* * * * *